United States Patent
Ben-Tzur

(10) Patent No.: US 9,626,158 B1
(45) Date of Patent: *Apr. 18, 2017

(54) DYNAMIC AVAILABILITY-BASED INTEGRATION OF EXTERNAL FUNCTIONALITY

(71) Applicant: Quixey, Inc., Mountain View, CA (US)

(72) Inventor: Jonathan Ben-Tzur, Sunnyvale, CA (US)

(73) Assignee: Quixey, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/245,234

(22) Filed: Aug. 24, 2016

Related U.S. Application Data

(63) Continuation of application No. 14/923,226, filed on Oct. 26, 2015.

(51) Int. Cl.
  G06F 9/44   (2006.01)
  G06F 3/0482  (2013.01)

(52) U.S. Cl.
  CPC .............. *G06F 8/24* (2013.01); *G06F 3/0482* (2013.01)

(58) Field of Classification Search
  CPC ... G06F 8/324; G06F 8/34; G06F 8/30; G06F 8/20; G06F 3/0482
  USPC ......................................................... 717/107
  See application file for complete search history.

(56) References Cited

U.S. PATENT DOCUMENTS

| | | |
|---|---|---|
| 7,673,327 B1 | 3/2010 | Polis et al. |
| 8,321,847 B1 | 11/2012 | Garvin et al. |
| 2003/0043192 A1 | 3/2003 | Bouleau |
| 2003/0182196 A1 | 9/2003 | Huang |
| 2005/0160104 A1 | 7/2005 | Meera et al. |
| 2012/0166276 A1 | 6/2012 | Chitnis et al. |
| 2012/0233567 A1 | 9/2012 | Brown et al. |

(Continued)

FOREIGN PATENT DOCUMENTS

| | | |
|---|---|---|
| WO | WO-03062946 | 7/2003 |
| WO | WO-2013059605 A1 | 4/2013 |

OTHER PUBLICATIONS

Hindman, Nate; URX Arrives on the Web; URX Blog; Jan. 15, 2015.

(Continued)

*Primary Examiner* — Anna Deng
(74) *Attorney, Agent, or Firm* — Harness, Dickey & Pierce, P.L.C.

(57) ABSTRACT

A system includes a user interface allowing a developer to select a function to supplement functionality of an application under development. A data store holds identifiers for functions representing external functionality available from third party applications. A code generation module provides a software object to the developer for incorporation into a state of the application. The state includes a user interface element associated with an entity. When the state is instantiated, an action query is transmitted to a search system with the unique identifier of the selected function and information about the entity. The user interface element is selectively visually adapted in response to the search system response. In response to user selection of the user interface element, a search result, the search system is displayed, including (i) an identifier of a target application and (ii) an access mechanism for a specified state of the target application, is displayed.

28 Claims, 30 Drawing Sheets

(56) References Cited

U.S. PATENT DOCUMENTS

| | | |
|---|---|---|
| 2012/0284247 A1 | 11/2012 | Jiang et al. |
| 2012/0311526 A1 | 12/2012 | DeAnna et al. |
| 2013/0290319 A1 | 10/2013 | Glover et al. |
| 2014/0129265 A1* | 5/2014 | Arena .................. G06Q 50/14 705/5 |
| 2014/0172840 A1 | 6/2014 | Kumar et al. |
| 2014/0282358 A1 | 9/2014 | Mowatt et al. |
| 2014/0282398 A1 | 9/2014 | Podolyak et al. |
| 2015/0154644 A1* | 6/2015 | Saxena ............. G06Q 30/0269 705/14.66 |
| 2016/0085514 A1 | 3/2016 | Savliwala et al. |
| 2016/0085515 A1 | 3/2016 | Ben-Tzur et al. |
| 2016/0085516 A1 | 3/2016 | Ben-Tzur et al. |
| 2016/0085521 A1* | 3/2016 | Savliwala ......... G06F 17/30867 717/108 |
| 2016/0103693 A1* | 4/2016 | Berlin .................. G06F 13/102 719/327 |

OTHER PUBLICATIONS

Lawler, Ryan; TechCrunch; Button Raises $12 Million From Redpoint to Deep Link All Your Apps; Jan. 22, 2015.
Stephen Robertson, (2004) "Understanding Inverse Document Frequency: on Theoretical Arguments for IDF," Journal of Documentation, vol. 60 Iss: 5, pp. 503-520.
International Search Report and Written Opinion for PCT Application No. PCT/US2015/051751, mailed Mar. 24, 2016.
International Search Report and Written Opinion for PCT Application No. PCT/US2015/051762, mailed Mar. 18, 2016.
U.S. Appl. No. 14/588,310, filed Dec. 31, 2014, Taher Savliwala.
U.S. Appl. No. 14/588,351, filed Dec. 31, 2014, Taher Savliwala.
U.S. Appl. No. 14/683,004, filed Apr. 9, 2015, Jonathan Ben-Tzur.
U.S. Appl. No. 14/683,020, filed Apr. 9, 2015, Jonathan Ben-Tzur.
U.S. Appl. No. 14/923,226, filed Oct. 26, 2015, Jonathan Ben-Tzur.

* cited by examiner

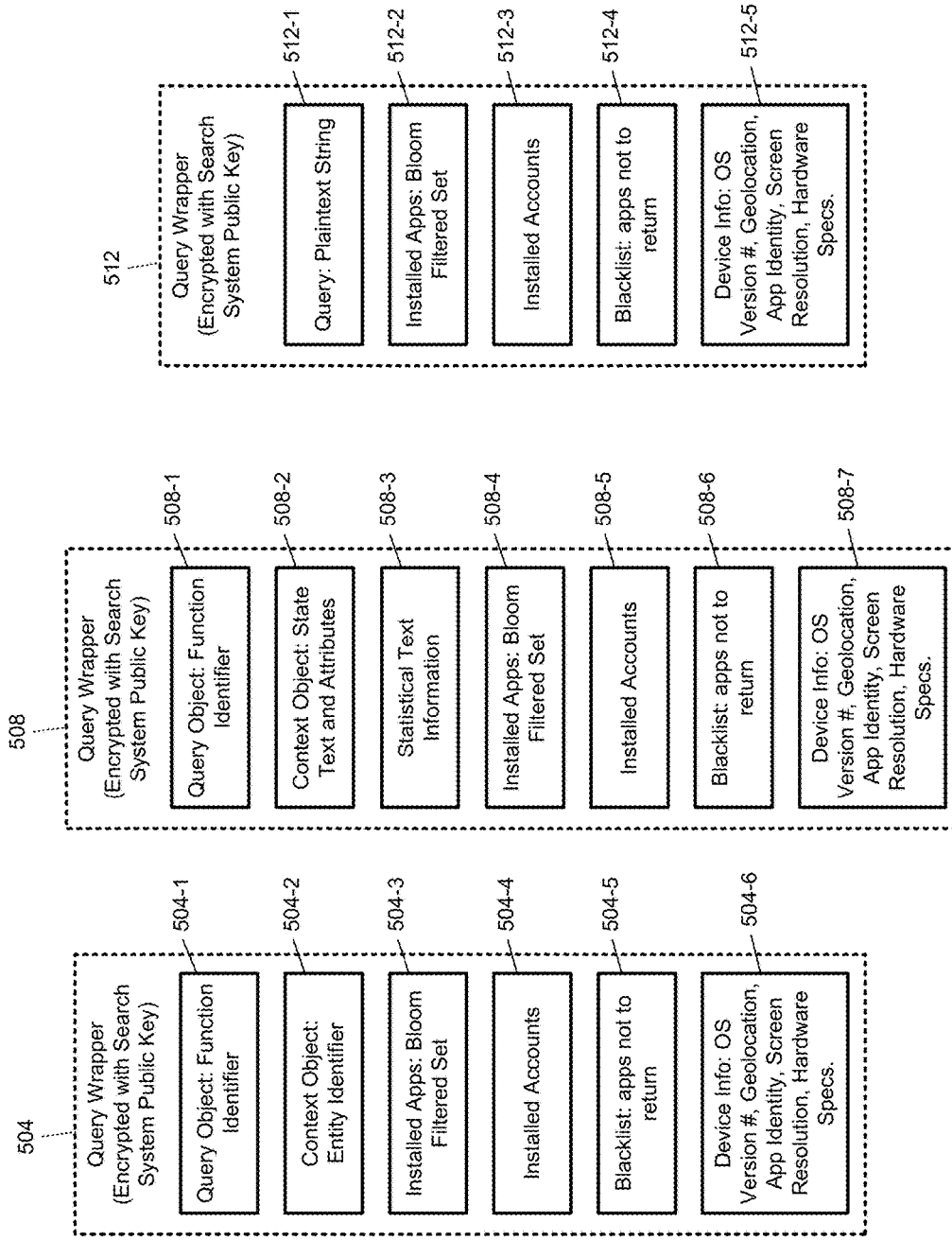

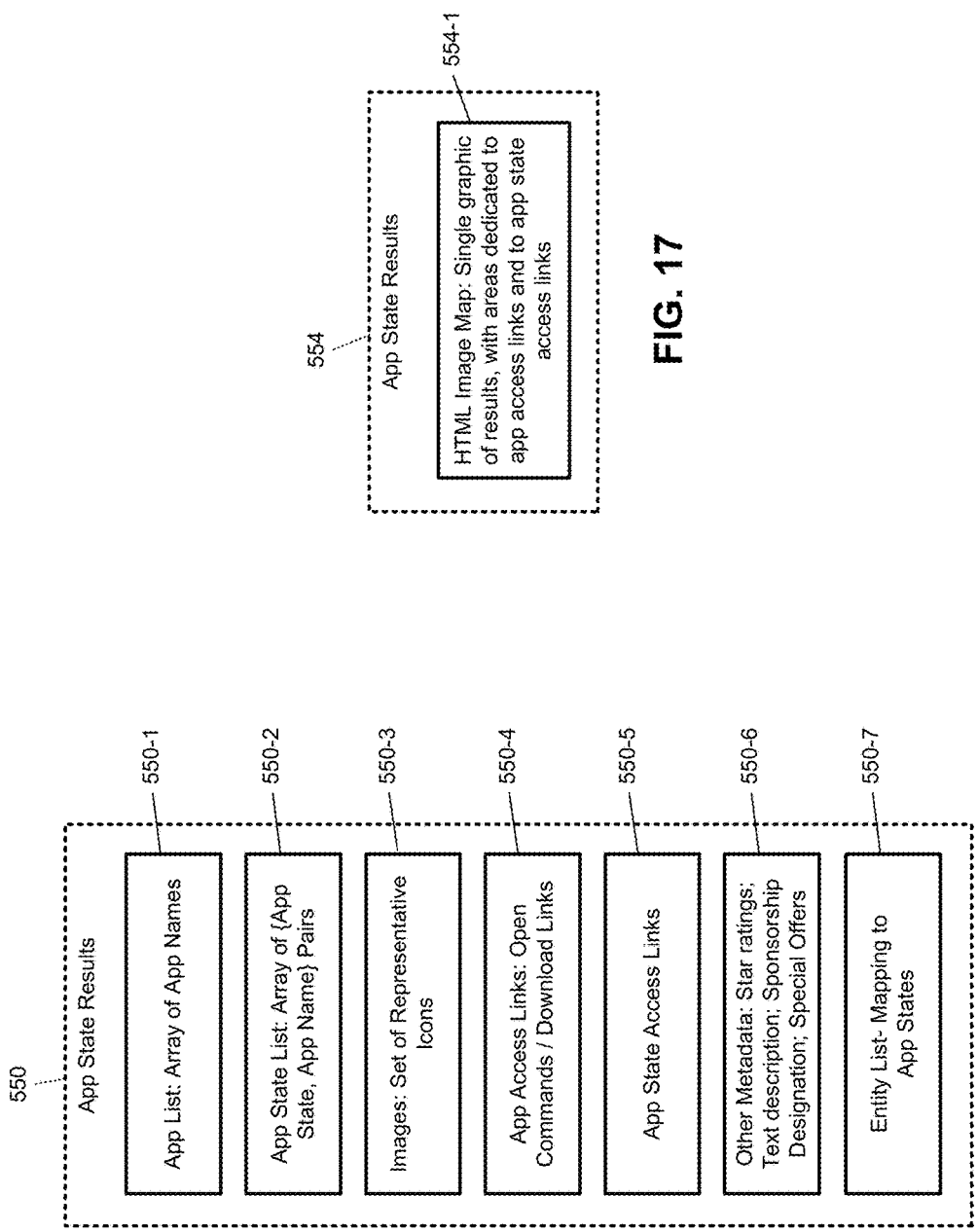

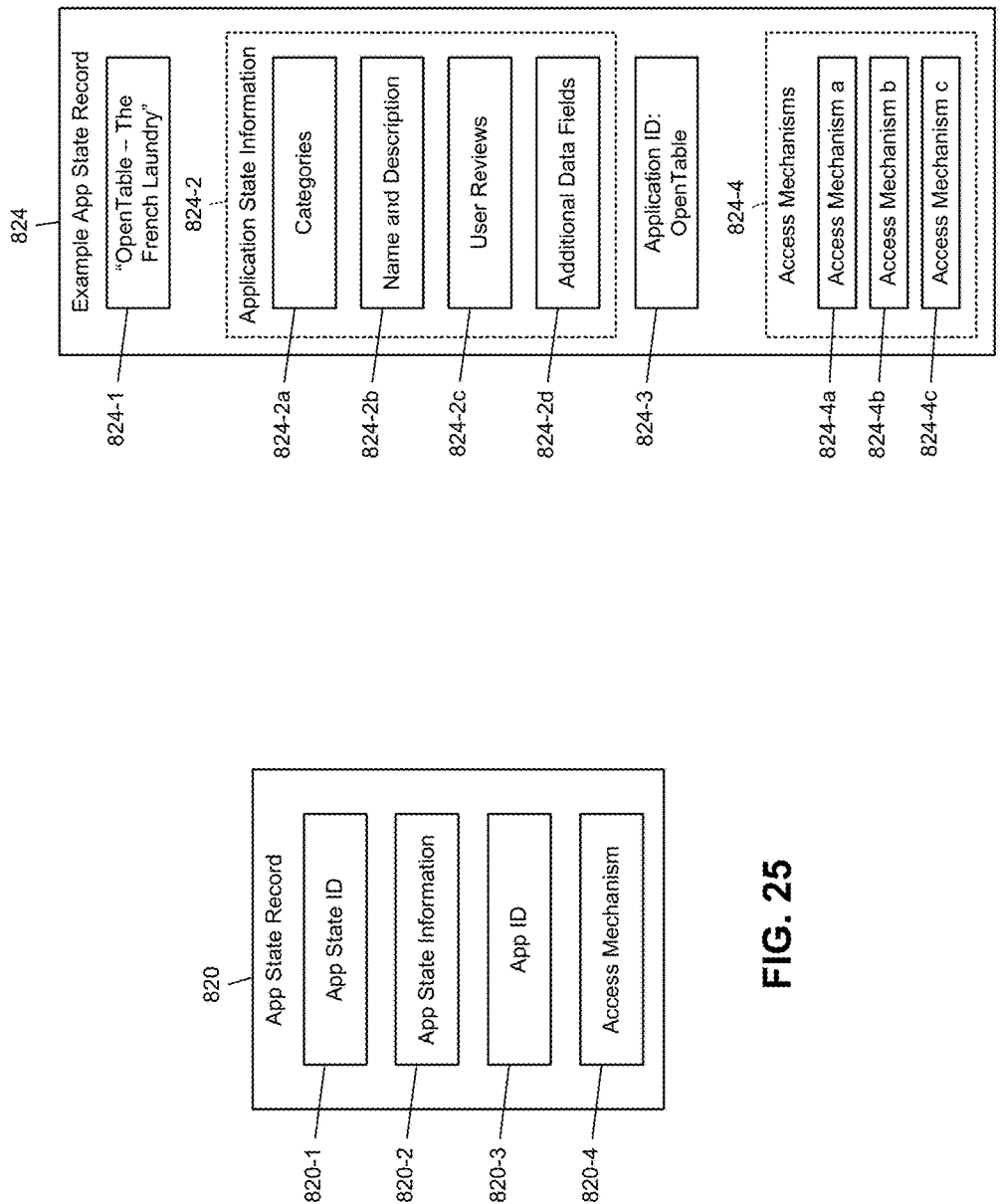

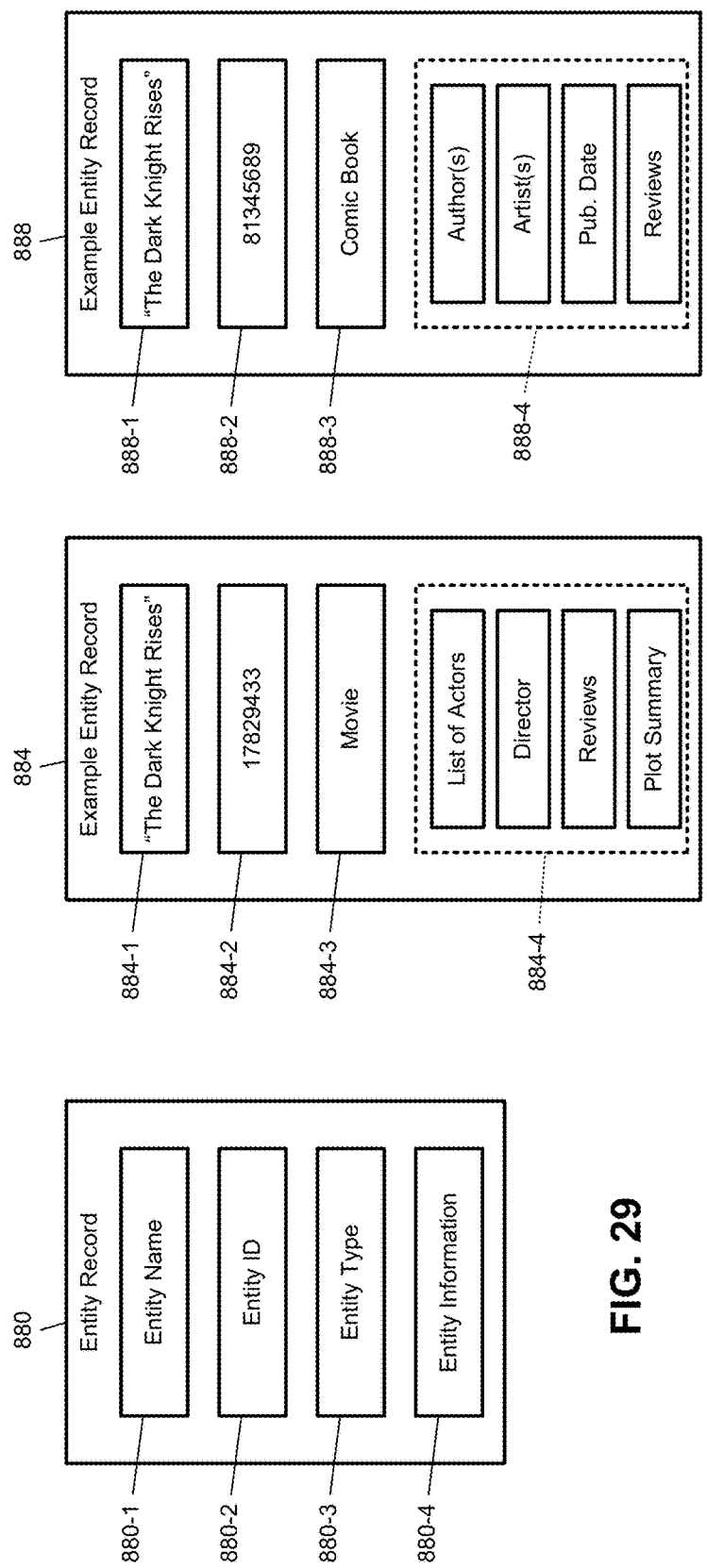

DYNAMIC AVAILABILITY-BASED INTEGRATION OF EXTERNAL FUNCTIONALITY

CROSS-REFERENCE TO RELATED APPLICATIONS

The present application is a continuation of U.S. patent application Ser. No. 14/923,226 filed on Oct. 26, 2015. The entire disclosure of the application referenced above is incorporated by reference.

FIELD

The present disclosure generally relates to development systems and methods for providing external functionality to applications.

BACKGROUND

In recent years, the use of Internet-connected devices such as smartphones has grown exponentially. The number and variety of available software applications for such devices has similarly grown by orders of magnitude. Presently, many diverse functions can be performed and many diverse sets of data can be analyzed on any given Internet-connected device. The applications that offer this functionality and data span business-oriented applications, educational applications, games, new applications, shopping applications, messaging applications, media streaming applications, social media applications, etc.

With such a wide array of available applications, many users of Internet-connected devices are not aware of the availability of applications that may perform functions and/or provide data of interest to the users. Even app developers, who generally focus on one segment of the market for applications, are unable to keep up to date on all of the applications that their users might find valuable in other segments.

SUMMARY

A system of one or more computing devices includes a user interface presented to a first application developer. The system includes a data store configured to store information identifying a plurality of functions and corresponding unique identifiers. Each of the plurality of functions corresponds to external functionality available from third party applications. The system includes an application functionality management module configured to receive a selection from the first application developer of a first function of the plurality of functions to supplement functionality of a first application under development by the first application developer. The system includes a code generation module configured to provide a first software object to the first application developer for incorporation into at least a first state of the first application. The first state includes a first user interface element associated with a first entity. The first software object includes instructions for, upon the first state being instantiated, transmitting an action query to a search system. The action query includes the corresponding unique identifier of the first function and an indication of the first entity. The first software object includes instructions for receiving an action response from the search system. The first software object includes instructions for selectively visually adapting the first user interface element in response to the action response. The first software object includes instructions for, in response to user selection of the first user interface element, displaying a plurality of items from a result set from the search system. A first item of the plurality of items includes (i) an identifier of a target application and (ii) an access mechanism for a specified state of the target application. The first software object includes instructions for, in response to user selection of the first item, actuating the access mechanism to open the target application to the specified state.

In other features, the visually adapting the first user interface element is performed in response to the action response indicating that the first function is not available for the first entity. In other features, the visually adapting the first user interface element includes rendering the first user interface element invisible. In other features, the visually adapting the first user interface element includes rendering the first user interface element in gray to indicate non-interactivity.

In other features, the first software object includes instructions for extracting text from the first state and including the extracted text in the action query as the indication of the first entity. In other features, the first software object includes instructions for transmitting a query wrapper to a search system in response to user selection of the first user interface element. A response to the query wrapper from the search system includes the result set. In other features, the action response from the search system includes the result set.

In other features, the first software object includes instructions for, in response to the user selection of the first user interface element, extracting visual attributes of the text from the first state and including the extracted visual attributes of the text in the action query. In other features, the visual attributes include at least one of vertical location of portions of the text within the first state, font size, font type, and font emphasis.

In other features, the access mechanism specifies downloading and installing the target application from a digital distribution platform prior to opening the target application. In other features, the first item includes a second access mechanism. The second access mechanism specifies opening a web edition of the target application to the specified state. In other features, the access mechanism includes a script to navigate from a default state of the target application to the specified state of the target application.

In other features, the system includes an application blocking management module configured to store a blacklist. The blacklist indicates applications and application states to exclude from the result set. In other features, the code generation module is configured to incorporate the blacklist into the first software object, such that the first software object further includes instructions for at least one of removing application states matching the blacklist from the result set received from the search system, providing the blacklist to the search system as part of the action query, and preventing display of application states from the result set that match the blacklist.

A method includes presenting a user interface to a first application developer. The method includes storing, in a data store, information identifying a plurality of functions and corresponding unique identifiers. Each of the plurality of functions corresponds to external functionality available from third party applications. The method includes receiving a selection from the first application developer of a first function of the plurality of functions to supplement functionality of a first application under development by the first application developer. The method includes generating a first software object to the first application developer for incorporation into at least a first state of the first application. The first state includes a first user interface element associated with a first entity. The first software object includes instructions for, upon the first state being instantiated, transmitting an action query to a search system. The action query includes the corresponding unique identifier of the first function and an indication of the first entity. The first software object includes instructions for receiving an action response from the search system. The first software object includes instructions for selectively visually adapting the first user interface element in response to the action response. The first software object includes instructions for, in response to user selection of the first user interface element, displaying a plurality of items from a result set from the search system. A first item of the plurality of items includes (i) an identifier of a target application and (ii) an access mechanism for a specified state of the target application. The first software object includes instructions for, in response to user selection of the first item, actuating the access mechanism to open the target application to the specified state.

In other features, the visually adapting the first user interface element is performed in response to the action response indicating that the first function is not available for the first entity. In other features, the visually adapting the first user interface element includes rendering the first user interface element invisible. In other features, the visually adapting the first user interface element includes rendering the first user interface element in gray to indicate non-interactivity. In other features, the first software object includes instructions for extracting text from the first state and including the extracted text in the action query as the indication of the first entity.

In other features, the first software object includes instructions for transmitting a query wrapper to a search system in response to user selection of the first user interface element. A response to the query wrapper from the search system includes the result set. In other features, the action response from the search system includes the result set. In other features, the first software object includes instructions for, in response to the user selection of the first user interface element, extracting visual attributes of the text from the first state and including the extracted visual attributes of the text in the action query. In other features, the visual attributes include at least one of vertical location of portions of the text within the first state, font size, font type, and font emphasis.

In other features, the access mechanism specifies downloading and installing the target application from a digital distribution platform prior to opening the target application. In other features, the first item includes a second access mechanism. The second access mechanism specifies opening a web edition of the target application to the specified state. In other features, the access mechanism includes a script to navigate from a default state of the target application to the specified state of the target application.

In other features, the method includes storing a blacklist. The blacklist indicates applications and application states to exclude from the result set. In other features, generating the first software object includes incorporating the blacklist such that the first software object further includes instructions for at least one of removing application states matching the blacklist from the result set received from the search system, providing the blacklist to the search system as part of the action query, and preventing display of application states from the result set that match the blacklist.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

FIG. 13, FIG. 14, and FIG. 15 each depict example contents of a query wrapper sent to a search system.

FIG. 16 and FIG. 17 each depict example contents of app state results messages returned in response to a query wrapper from a search system.

FIG. 25 is a graphical representation of an example application state record format.

FIG. 26 is a graphical representation of an example application state record according to the format of FIG. 25.

FIG. 29 is a graphical representation of an example entity record format.

FIG. 30 and FIG. 31 are each a graphical representation of an example entity record according to the format of FIG. 29.

In the drawings, reference numbers may be reused to identify similar and/or identical elements.

DETAILED DESCRIPTION

Introduction

Figure 1:
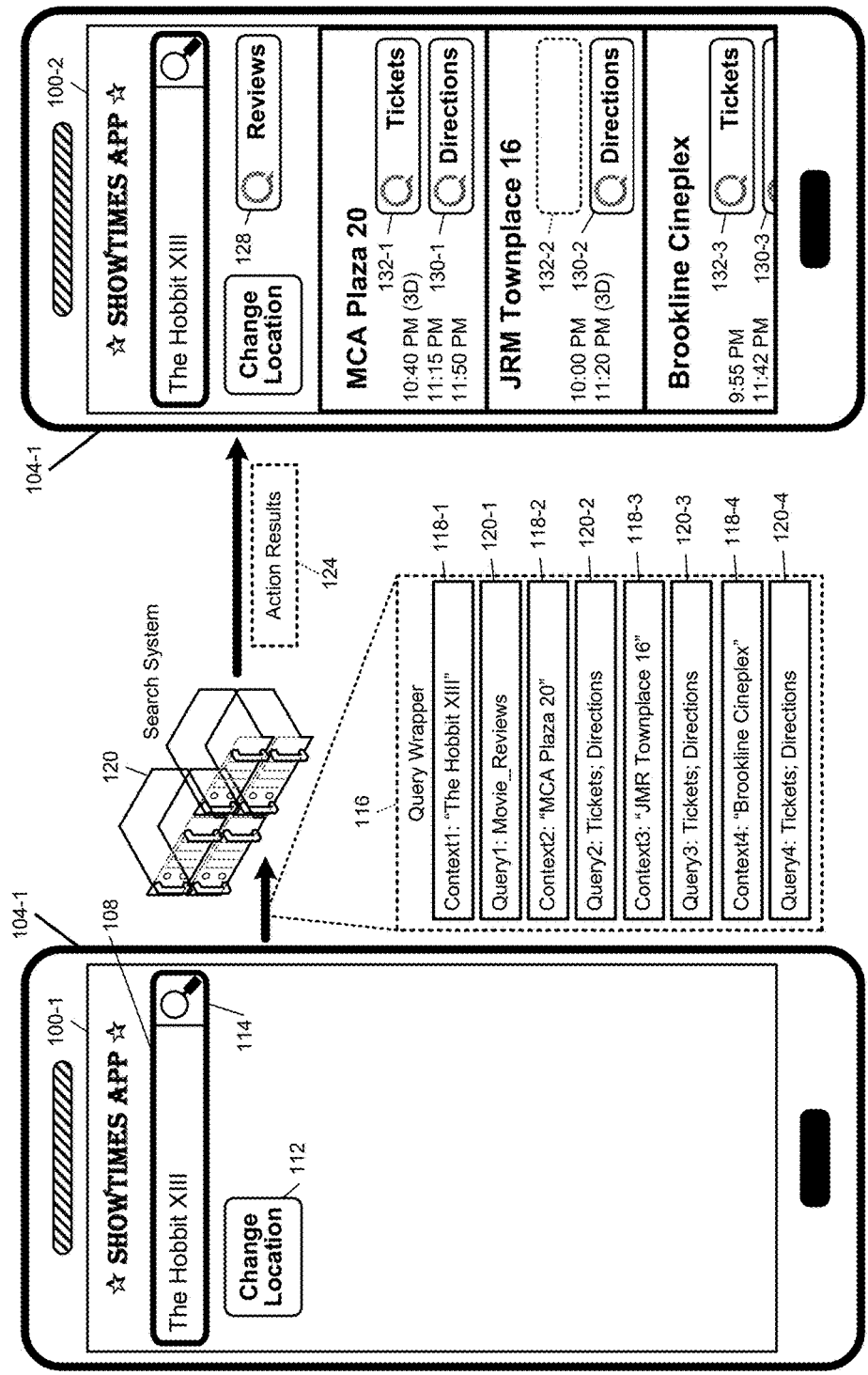
FIG. 1 is a simplified functional block diagram with graphical user interface examples according to the principles of the present disclosure.

A developer of an application (referred to interchangeably as an app) generally focuses on providing a good user experience for a limited number of functions. For example, an app developer may focus on providing accurate and intuitively-presented movie showtimes but may not invest effort in providing other related functionality, such as directions to movie theaters, dining options near the movie theaters, and/or reviews of the movies.

While an app developer would generally prefer that a user remain within their own app, additional functionality, and therefore an improved user experience, may be provided by connecting to other apps. Connecting to other apps may provide a better user experience than attempting to replicate the functionality within the developer's own app. For example, if the developer is skilled at presenting movie showtimes and possesses valuable data and processing algorithms related to showtimes, the developer may not have expertise or unique content related to movie reviews. The developer can therefore rely on other apps whose focus is directed to movie reviews. For some functionality, such as GPS-based directions, a massive investment in mapping data and routing algorithms is required. As a result, few developers attempt to replicate mapping functionality within their app.

In order to access the functionality of another app, a developer may hard code a reference to that app when writing their code. In some circumstances, it is virtually guaranteed that an operating system will include a certain app. For example, a developer may reasonably expect that Google Maps will be available on an Android smartphone, although there are notable exceptions to this general rule, especially outside of the United States.

For most other categories of apps, such as movie review apps or restaurant review apps, there is no guarantee that any particular app will be present. Therefore, hard coding access to other specific apps is an exercise in guesswork. Also, the constant evolution of the app ecosystem means that the most popular, the most widely installed, and the most useful apps in any category may be different and may change with time.

For certain actions, a request may be handled by the operating system. For example, to map a location or to generate directions to a destination, a request can be passed to the operating system. The operating system may present the user with a list of installed apps to service that request. The operating system may allow the user to choose one of the apps as a default and, once a default is selected, the average user may never revisit that choice. Certain operating systems may not present a choice for certain requests, instead passing the request to a default app or service unless a specific configuration change is made by the user.

For all these reasons, the ability of an app developer to connect to other apps that would provide valuable functionality to the app developer's users is limited and difficult to implement. There is also no systematic way for developers to enter business relationships with each other. For example, an ad hoc arrangement may be possible where the developer of a movie reviews app compensates the developer of a movie showtimes app for each time that the movie reviews app is installed as a result of an advertisement or suggestion in the movie showtimes app.

The present disclosure presents a system where an app developer can quickly and easily add a wide variety of external functionality to an app. Instead of hard coding for specific apps, the present disclosure allows the developer to define a function of interest and, when a user expresses a desire to activate that function, a search system provides one or more apps that provide the desired functionality. These app results may include apps already installed and may also include apps not yet installed. For apps that are not yet installed, a mechanism may be provided for easy installation of the app.

For a streamlined user experience, the developer may link a user directly to a specific state within a specific app. For example, the developer of a movie showtimes app may integrate movie reviews as external functionality. Instead of simply linking to the front page (or, default state or home state) of a movie reviews app, the developer may link the user directly to the state within the movie reviews app where review(s) for the presently-displayed movie are shown.

The developer can identify a user's interest in both an entity and a function and provide direct links to app states that offer the specified function with respect to the specified entity. In other words, when the developer's app is displaying showtimes for a first movie (specified entity) and the user of the developer's app selects a reviews (specified function) button provided by the present disclosure, the results may include direct links to states of apps that show movie reviews (the specified function) for the first movie (the specified entity).

The developer may explicitly specify the function and the entity to the search system as separate items of data. In other implementations, the developer may provide a text string to the search system that includes both the function and the entity. For example only, the provided string may include a concatenation of the specified function and the specified entity.

The name used for the specified entity may be the name used internally by the developer or may be a name recognized or dictated by the search system. Similarly, the specified function may use the developer's language to describe the desired functionality or may include a specific textual or other identifier that corresponds to a specific function recognized by the search system.

Dynamic User Interface Adaptation

In some circumstances, when a user attempts to invoke certain functionality for an entity, there may be no results returned by the search system. For example, the user may be looking for movie reviews of an obscure movie that did not see wide distribution. As a result, the search system may not be aware of any states of an application that would provide movie reviews for the specified movie (and they may not even exist).

In situations like this, the user experience may be improved by indicating to the user that the functionality is not available. An adaptive user interface may visibly alter a user interface element corresponding to this external functionality to indicate its unavailability. For example, a button used to invoke external functionality can be removed from the display if the search system would not be able to provide that functionality.

As another example, a button could be "grayed out" (that is, removing any color) so that the user will recognize that this button is inoperative. In addition to "graying out" the button, any feedback for interaction with the button may be disabled. For example, if there is normally a three-dimensional effect producing apparent movement of the button upon actuation (such as clicking or tapping), this effect may be suppressed. By leaving the user interface element visible yet visually identifying it as unavailable, the user may recognize that the functionality may sometimes be available, but is simply not available for this particular entity.

In various implementations, the developer may add multiple types of external functionality to a state (or, screen) of the app under development. Each type of integrated functionality may correspond to a respective button in the layout for the state. For example only, if four types of external functionality have been integrated into a state, an array of four corresponding buttons may be included within the state.

For functions that are not available for a given entity, the corresponding buttons may be removed to conserve screen real estate. Removal/invisibility of buttons may be especially useful when functions are potentially mutually exclusive. For example, movies are generally not both playing in theatres and available for legal streaming. Therefore, external functionality for streaming viewing of a movie and buying movie tickets for a movie will generally not be available simultaneously.

The developer, however, can include both types of external functionality in every state of their app related to movies and rely on the search system to identify which functions are available for that entity. This may also automatically accommodate uncommon circumstances, such as a movie being available for streaming at the same time the movie is playing in a second-run theatre.

In other implementations, instead of having an array of buttons—one for each type of external functionality—a single external functionality button or other user interface element may be placed in the state by the developer. For example, a single "more functionality" button may open a pop-up window providing a list of actions specified by the app developer.

These actions may have been filtered by the search system based on their availability for the given state. For example, when the developer has identified four functions to be integrated with a state and one of those actions (or, functions) is not available for the current state, the pop-up window would only show the three available actions. Once the user selects one of the actions, results such as application states relevant to the action are provided to the user.

For example only, a search may be conducted with the search system based on the selected action. In other implementations, the search system may have already provided results to the user device while determining which functions were available for the specific entity. Identifying unavailability of actions to a user may permit the developer of an app to include more external functionality without the risk that irrelevant or unavailable functionality will confuse or distract the user.

The query to the search system may be executed in parallel with one or more other queries the developer's app may perform in order to render a state. In various implementations, the developer's app may query a server of the developer to obtain data to populate the state. For example, a movie showtimes app would generally not maintain a local database of all possible showtimes for all possible movies. Instead, the movie showtimes app would likely consult a server to obtain showtimes based on user interest. While the showtimes are being retrieved from the server, a search system according to the present disclosure can identify which action or actions are available for the entity identified within the application state.

While identifying whether one or more actions is available, the search system may also return results (including app state results) to the developer's app. This form of pre-fetching allows results to be shown to a user as soon as the user accesses the external functionality user interface element.

Monetization

Further, a monetization system is integrated so that a third-party developer can promote their app and compensate the first app developer for activity driven by the first app developer. For example, compensation may be based on one or more of impressions (a user seeing the sponsored app), clicks (a user clicking, touching, or otherwise selecting the sponsored app being presented by the first app developer), cost per action or engagement (advertiser determines the action or engagement they are willing to pay for), and installs (when the sponsored app had not previously been installed and, as a result of the first app developer, the sponsored app being installed by a user). A portion of the revenue received from an advertising developer may be retained by the monetization system and the remainder is distributed to the first app developer.

A developer may decide to promote their app even if they do not take advantage of the external functionality provided by the present disclosure. Not every advertiser (or, sponsor) will be a developer. Because state-specific links are provided, an advertiser may desire to promote their product or business (such as a restaurant) as a sponsored state within another app (such as a restaurant reviews app).

The advertiser may commit to paying a specified amount when their business or product is one of the specified states. The advertiser may pay to promote their business or product, such as by making a visual enhancement or moving the result further up in the results list. In addition, as described in more detail below, the advertiser may specify keywords or competitor establishments or products that will lead to the advertiser's states being displayed.

To allow the first developer to harness the functionality of the rest of the app ecosystem with a minimal amount of extra coding, a developer portal is offered to developers. The developer portal offers pre-written code that a developer can incorporate into their app with little to no custom coding. The pre-written code may be offered as part of a software development kit (SDK), which may be implemented as a plug-in for an integrated development environment, or as one or more libraries or packages.

Included with the code (referred to below for simplicity as an SDK library) or provided separately are user interface elements, such as logos, fonts, and graphics. The first app developer may add a button to one of the states (or, screens) of the app and display a logo from the developer portal on the face of the button. The action performed by the button (querying the search system and displaying results) is simply provided by a call to the SDK library. The software development kit may even automate creation and placement of a button or other user interface element and may automatically associate the button with corresponding code, such as a routine or function contained within the SDK library.

The developer portal may allow the first developer to make choices relating to monetization, such as whether and how sponsored apps should be presented to a user, and how to be compensated for the display, access, or installation of sponsored apps. The first developer may also be able to select apps or classes of apps not to present to the user. For example, the developer may not want to present a third-party app that is a competitor of the first developer or that duplicates some of the functionality of the first developer's own app.

The settings chosen by the developer may be stored local to the developer and integrated into the app itself or may be stored by the developer portal and shared with the search system. As mentioned above, when an end user of the developer's app clicks on a button enabled by the developer portal, a query will be sent to a search system, which returns app state results.

The returned results can be displayed to the user by code included within the libraries or packages provided by the developer portal. The results may be presented by themselves in a full screen or as only part of the screen real estate of the originating app. In some implementations, the developer is allowed to develop their own custom presentation layout for how the returned apps will be displayed. In other implementations, the display format may be fixed by the provider of the development portal. Although the provider of the development portal and the provider of the search system will be treated as a single entity below for ease of explanation, the developer portal and the search system may be operated by independent organizations.

User Interface Examples

In FIG. 1, an unsophisticated Showtimes App 100 is shown running on a user device, such as smartphone 104. A first state of the Showtimes App 100 is shown at 100-1, and the corresponding reference numeral for the smartphone 104 is 104-1. In the simple interface of the Showtimes App 100-1, a search bar 108 identifies the movie for which showtimes are being displayed (a fictional "The Hobbit XIII") and allows the user to search for a different movie. The Showtimes App 100 may search for theaters around the present location of the smartphone 104 but may allow for the user to change the specified location using a "Change Location" button 112.

When a user of the Showtimes App 100 selects (such as by tapping their finger on a magnifying glass icon 114) the entity to be searched, a query wrapper 116 is sent to a search system 120. In various implementations, the Showtimes App 100 may first determine theaters that are showing the selected entity ("The Hobbit XIII") before sending the query wrapper 116. In other implementations, the Showtimes App 100 will send the movie entity in the query wrapper 116 and optionally send a further query wrapper including indications of the movie theatres where the movie entity is being shown.

In FIG. 1, the Showtimes App 100 identifies movie theatres and then transmits the query wrapper 116. Therefore, the query wrapper 116 includes context objects 118-1, 118-2, 118-3, and 118-4 for the movie entity and three movie theatre entities, respectively. Corresponding to the context objects 118 are query objects 120-1, 120-2, 120-3, and 120-4, respectively.

The query object 120-1 for the movie entity specifies a function/action of Movie_Reviews. Although shown in human readable text, the query object for Movie_Reviews may simply be a numerical value dictated by the search system 120 and known to the Showtimes App 100. The context objects 118-2, 118-3, and 118-4 correspond to fictional theatres "MCA Plaza 20," "JRM Townplace 16," and "Brookline Cineplex," respectively. The query objects 120-2, 120-3, and 120-4 for the movie theatre entities each include a pair of actions: tickets and directions.

As described in more detail below, the search system 120 identifies actions from the query objects that are available for their corresponding context objects. These action results 124 are provided back to the Showtimes App 100. In the state 100-2 of the Showtimes App 100, corresponding to reference numeral 104-2 of the smartphone 104, user interface elements are displayed based on the action results 124.

Because the search system 120 determines that a Movie_Reviews action was available for "The Hobbit XIII," a reviews button 128 is displayed. The button 128 may be labeled with an icon or a logo of the supplier of a developer portal or an operator of the search system 120. For example only, a stylized "Q" may be displayed, which is associated with Quixey, Inc., of Mountain View, Calif.

Because the search system 120 determines that a directions action was available for each of the movie theatre entities, directions buttons 130-1, 130-2, and 130-3 (the final button of which may be visible by scrolling the display) allow the user to obtain directions to the movie theatre.

Meanwhile, tickets actions are indicated by buttons 132-1 and 132-3. A tickets button 132-2 or "JRM Townplace 16" is omitted because the search system 120 was not able to identify any application states that could perform the action (buy tickets) for the entity ("JRM Townplace 16").

In various implementations, the action query may provide multiple entities along with the "tickets" function designation: for example, "The Hobbit XIII" and "MCA Plaza 20." With both entities, the search system 120 can indicate whether an action is available that allows tickets to be purchased for "MCA Plaza 20" for the specific movie "The Hobbit XIII." This may require the search system 120 to identify an action template (also known as a function template) that has two parameters: a movie identifier and a movie theatre identifier.

The absent button 132-2 may be completely invisible or may be shown with an outline, as drawn in FIG. 1. In other implementations, the button 132-2 may be shown grayed out. When the button 132-2 is invisible, the layout of the results may change. For example, the directions button 130-2 may move up to take the place of the absent button 132-2.

When the context object is a string, which may not exactly match the record in the search system 120, the search system 120 may attempt to identify entities that best match the provided string. Entities that are a reasonable match for the string but cannot be used for the action specified in the query object are excluded. For example, if there were a graphic novel entitled "The Hobbit XIII," it is likely that a Movie_Reviews action would not be available for this entity. Therefore, even though the name of the entity may be a close match, the graphic novel entity would be excluded.

Figure 2:
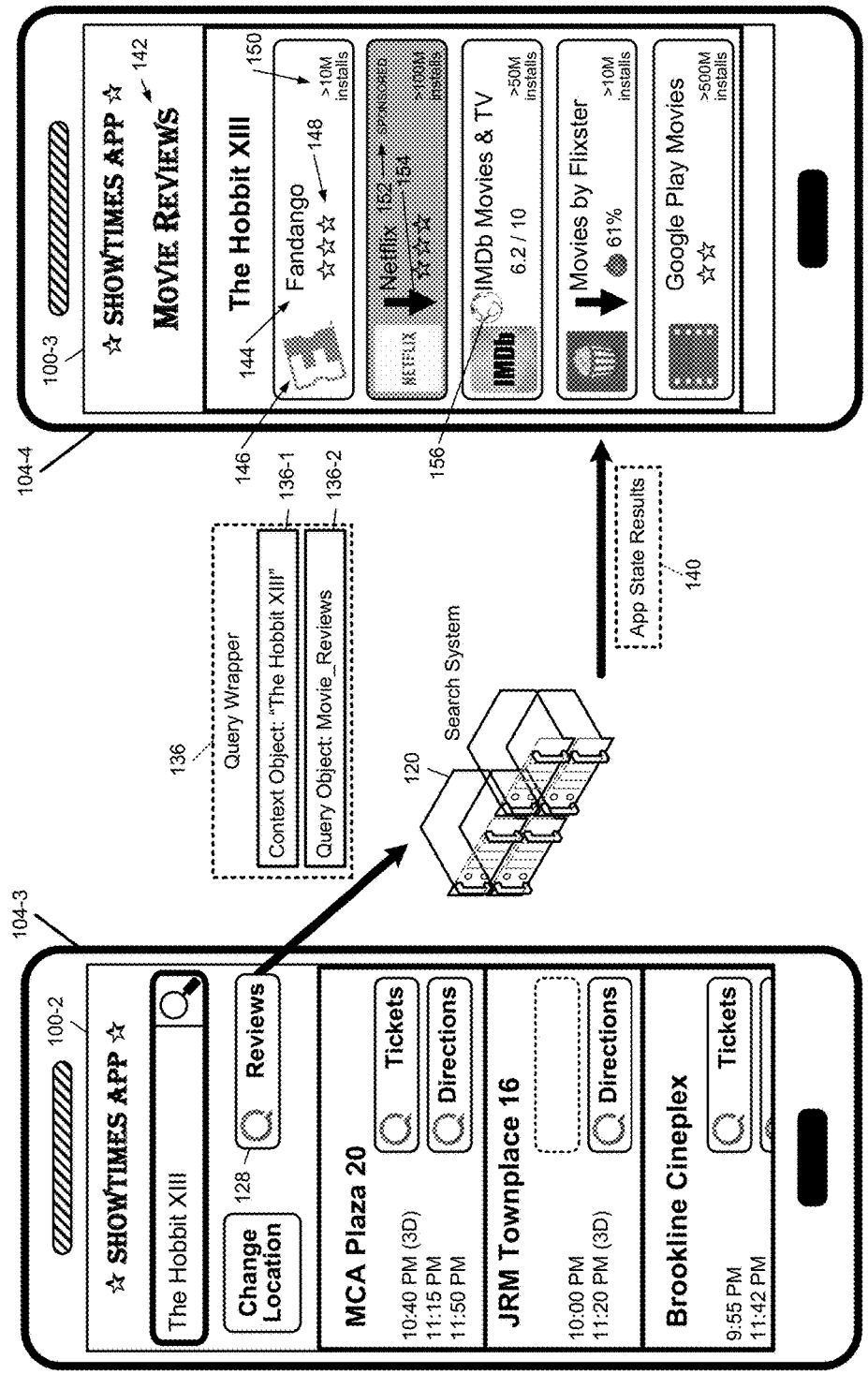
FIG. 2 includes further graphical user interface examples consistent with FIG. 1.

In FIG. 2, if the user selects the reviews button 128, application states that can provide reviews of "The Hobbit XIII" are displayed, either in the Showtimes App 100 or in some external application. In some implementations, the search system 120 returns application state results 140 at the same time it is returning actions results 124.

In other implementations, the search system 120 is queried once again using the query wrapper 136 only after the user actuates the reviews button 128. The query wrapper 136 includes a context object for "The Hobbit XIII" 136-1 and a query object of Movie_Reviews 136-2. In response to the query wrapper 136, the search system 120 doesn't just identify whether there are application states that perform the specified function for the specified entity, but actually provides information about those application states in the application state results 140.

For example, the application states results 140 may be presented as deep view cards (DVCs). A DVC for an application or a state of an application shows additional information, not just the identification of the application or application state. For example, the information may include a title of the application state or a description of the application state, which may be a snippet of text from the application state. Other metadata may be provided from the application state, including images, location, number of reviews, average review, and status indicators. For example, a status indicator of "open now" or "closed" may be applied to a business depending on whether the current time is within the operating hours of the business.

Some DVCs may emphasize information that led to the DVC being selected as a search result. For example, text within the DVC that matches a user's query may be shown in bold or italics. The DVC may also incorporate elements that allow direct actions, such as the ability to immediately call an establishment or to transition directly to a mapping application to get navigation directions to the establishment. Other interactions with the DVC (such as tapping or clicking any other area of the DVC) may take the user to the indicated state or application. As described in more detail below, this may be accomplished by opening the relevant app or, if the app is not installed, opening a website related to the desired application state. In other implementations, an app that is not installed may be downloaded, installed, and then executed in order to reach the desired application state.

In other words, a DVC includes an indication of the application or state as well as additional content from the application or state itself. The additional content allows the user to make a more informed choice about which result to choose, and may even allow the user to directly perform an action without having to navigate to the application state. If the action the user wants to take is to obtain information, in some circumstances the DVC itself may provide the necessary information.

A graphical presentation of the app state results 140 is displayed in a state 100-3 of the Showtimes App 100, and the corresponding reference numeral for the smartphone 104 is 104-4. The graphical results may be displayed in a portion of the Showtimes App 100, and the graphical results may appear to hover (not shown) over native content of the Showtimes App 100, such as by restricting the graphical results to a portion of the Showtimes App 100, leaving a border of native content of the Showtimes App 100.

In addition, the graphical results may be shown on a semi-transparent background so that the native content of the Showtimes App 100 (movie showtimes) remains at least faintly visible. In various implementations, the results may slide in from one side or from the top or bottom, suggesting to the user that the results can be dismissed by swiping in an opposite direction.

The graphical results may be presented under a header 142. In this example, each of the results corresponds to the entity "The Hobbit XIII." A first result corresponds to a FANDANGO application 144. Associated with the Fandango application 144 is an icon 146, a rating 148 for "The Hobbit XIII" according to the Fandango application, and a metric 150, such as the number of installs of the corresponding app.

When the user clicks within the rounded rectangle surrounding the Fandango application 144, the SDK library within the Showtimes App 100 will transition to the "Fandango" application and specifically to a state showing movie reviews for "The Hobbit XIII." Another result is a sponsored result, as indicated by a text tag 152 as well as shading. The sponsored result, the NETFLIX app, is not yet installed and therefore has an indication (in this case, an icon 154) that the application must first be downloaded and installed.

Alternatively, an "(Installed)" parenthetical could be used with apps, such as Fandango, that are already installed on the smartphone 104. Other text, such as "Open," may instead be used when the app is already installed. Apps not yet installed may be labelled with "Download" or "Install" labels. Equivalently, icons or other visual cues may distinguish between apps that can simply be opened (including native apps and, as described in more detail below, web apps) or that first need to be installed.

Selecting the NETFLIX application result may trigger the opening of a digital distribution platform in either a web browser or a dedicated app, such as the native Netflix app available from the Google PLAY STORE digital distribution platform. The identity of the app to be downloaded is provided to the digital distribution platform so that the user is immediately presented with the ability to download the desired app. In some implementations, the download may begin immediately, and the user may be given the choice of approving installation. Upon completion of installation, the SDK library may automatically navigate to the desired state of the Netflix app—that is, the state for reviews of "The Hobbit XIII."

Other data shown for each result may include snippets of text (such as the first few words of a review), an image (such as a screenshot of the state), a reliability metric (such as number of user reviews), a freshness metric (such as most recent observed update to the state), etc.

Sponsored apps can be highlighted in a way that is perceptible to the user, including increasing the font size, using different colors, adding a graphic or text sponsorship label, etc. In some implementations, the sponsorship may not be displayed to the user, and may simply cause the sponsored app to be moved up in the rankings. Sponsored apps may be grouped together and labeled with a "Sponsored Apps" title (not shown). In various implementations, the sponsored apps may be shown at the top of the list, at the bottom of the list, in the middle or the list, or interspersed throughout the list.

As described in more detail below, apps may also be accessed through intermediary software, such as a web browser. These apps, such as HTML5 apps, may be shown with an open action and may be identified as being a web-based app using an icon or text. For example, a globe icon is shown at 156 to indicate that the IMDB MOVIES & TV app will be opened in a web browser. As another example, a text label (not shown) could be included, such as "Open In Browser" or "Open On The Web."

Figure 3:
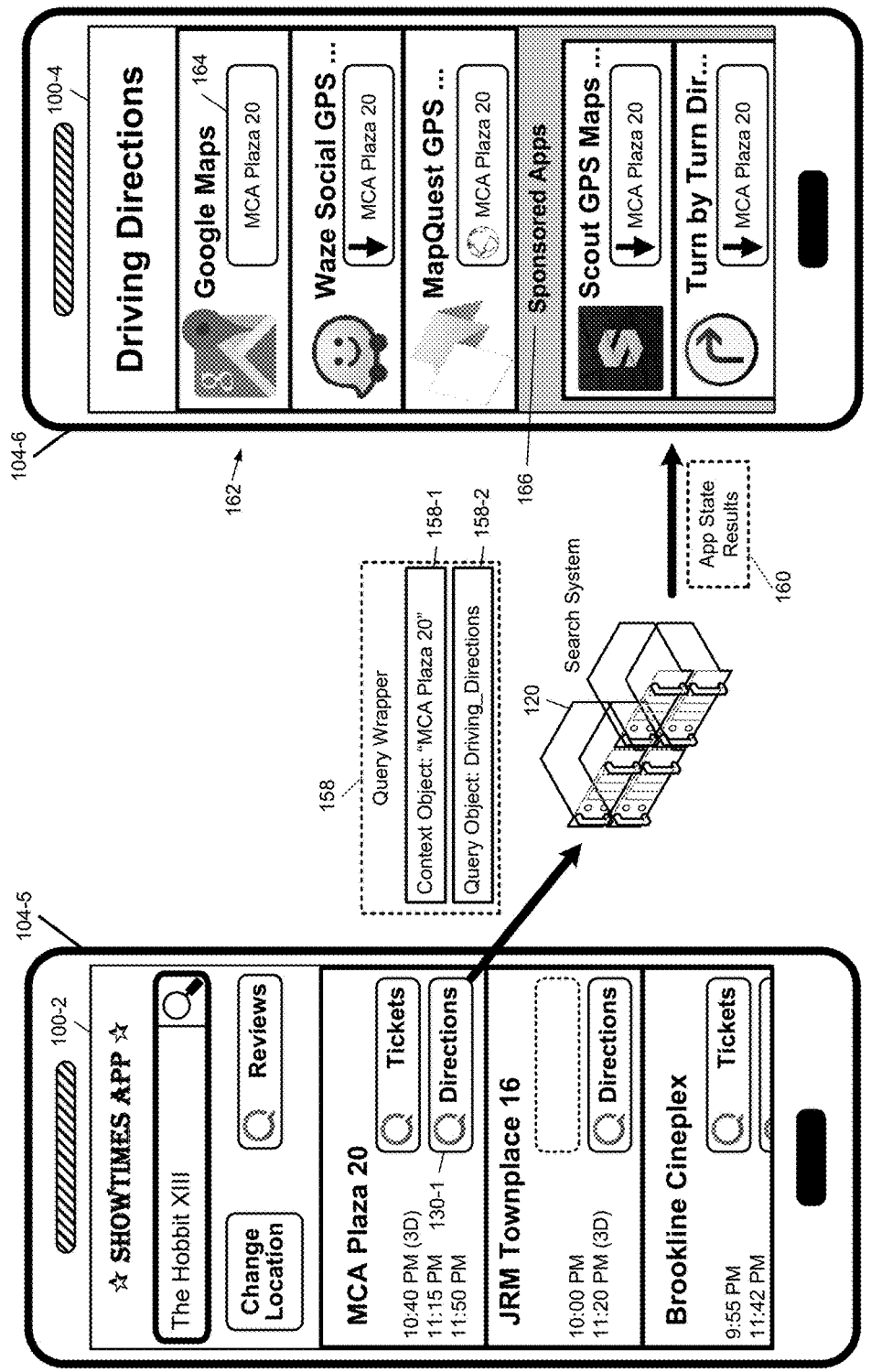
FIG. 3 includes further graphical user interface examples consistent with FIG. 1 and FIG. 2, but resulting from a different user interaction.

In FIG. 3, the user selects the directions button 130-1 for "MCA Plaza 20." In response to the directions button 130-1 being actuated, a query wrapper 158 is sent to the search system 120. The query wrapper 158 includes a context object 158-1 for "MCA Plaza 20" and a query object 158-2 for Driving_Directions.

The search system 120 returns app state results 160 to the Showtimes App 100. The app state results 160 are displayed in the state 100-4 of the Showtimes App 100, which corresponds to reference numeral 104-6 in FIG. 3. For example, a GOOGLE MAPS mapping application result 162 includes a button 164 corresponding to a state of the Google Maps application at which directions for the "MCA Plaza 20" will be shown.

In various implementations, if other portions of the Google Maps result 162 other than the button 164 are selected (such as by clicking or touching), the Google Maps application will open to the home or default state instead of directly to the state corresponding to "MCA Plaza 20." In FIG. 3, a Sponsored Apps area 166 is designated and includes sponsored applications states, which may not have been included in organic results or may initially have been lower down the list of organic results.

Figure 4:
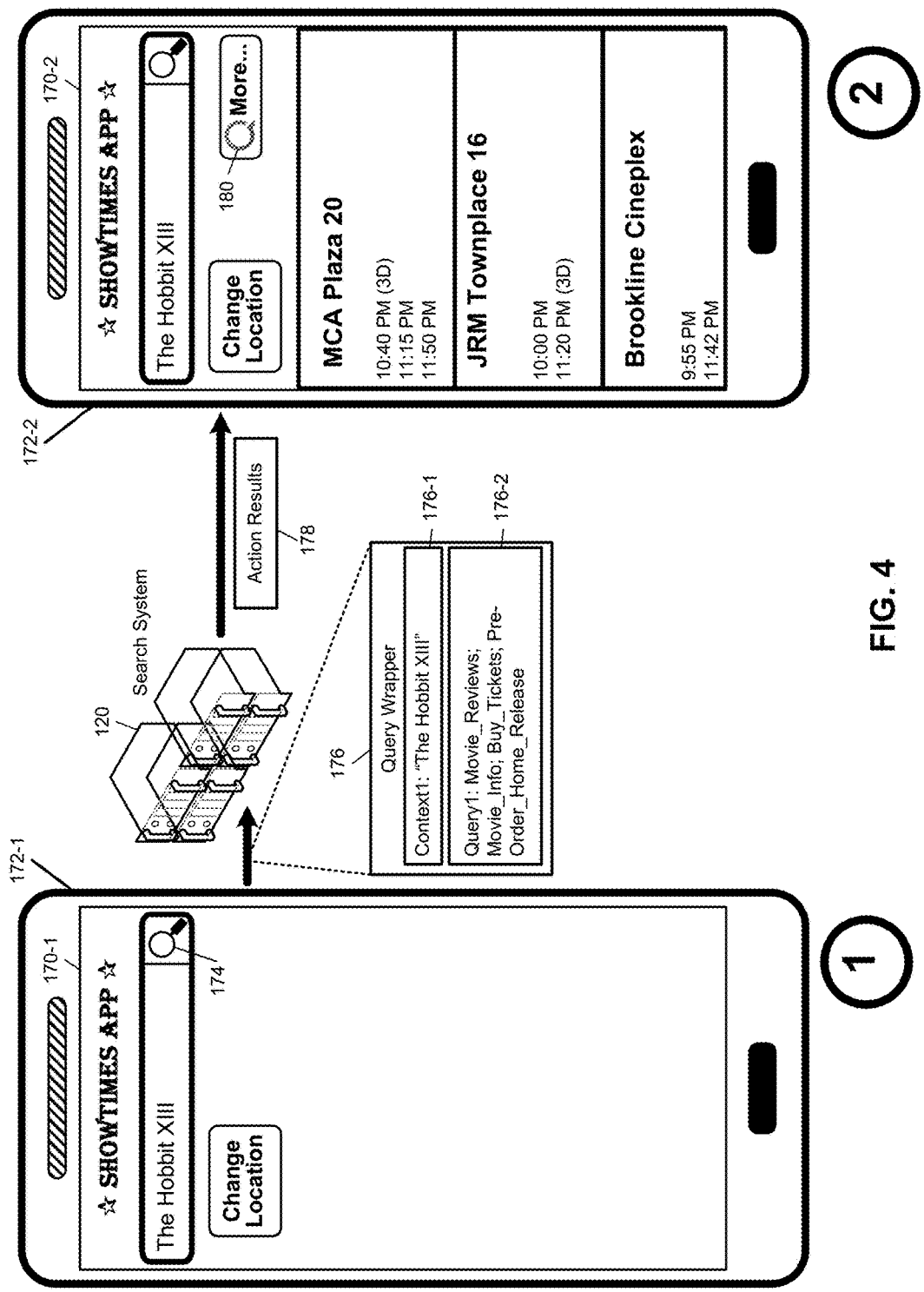
FIG. 4 is a simplified functional block diagram and example of graphical user interfaces according to another implementation of the principles of the present disclosure.

In FIG. 4, another example Showtimes App 170 includes a first state 170-1 shown in a smartphone at 172-1. In the Showtimes App 170, the developer has identified multiple actions corresponding to the movie entity (in this case, "The Hobbit XIII"). When a search is conducted, such as by actuating a magnifying glass icon 174, a query wrapper 176 is sent to the search system 120. The query wrapper 176 includes a context object 176-1 of "The Hobbit XIII." A query object 176-2 lists four actions: Movie_Reviews; Movie_Info; Buy_Tickets; Pre-Order_Home_Release.

The search system 120 identifies whether any application states provide the requested functionality with respect to the specified entity. The results of this inquiry are provided as action results 178 to the Showtimes App 170. The state 170-2 of the Showtimes App 170, which is shown with respect to representation 172-2 of the smartphone 172 lists search results from the Showtimes App 170 and also includes a multi-function button 180. The multi-function button 180 may be labeled with images and/or text, such as "More . . . " to indicate that more actions may be performed than are shown in the rest of the state.

Figure 5:
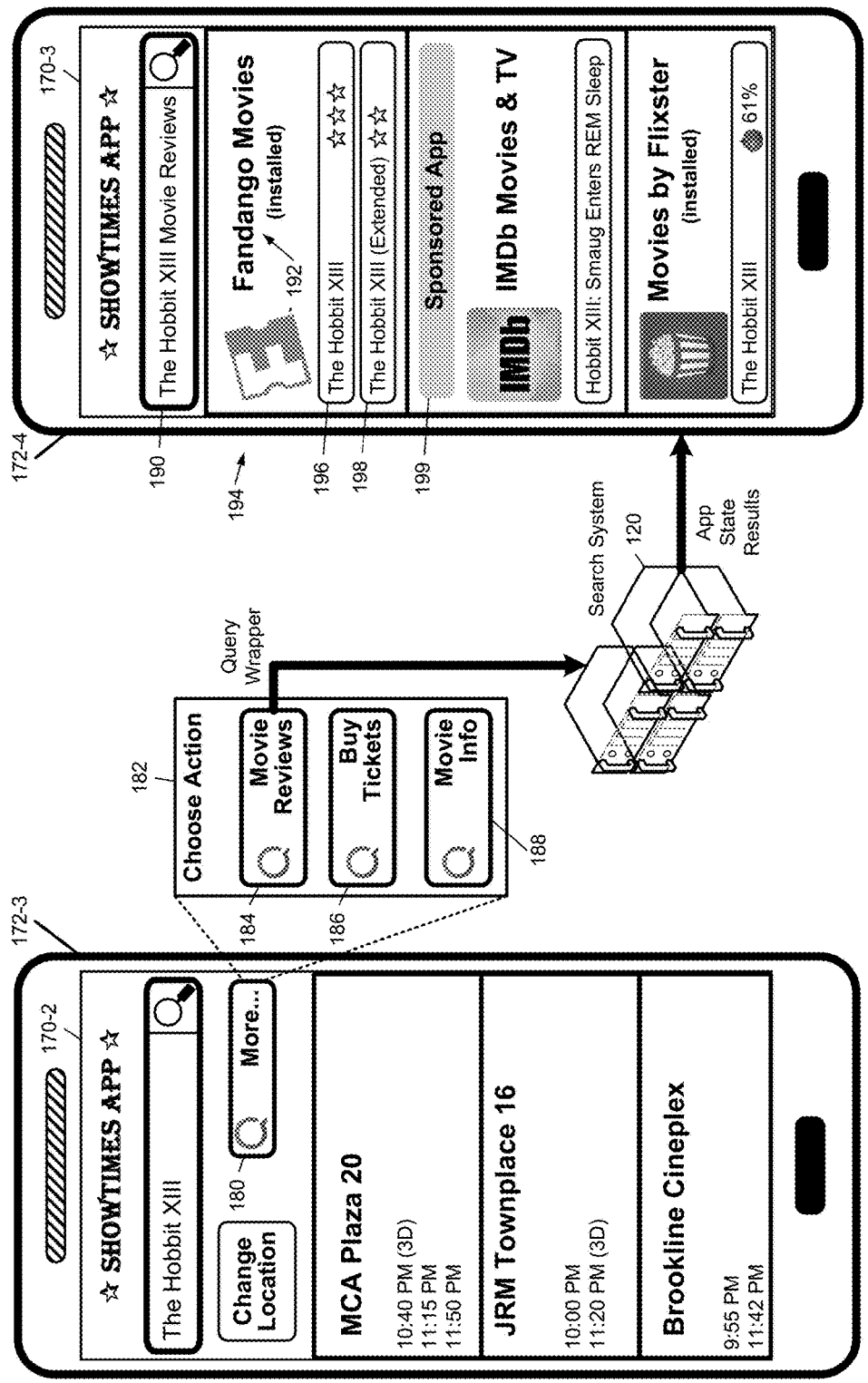
FIG. 5 depicts further graphical user interface examples consistent with FIG. 4.

In FIG. 5, actuation by the user of the multi-function button 180 causes a "Choose Action" interface 182 to be displayed. The Choose Action interface 182 may be displayed as a pop-up, a drop-down list, a separate state, etc. As shown in FIG. 5, the Choose Action interface 182 includes a Movie Reviews button 184, a Buy Tickets button 186, and a Movie Info button 188.

Because the developer had specified four actions in the query object 176-2 of FIG. 4, the fact that the Choose Action interface 182 only includes three buttons indicates that the fourth action (Pre-Order_Home_Release) was not available for "The Hobbit XIII" in the search system 120. If the user actuates the button 184, a query wrapper is sent to the search system 120.

The search system 120 identifies relevant application states that provide movie reviews for "The Hobbit XIII" and these application states results are provided to the Showtimes App 170. In one example implementation, state 170-3 of the Showtimes App 170 (shown in representation 172-4 of the smartphone 172), a text query 190 of "The Hobbit XIII Movie Reviews" may have been provided as the query wrapper. In other words, instead of explicitly identifying movie reviews as a query object and "The Hobbit XIII" as a context object, the query and the context may be combined together in a single string for processing by the search system 120.

The state 170-3 depicts additional user interface options and possibilities, including an "(installed)" indicator 192 for installed applications. In addition, some results, such as a FANDANGO MOVIES application result 194 may include multiple application states. In this case, the application states are "The Hobbit XIII" 196 and "The Hobbit XIII (Extended)" 198. A Sponsored App banner 199 demonstrates a variation on indicating sponsorship of an application.

Function-Entity Combination

Figure 6:
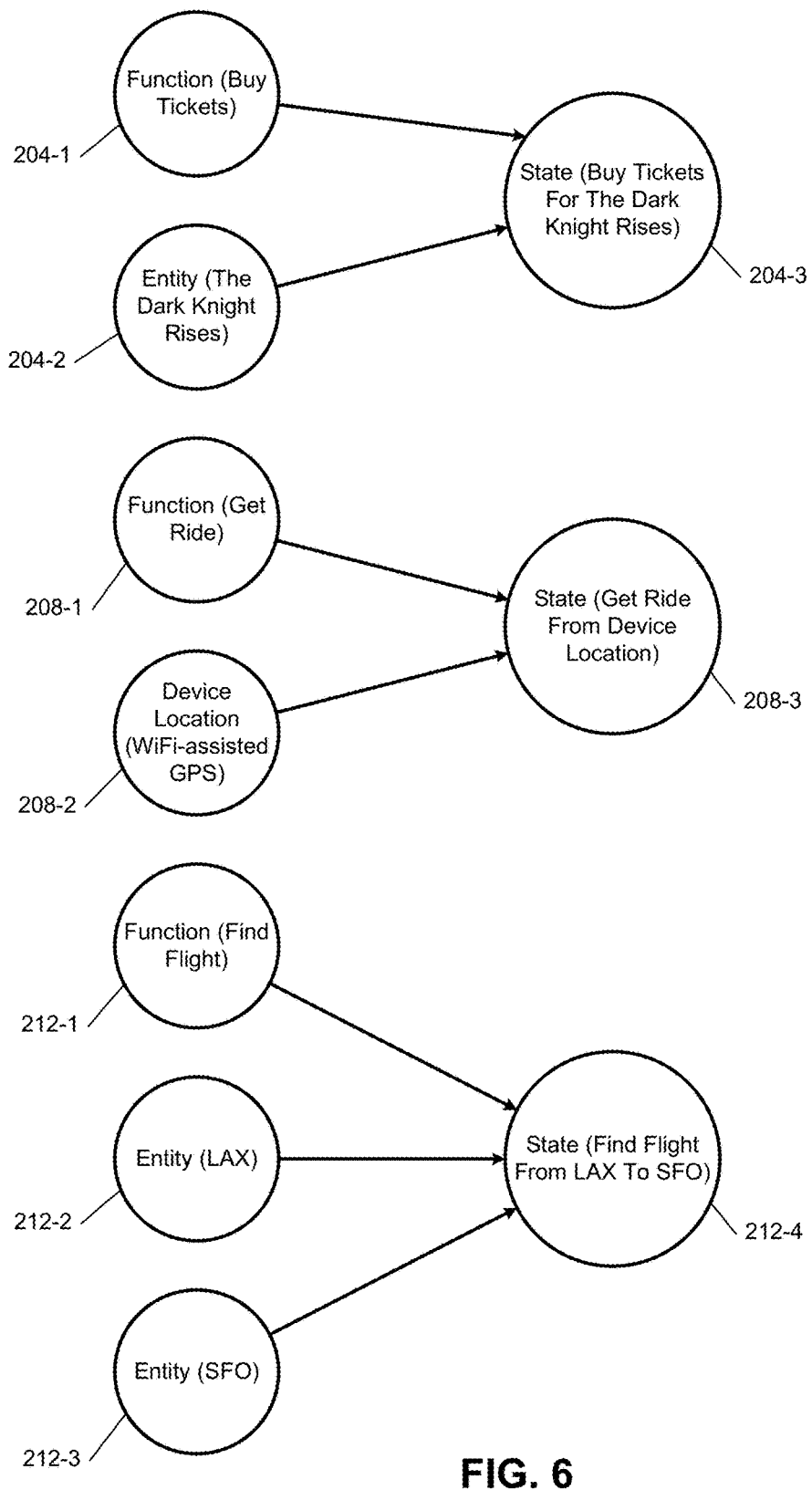
FIG. 6 is a graphical representation of an understanding of states as combinations of functions and entities.

In FIG. 6, examples are presented of how functions and entities are combined to arrive at app states. A function of "Buy Tickets" 204-1 and an entity of "The Dark Knight Rises" 204-2 combine to create a state 204-3 for buying tickets to "The Dark Knight Rises." Similarly, a function of "Get Ride" 208-1 and a location entity (such as WiFi-assisted GPS) of the device 208-2 combine to create a state 208-3 for getting ride/taxi from present location. A function "Find Flight" 212-1 combines with an entity "LAX" (Los Angeles Airport) 212-2 and an entity "SFO" (San Francisco Airport) 212-3 to create a state 212-4 for finding a flight from LAX to SFO. Note that the entities 212-2 and 212-3 in the final example may serve as either departure location or arrival location. If there is no indication of which entity is which, an alternative state (finding a flight from SFO to LAX) is possible.

Figure 7:
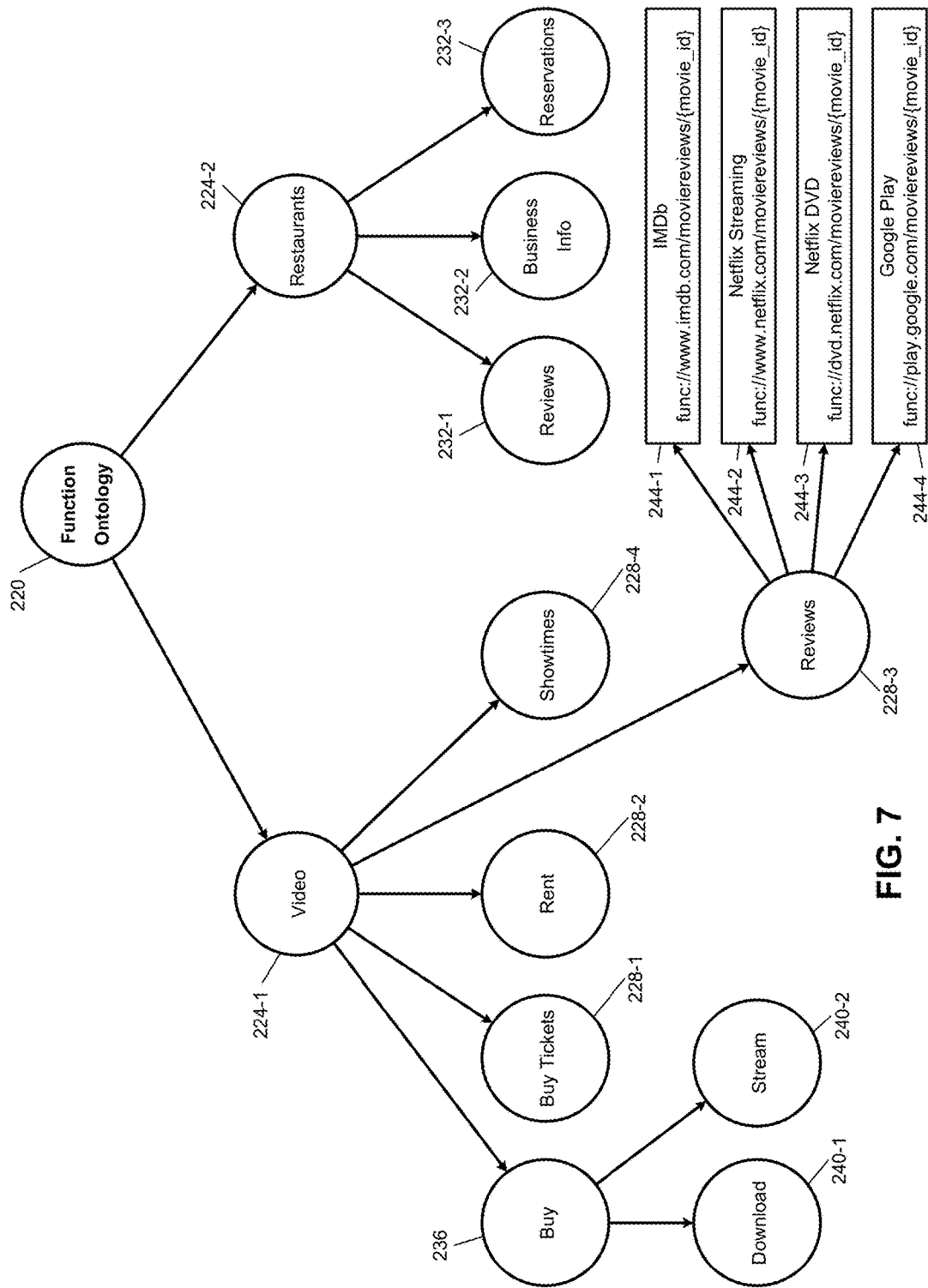
FIG. 7 is a graphical representation of an example function ontology.

In FIG. 7, a function ontology 220 includes a number of branch nodes (such as video 224-1 and restaurants 224-2), which may represent different industry verticals. The function ontology 220 includes leaf nodes (such as buy tickets 228-1, rent video 228-2, reviews 228-3, and showtimes 228-4) that each correspond to a particular function offered by one or more apps. Leaf nodes underneath the restaurants branch node 224-2 include reviews 232-1, business info (such as hours and address) 232-2, and reservations 232-3. Further branch nodes may be specified, such as a buy branch node 236 under which leaf nodes download 240-1 and stream 240-2 are specified. The rent leaf node 228-2 could be similarly expanded.

Each of the functions of the function ontology 220 may be accomplished by a number of different apps. For example, video reviews 228-3 are available from, among many other sources, an IMDB app, a NETFLIX app, and a Google PLAY app. Access templates may be determined for the functions of each app. An information triplet—the app, the function the app is to perform, and the entity for which the function will be performed—specifies a state.

When this triplet is formatted as a URL (uniform resource locator), the URL may be termed a functional URL. Functional URLs may be used with a name space "func://" to differentiate the functional URL from a standard web URL in the "http://" name space. Action templates define what types and number of entities are required to specify a functional URL for a given app function.

Examples of access templates for video reviews 228-3 are shown at 244-1, 244-2, 244-3, and 244-4. The access template 244-1 for IMDb includes the name space, "func://", an indication of the app, "www.imdb.com," a separator forward slash, an indication of the function to be performed, "movie reviews," another separator forward slash, and then an indicator of an entity type, which is a movie_id.

Therefore, in order to use the access template 244-1, a movie entity must be identified. Further, as described in more detail below, the identified movie entity must be applicable to IMDb. In general terms, this means that if the movie is not present in the IMDb app, the access template 244-1 will be irrelevant. In technical terms, when attempting to create a state from the access template 244-1, there will be no IMDb-specific information for that entity with which to populate the access template 244-1.

Figure 8:
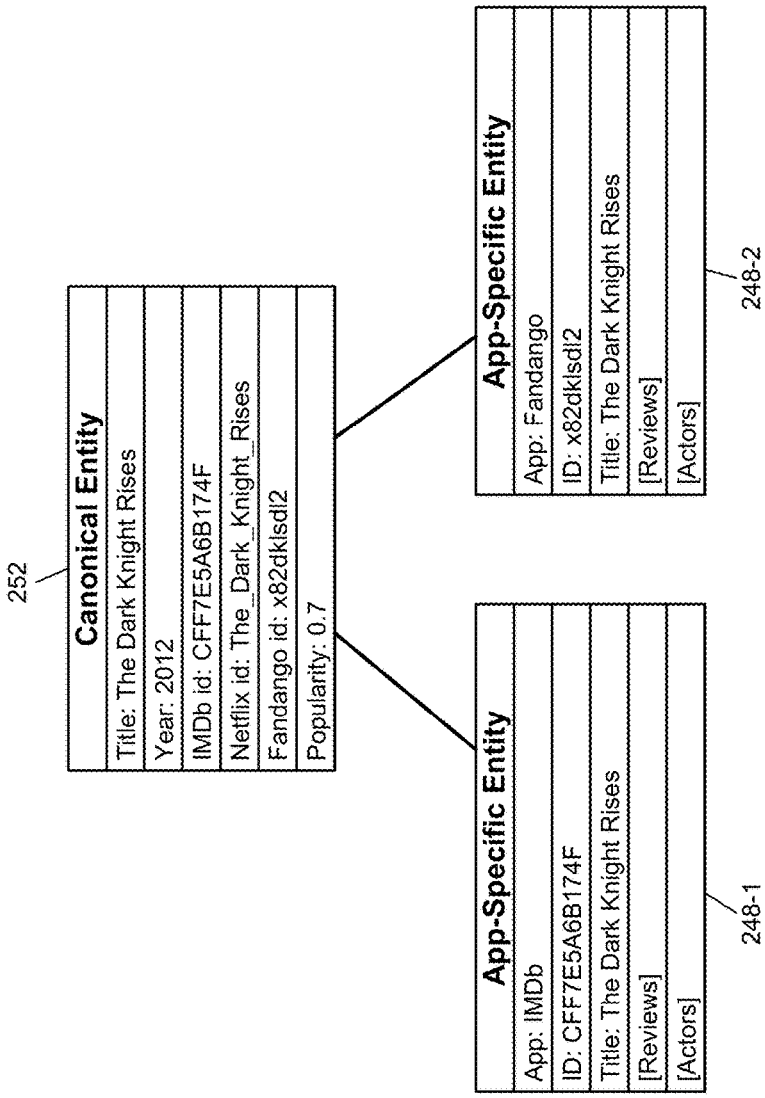
FIG. 8 is a simple graphical example of linking application-specific entity information to a canonical entity.

In FIG. 8, a brief example of how a general (or canonical) entity relates to app-specific information. App-specific entities 248-1 and 248-2 are present in a data store of the search provider. They may be obtained from various data services as described in more detail below. The app-specific entity 248-1 for IMDb includes a hexadecimal identification code (a fictitious ID is shown as an example only) and the title used by IMDb. In addition, other information, such as reviews, actors, producers, etc., may be stored.

The app-specific entity 248-2 for Fandango includes an alphanumeric ID specific to Fandango (a fictitious ID is shown as an example only), and includes the title used by Fandango for the movie. Additional information may also be stored.

A canonical entity 252 includes a canonical title, which in this particular case is the same as the titles for the app-specific entities 248-1 and 248-2 differ. If the titles in the app-specific entities 248-1 and 248-2, one would have to be chosen as the canonical title; or, a canonical title that differed from both may be used.

A canonical year is included, which may be the same as year information stored in the app-specific entities 248-1 and 248-2. The canonical entity 252 includes links to the app-specific entities 248-1 and 248-2. These links may be in the form of unique key values, such as might be used in a relational database. Additionally or alternatively, specific IDs that match the IDs used in the app-specific entities 248-1 and 248-2 may be used to link the canonical entity 252 to the app-specific entities 248-1 and 248-2.

The canonical entity 252 may also include various metrics, such as a popularity score. This popularity score may be based on how popular the described entity is from the various data sources relied upon and may include information about how frequently the entity is selected when presented to the user. The popularity may be normalized to other entities of the same type, in the same genre, etc.

Figure 9:
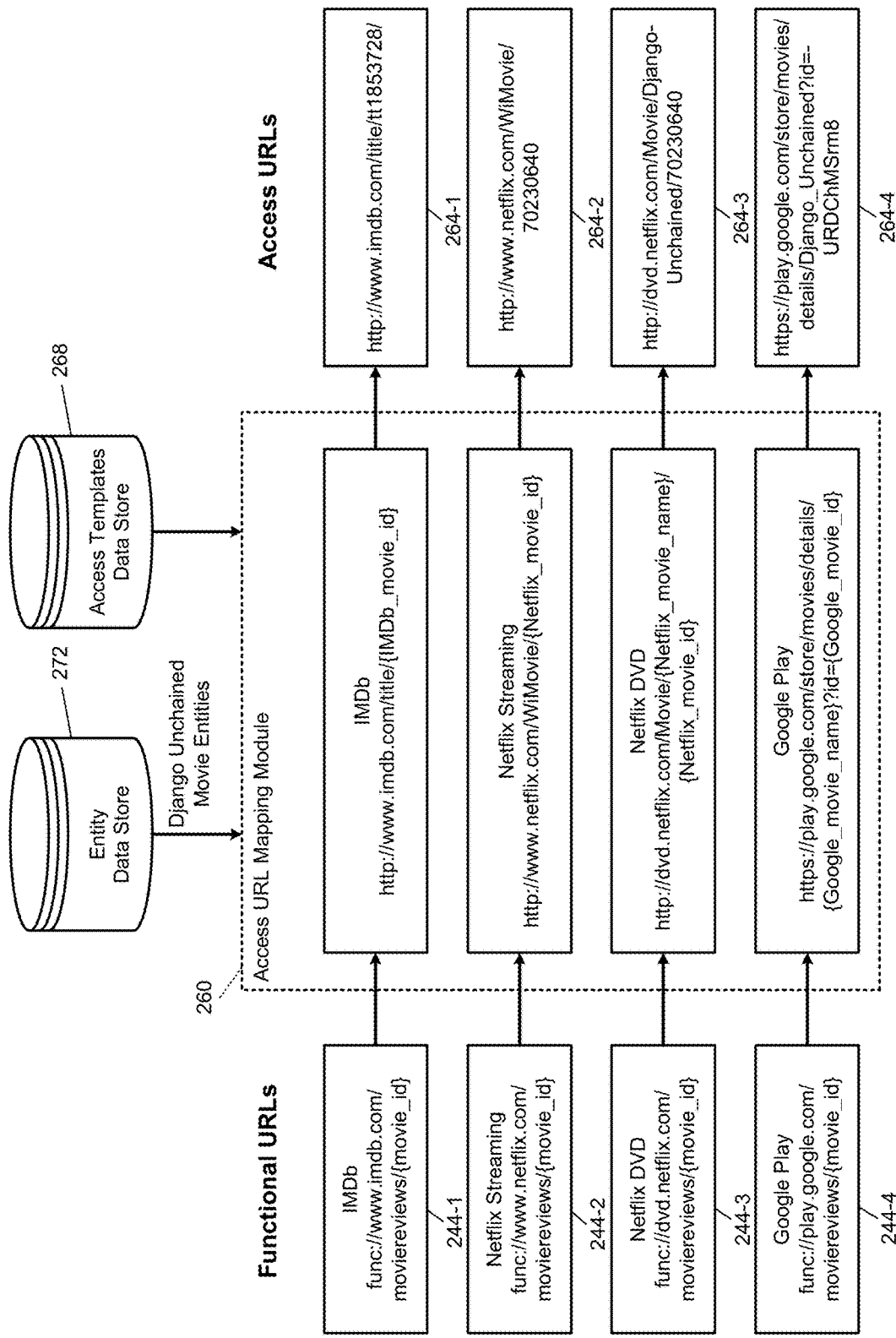
FIG. 9 is a graphical example of conversion from functional URLs to access URLs.

In FIG. 9, an access URL mapping module 260 converts the functional URLs 244-1, 244-2, 244-3, and 244-4 into corresponding access URLs 264-1, 264-2, 264-3, and 264-4, respectively. The mapping is performed using access templates, which take specific information and insert it into a parameterized URL. Access templates are stored in an access templates data store 268. An entity data store 272 stores information about entities, both canonical and app-specific.

As an example only, if the "movie_id" of the functional URLs 244 was a value corresponding to "Django Unchanged," a 2012 film, the access URL mapping module 260 would produce the access URLs 264 shown in FIG. 9. Note that for the access URL 264-4, two app-specific values are retrieved from the entity data store 272: a Google-specific movie name and a Google-specific movie ID. Similar to the association shown in FIG. 8, all of the app-specific data used to create the access URLs 264 is linked to a single "Django Unchained" canonical entity. In other implementations, the canonical entity may simply have fields for app-specific data, as opposed to links to distinct app-specific entities.

System

Figure 10:
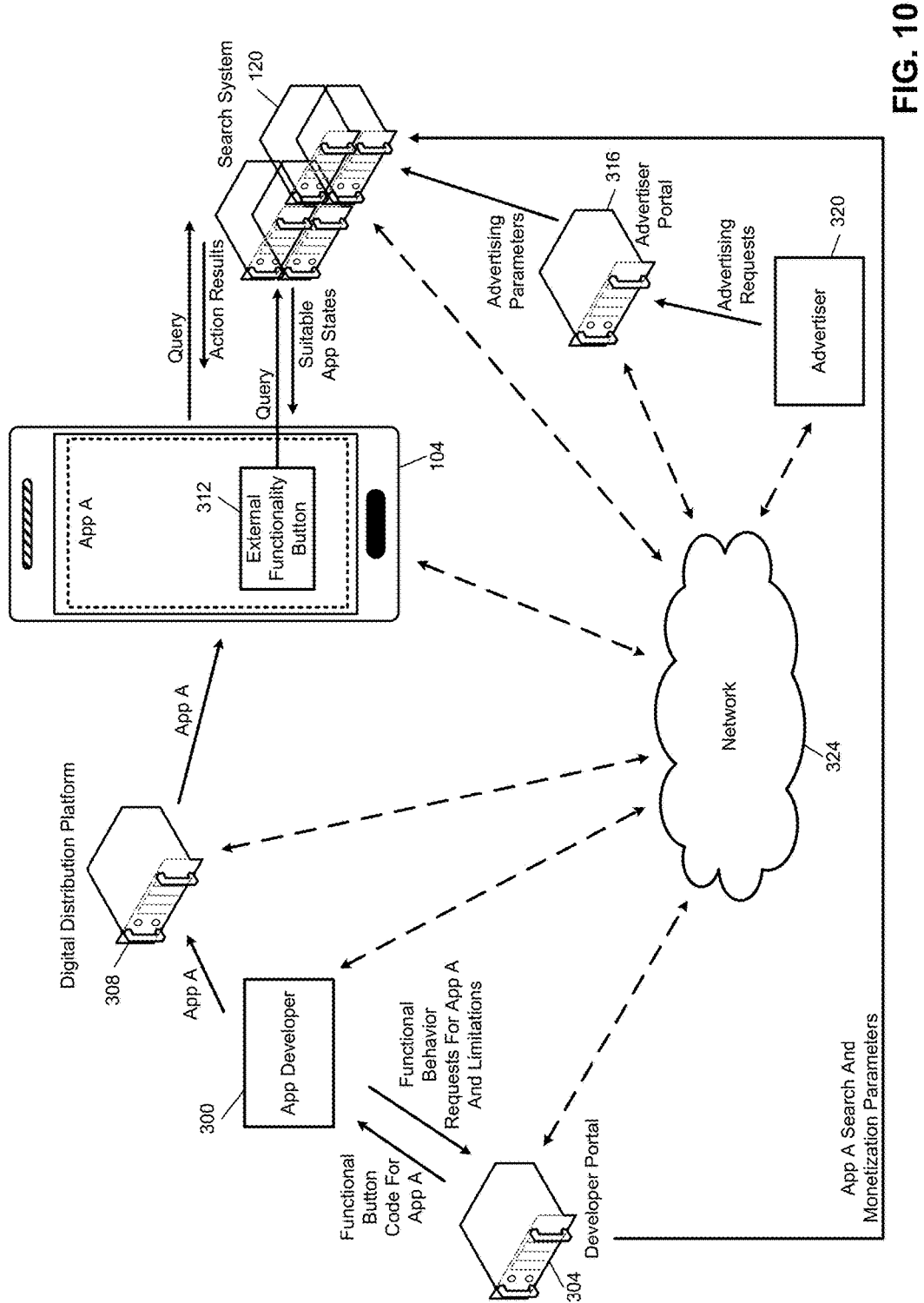
FIG. 10 is a high-level functional block diagram depicting how the principles of the present disclosure apply to an application ecosystem.

In FIG. 10, a high-level overview of the overall system is shown. An app developer 300 interacts with a developer portal 304 when developing an app (referred to as App A). The app developer 300 identifies what external functionality is desired for App A and provides this information to the developer portal 304. The app developer 300 may also specify limitations, such as apps that the app developer 300 does not want to have shown to a user of App A.

The developer portal 304 provides code for App A that allows external functionality to be incorporated into App A. A button associated with this external functionality will cause App A to query a search system 120. The developer portal 304 may provide parameters to the search system 120 based on the decisions made by the app developer 300. In some implementations, some or all of the decisions that the app developer 300 makes are incorporated into the code provided by the developer portal 304 to the app developer 300.

In other words, some data about App A may be known beforehand by the search system 120, while other data will be provided directly from App A, such as via the query wrapper. As one example, the app developer 300 may decide that App M should not be shown to users of App A and adds App M to a blacklist. The developer portal 304 may provide the blacklist to the search system 120 so that the search system 120 will return apps only if those apps are not in the blacklist. Alternatively, the code provided by the developer portal 304, and that is integrated into App A, may provide the blacklist to the search system 120 while App A is running. In other implementations, App A may not provide any information about a blacklist to the search system 120 and instead filter the results returned by the search system 120 to remove apps corresponding to the blacklist.

Once the app developer 300 receives the code from the developer portal 304, the app developer 300 finalizes App A (which may include compiling and linking) and provides App A to a digital distribution platform 308. One example of the digital distribution platform 308 is the PLAY digital distribution platform by Google, Inc.

The developer portal 304 may provide code to the app developer 300 in a variety of forms. The code may be provided in plain text that can be copied and pasted into the coding platform used by the app developer 300. The developer portal 304 may instead provide some or all of the code in the form of a library (the SDK library), which may include precompiled object code and header files.

The SDK library may be associated with an API (Application Programming Interface), and a definition of the API may be provided to the app developer 300. In some implementations, the app developer 300 may use a graphical user interface on the developer portal 304 (such as a website) to automatically generate appropriate API calls. These API calls can be included in App A during its development. The developer portal 304 may provide visual user interface elements, such as buttons, for use by the app developer 300.

Choices made by the app developer 300 during development of App A may be fixed into the code received from the developer portal 304. Alternatively, the app developer 300 may be able to modify certain aspects of the code, such as by supplementing a blacklist. Once App A is provided to the digital distribution platform 308, the code in App A may be relatively fixed. Changes to App A may require a version update at the digital distribution platform 308. As a result, post-distribution changes, such as updating of blacklists, may instead be done using the developer portal 304 and communicated to the search system 120.

When a user of the smartphone 104 installs and opens App A from the digital distribution platform 308, a representative external functionality button 312 will be present on some of the states of App A. The term "state" may refer to a screen of App A. If App A is a movie showtimes app, each state may correspond to the showtimes of a particular movie in a particular location. The external functionality button 312 may be present in a template that applies across all of the states of App A that show movie showtimes.

When a state is instantiated from the template, an action query is performed to determine whether the action associated with the external functionality button 312 is available or not. If not, the external functionality button 312 may be hidden or otherwise indicated as inactive. In some implementations, the external functionality button 312 does not appear different, but an expected response of the external functionality button 312 to selection does not occur—for example, a visual effect appearing to be a physical movement into the screen is not performed, making the external functionality button 312 appear fixed.

App A may have additional states, such as a movie listing that lists all currently playing movies according to geographical area, a theater listing that lists all theaters within the geographical area, etc. The external functionality button 312 may be present in those states or may be absent. Depending on the choices made by the app developer 300, other external functionality buttons (not shown) may be present in those other states.

The app developer 300 may specify a template, or layout, for each type of state of App A. For example, a first template may include two external functionality buttons, such as are shown in FIG. 1 ("Tickets" and "Directions"), which are populated into any corresponding state of App A. For example, any state of App A that displays showtimes may be formatted using the first template. App A may include other states, such as a form for providing feedback that a particular showtime is wrong or that a movie theater is absent. These states may be created using a template that does not include the external functionality button 312.

When the user of the smartphone 104 actuates the external functionality button 312, such as by touching the external functionality button 312, a query wrapper is sent to the search system 120. The code provided by the developer portal 304 may receive a parameter corresponding to the present state of App A. This parameter allows the query wrapper to specify a desired specific state in any relevant apps. For example, the developer of a movie showtimes app may choose to pass the name of a movie whose showtimes are presently being displayed to be part of the query wrapper for a movie reviews function. For a directions function, the developer may choose to pass a name and/or address of a movie theatre to be part of the query wrapper. For a ticket-purchasing function, the developer may choose to pass a name of the movie theatre to be part of the query wrapper.

The search system 120 processes the query wrapper, as described in more detail below, and returns a set of suitable apps or app states to the smartphone 104. The results may be displayed within App A using code provided by the developer portal 304. In other implementations, the smartphone 104 may include an app developed by an operator of the search system 120. This search system app may display the suitable apps to the user of the smartphone 104.

An advertiser portal 316 receives advertising requests from an advertiser 320. The advertiser portal 316 may provide app sponsorship opportunities to organizations that don't have accounts on the developer portal 304. In various implementations, the advertiser portal 316 may replace the sponsorship functionality of the developer portal 304 such that developers who want to promote their apps use the advertiser portal 316 instead of the developer portal 304.

The advertiser portal 316 also provides an ability for the advertiser 320 to promote an entity associated with a product or service of interest to the advertiser 320. For example, the advertiser 320 may set keywords so that DENNY'S restaurant entities will be promoted in general. The advertiser 320 may also specify specific states, such as the states in the YELP app for Denny's entities, for promotion.

The advertiser 320 may also specify coupons that are available within an app. For example, an advertiser 320 may contract with Yelp (either directly or through an advertising network) to cause a coupon to be displayed within Yelp for Denny's restaurants. The advertiser 320 may then notify the advertiser portal 316 of the coupon so that result states in Yelp for Denny's can be shown with a coupon label. The existence of a coupon may be used as a factor by the search system 120 when scoring app states, with app states having coupons receiving a higher score.

Although FIG. 10 shows the effective flow of data between the components, in reality, the app developer 300, the developer portal 304, the digital distribution platform 308, the smartphone 104, the search system 120, the advertiser portal 316, and the advertiser 320 may communicate through a network 324. The network 324 may encompass local area networks, mobile phone providers' proprietary networks, and a distributed communications network, such as the Internet.

Developer Portal User Interface

Figure 11:
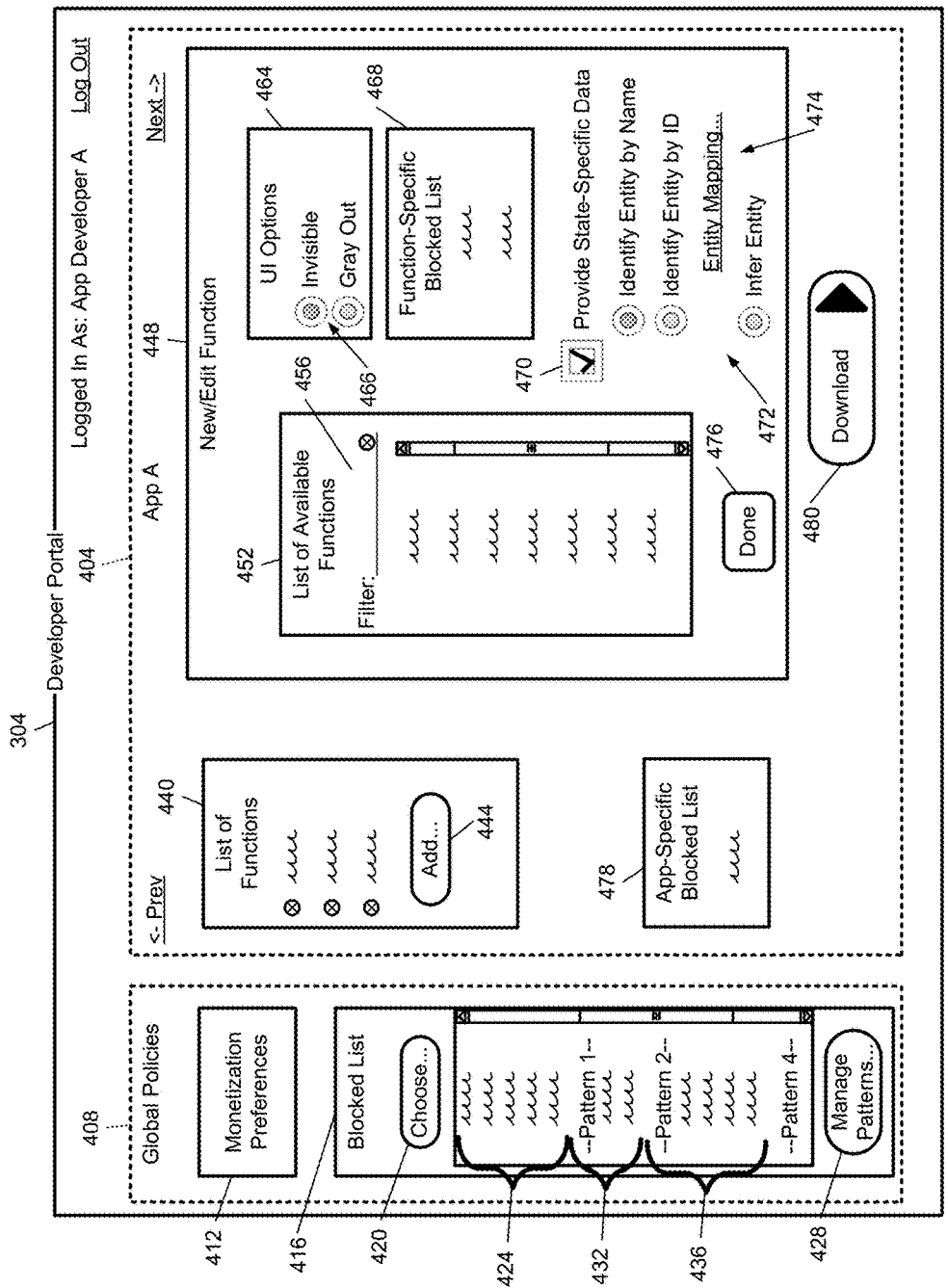
FIG. 11 is a simplified graphical user interface of an example implementation of a developer portal.

In FIG. 11, a simplified user interface for an example implementation of the developer portal 304 is shown. The app developer (referred to as App Developer A) logs into the developer portal 304, which may be a website. Because of the sensitivity of app and monetization information, a two-factor authentication protocol may be required for app developers.

App Developer A creates one or more app profiles in the developer portal 304. Settings and data related to App A are shown at 404, and the app developer 300 may be able to cycle through other apps using "Previous" and "Next" user interface elements 406-1 and 406-2. Global policies are shown at 408 and include monetization preferences 412 and a blocked list 416 that apply to all of the developer's apps.

The monetization preferences 412 may include payment details for App Developer A, including how App Developer A can provide money to the developer portal 304 to obtain advertising as well as how the developer portal 304 can pay App Developer A for sponsored links being shown in the apps associated with App Developer A. For example only, the monetization preferences 412 may include billing addresses and account information for digital funds processing systems such as the PAYPAL payment platform. In implementations where use of the developer portal 304 is not free, the monetization preferences 412 may also include options for beginning or ending service, and options for changing the payment schedule (for example, from monthly to annually).

The blocked list 416 includes a list of apps, app states, and/or entities that App Developer A does not want to have displayed in any of the apps for App Developer A. A "Choose" button 420 allows App Developer A to choose, from a list, which apps should be blocked. This list (not shown) may be searched, filtered, etc. Explicitly chosen apps for a blacklist are shown at 424. In addition, a "Manage Patterns" button 428 may allow App Developer A to specify wildcard patterns that match apps not to be presented to users of App Developer A's apps. For example, if App Developer A works for SAM'S CLUB WAREHOUSE CENTERS discount retailer, one specified pattern may correspond to the COSTCO discount retailer. The Costco pattern may include wildcards before and after "Costco" so that any Costco app is identified.

Although this discussion focuses on the titles of apps, blacklists may also be specified based on words in the description of an app, the name of the developer of the app, etc. Further, specific entities, such as addresses and names of competitors may be blacklisted. In addition, general blacklist criteria may specify that, for example, an app downloaded fewer than a specified number of times should not be shown to a user. The manage patterns button 428 may allow App Developer A to specify patterns using wildcards, regular expressions, etc. A first specified pattern followed by two apps that match that pattern are shown at 432. Similarly, a second pattern and four matching apps are shown at 436.

In various other implementations, App Developer A may specify a whitelist of apps to display, where any apps not included in the whitelist will not be presented to a user of App A. In other implementations, App Developer A may specify a preference list including apps that are preferred: these apps are then emphasized (such as by moving higher on the screen) when present in the result set. The preference list may be an ordered structure, such that an app appearing higher in the preference list is to be given greater precedence than an app appearing lower in the preference list.

In the app specific settings 404, a list of functions 440 identifies what external functionality will be available to App A. For example, the listed functions within 440 may correspond to finding food, finding driving directions, and finding movie reviews. An "Add" button 444 allows a new function to be specified using a new/edit function interface 448. A list of available functions 452 may include functions of interest identified by the developer portal 304 for various verticals, such as movies, dining, travel, sports, etc. A filter interface 456 allows the available functions to be filtered, such as by name, for easier identification of the desired function.

The available functions 452 are the leaf nodes of the function ontology (such as the function ontology 220 of FIG. 7). While shown as a list, the available functions 452 may be presented in a hierarchical outline format, or in a tree format (such as is shown in FIG. 7). Sub-branches may collapse into a branch node (that is, disappear from view) until selection so that a full ontology can be displayed on a single viewing screen.

A user interface options portion 464 allows App Developer A to specify how results for the selected function should be displayed. The options may include specifying how many results are to be shown, what associated information (such as starred ratings) should be shown, how the button corresponding to the function should be displayed, and how sponsored apps will be identified.

As one example, App Developer A may specify how many sponsored apps or entities should be shown in a results set. In another example, App Developer A may be able to specify that only already-installed apps should be shown to the user. App Developer A may also specify, such as by using CSS (Cascading Style Sheets), the graphical presentation of search results.

For example, in the user interface options portion 464, App Developer A may specify a particular shape and size for a button, and may identify whether logos or texts identifying the developer portal 304 (such as a logo of a provider of the developer portal 304) should be shown on the button. App Developer A may be able to specify in the user interface options portion 464 that App Developer A will create the button or other user interface element and that therefore the user interface element does not need to be provided by the developer portal 304. Instead, the developer portal 304 can provide the code for searching for the function, which will be called by whatever user interface element App Developer A creates.

The user interface options portion 464 may also include settings used to adapt user interface elements when the corresponding action is not available. For example, settings 466 may allow user interface elements to be hidden or grayed out when the corresponding action is unavailable.

A function-specific blocked list 468 allows App Developer A to block apps and/or states specifically per function. For example, App Developer A may believe that a particular popular app does not provide a good user experience for the particular function at issue. This app can therefore be added to the function-specific blocked list 468.

A checkbox 470 indicates an intent of App Developer A to supply state-specific data. For example, when a function such as movie reviews is chosen, App Developer A may check the checkbox 470 to indicate that information related to a movie entity will be included in the query wrapper for "Movie Reviews."

A set of radio buttons 472 allows App Developer A to choose whether the entity (such as the movie) is identified to the search system by name (the name of the movie, for example), by number, or whether the identity of the entity should be inferred. When providing a name, the developer portal 304 provides App Developer A with an API call that includes a unique identifier of the desired function, as well as a parameter for providing the name of the currently displayed movie.

The set of radio buttons 472 also includes the option to identify the entity by a prearranged ID. For this option, an entity mapping link 474 is available. In order to send an entity ID to the search system, the search system needs to understand what that entity ID means. For the convenience of the search system, App Developer A may retrieve all of the relevant entities from the search system and map the search system IDs to the internal entities of the App A. In this way, App Developer A can simply send the search system ID directly to the search system to uniquely specify the correct entity.

To reduce the burden on App Developer A of storing the search system's IDs, a mapping from entity IDs used by App A to entity IDs used by the search system can be created. Then App Developer A uses the internal entity IDs from App A, relying on the mapping to convert from the internal App A entity ID to the search system entity ID. This mapping may be stored within App A, or may be stored on the search system. For this option of the set of radio buttons 472, the developer portal 304 may provide an API call that includes the selected function as well as a parameter for an entity ID.

Another option presented by the set of radio buttons 472 is for the search system to infer an entity. To reduce the burden on App Developer A still further, App Developer A can simply place a button having the desired function onto every state of interest to App Developer A. Based on the text displayed in that state, the search system can infer what entity the function should be performed on. For example, a user interface element created according to this option will, when selected, execute code that scrapes the text and potential image data from the displayed state. This data, which may first be parsed or analyzed within the app, is transmitted to the search system. The search system analyzes the data and infers the correct entity. Referring back to FIG. 1, the fact that the text "The Hobbit XIII" appears near the top of the screen and is the only recognizable movie name would lead to the inference that the request for movie reviews was intended by the user to be made with respect to the entity "The Hobbit XIII."

When a function has been specified and/or edited, a "Done" button 476 can be actuated by App Developer A. An app-specific blocked list 478 allows App Developer A to block apps and/or states for all functions specified for App A. For example, App Developer A may develop apps for a number of small companies. Each app may therefore correspond to a different company. Each company may have their own list of competitors that may be added to the app-specific blocked list 478.

A "Download" button 480 allows App Developer A to obtain the code necessary to access the specified functions in the list of functions 440. As discussed above, a customized SDK library may be downloaded in response to the "Download" button 480. Alternatively, a predetermined SDK library may be downloaded that forms query wrappers and presents search results. This SDK library may be accessed using an API; API calls corresponding to the list of functions 440 may be downloaded for use in the programming environment of App Developer A.

A software development kit (SDK) may be downloaded using the "Download" button 480. The SDK may integrate with the programming environment of App Developer A, such as an integrated development environment. The SDK may duplicate or replace some of the features of the developer portal 304, in one example resulting in an interface similar to that of FIG. 12. The SDK may provide for one-click addition of a specified function to a template or layout that App Developer A is creating.

With that single click, the SDK may place a user interface element, such as a button, into a graphical form editor. The SDK may also create an appropriate API call to the SDK library that can send a query wrapper and receive app results. The SDK may also populate an entire new screen (state) of the application with graphical elements used for displaying app results. In other implementations, the SDK may insert API calls that will allow App Developer A to query the results returned and format and display the results in whatever manner App Developer A chooses.

The settings specified in the developer portal 304 may be reflected in the parameters of the API calls, the downloaded code, a custom SDK library, etc., provided by the developer portal 304. This code may then be integrated into App A and the code integrated into App A is solely responsible for providing relevant information to the search system 120. Alternatively, some data may be communicated by the developer portal 304 to the search system 120. For example, the global policies 408 may be provided to the search system 120. Then, whenever an app corresponding to App Developer A queries the search system 120, the search system 120 is aware of, and operates according to, the global policies 408 set by App Developer A.

App-specific policies may also be communicated to the search system 120. That way, when the search system 120 receives a query from App A, the search system 120 is aware of some or all of the parameters specified in the developer portal 304 for App A. App Developer A may make changes in the developer portal 304 subsequent to distributing App A. These changes may be sent to the search system 120 to allow for the behavior of external functionality buttons to be adapted over time without having to create a new version of App A in the digital distribution platform 308.

As mentioned above, some parameters may never be communicated to the search system 120 in some implementations. For example, certain blocked apps may be filtered out from received results within App A itself as opposed to being filtered out by the search system 120. This filtering may be performed by code provided by the developer portal 304 and customized by, for example, the blocked list 416. Alternatively, the developer portal 304 may provide instructions to App Developer A on how to perform the filtering using appropriate API calls to functions or libraries provided by the developer portal 304.

Figure 12:
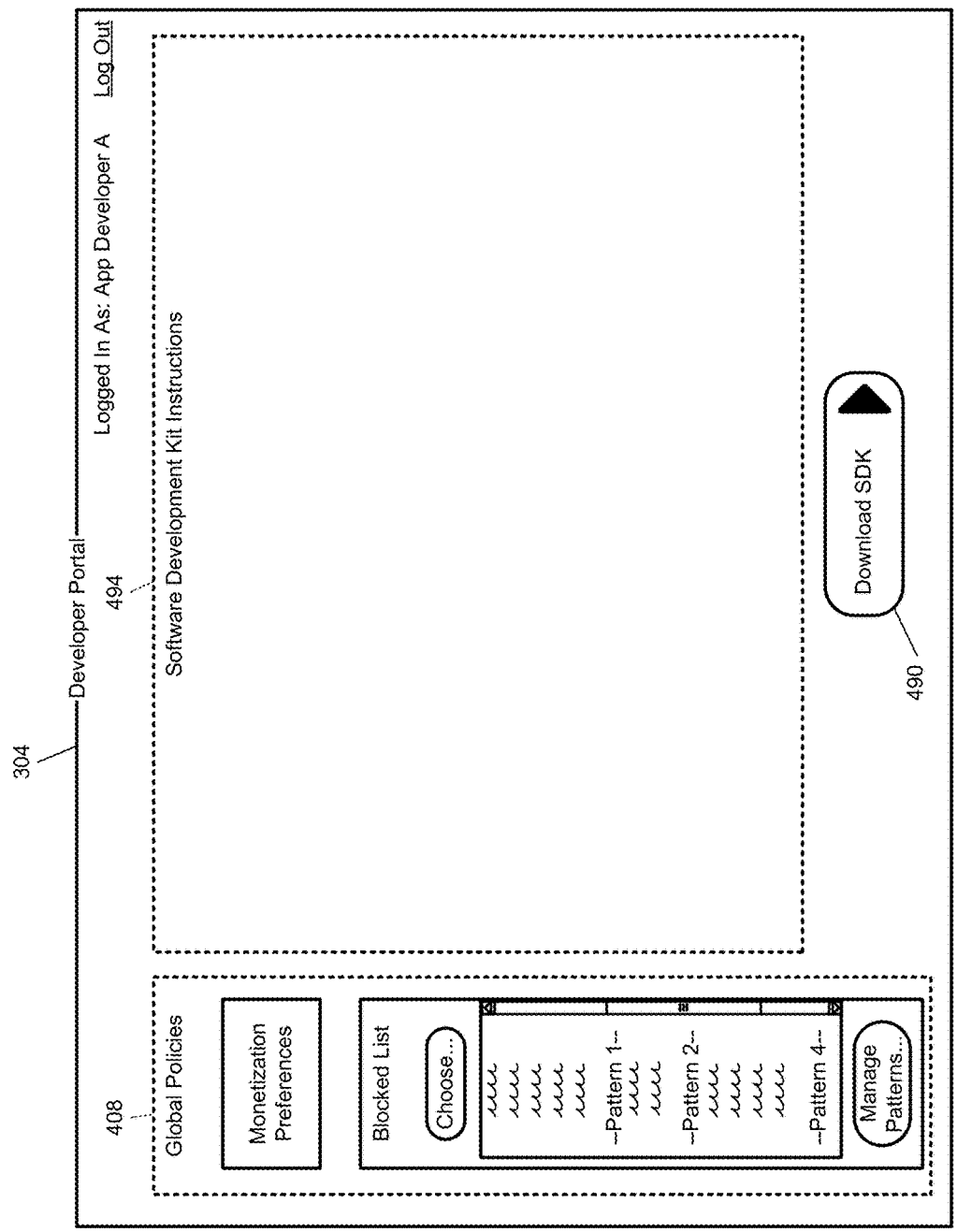
FIG. 12 is a simplified graphical user interface of another implementation of an example developer portal.

In FIG. 12, one example of an implementation of the developer portal 304 for use with a software development kit is shown. Global policies 408 may still be specified using the developer portal 304 of FIG. 12. However, app-specific or function-specific parameters may be configured using the software development kit, which is downloaded at 490.

Instructions for using the software development kit may be displayed at 494. Additional instructions and/or wizards, walkthroughs, and tutorials may be contained within the software development kit. The global policies 408 may be communicated to the search system 120, while app-specific parameters are encoded into whatever app App Developer A creates using the downloaded software development kit.

Query Wrapper Examples

FIG. 13, FIG. 14, and FIG. 15 show example contents of a query wrapper. In FIG. 13, a query wrapper 504 is encrypted with a public key of the search system 120. This public key may be provided to the App Developer using the developer portal 304 as part of the code that generates the query wrapper 504. By encrypting the query wrapper with the search system's public key, only the search system, which is in possession of the corresponding private key, can decrypt the query wrapper 504. This prevents any man-in-the-middle eavesdropping of queries performed by the user.

A query wrapper 504 includes a query object 504-1, which uniquely identifies a function from one or more functions ontology (such as the function ontology 220). A function identifier may be a binary or alphanumeric value, which may be fixed after selection of the corresponding function within the developer portal 304. A context object 504-2 includes an entity identifier. The entity identifier may include a plaintext name of an entity or may include an ID whose significance is prearranged between the developer and the search system 120.

At 504-3, a representation of installed apps is provided. For example, an exhaustive listing of all installed apps including titles and version numbers may be included. In some implementations, a bit field may be specified for the one-hundred most popular apps. In other words, one hundred binary digits correspond to whether each of those apps is installed, with a zero indicating that the app is not installed and a one indicating that the app is installed. To allow for this shortened bit field format, the set of apps must be pre-arranged. Although one hundred is used as an example, for efficient storage a power of two (such as 128) may be used.

Another mechanism for indicating installed apps using a limited number of bits is a Bloom filter. The Bloom filter specifies whether an app from a predefined set of apps is possibly installed on the device or whether the app is definitely not installed. To achieve storage compression, the output of a Bloom filter does not definitively state that a certain app is present; the Bloom filter output only definitively states whether certain apps are not present.

An installed accounts data structure 504-4 may report which accounts are present on the user device, and any relevant details about those accounts that might be available. This may impact how relevant a result is. For example, if the user has expressed an interest in streaming a movie, but their account on a particular service does not allow streaming of that movie, the corresponding state may receive a reduced score.

At 504-5, a blacklist is specified. This blacklist may supplement a blacklist already present in the search system 120 or may be a stand-alone blacklist. The blacklist may list apps not to return based on unique identifiers of those apps, which are known beforehand by the search system 120. The blacklist 504-5 may also list states and entities not to include in results.

At 504-6, device info of the device transmitting the query wrapper 504 may be included. This information may include the operating system and the operating system version number, geolocation data for the device, an identity of the app sending the query wrapper 504, an identity of the app developer of the app, screen resolution, portrait/landscape orientation, and sensor capability (precision of accelerometer, presence of heart rate sensor, etc.).

The app or app developer identities may be used by the search system 120 to apply pre-arranged parameters provided by the developer portal 304, such as a blacklist. The app identity may also be used by the search system 120 to remove that app and related states from the results—in other words, to avoid returning a result that points back to the very same app that sent the query wrapper 504.

In FIG. 14, a query wrapper 508 includes similar fields as the query wrapper 504. The exceptions depicted are with respect to a context object 508-2 and statistical text information 508-3. The context object 508-2 is used when an entity is not being specifically identified by the app developer. Therefore, the search system infers the entity of interest from the context of the state that triggered generation of the query wrapper 508.

The context object 508-2 includes text from the state as well as text attributes. In addition, the context object 508-2 may include other visual features, such as tables and images. The statistical text information 508-3 may include information gathered by the SDK library about the relative frequency of certain terms and phrases. Terms or phrases that appear repeatedly or even universally across all states of a certain type indicate that that text should not be relied upon to provide identification of the correct entity. As described below, when the context object 508-2 includes all of the state text, this collection and statistical analysis may be performed at the search system, which may reduce processing overhead on the user device, which may be constrained by battery capacity.

In FIG. 15, a query wrapper 512 includes a plaintext string as a query 512-1. The query wrapper 512 may also include indications of installed apps 512-2, installed accounts 512-3, and a blacklist 512-4. The query wrapper 512 may also include device info 512-5, such as that described above with respect to FIG. 13.

App State Result Examples

FIG. 16 and FIG. 17 depict example formats for app state results. The app state results may be provided as a file over any suitable protocol, such as HTTP (hypertext transfer protocol) or FTP (file transfer protocol), or as an object sent over a higher level protocol such as SOAP (simple object access protocol). The app state results may be physically transported across a network using multiple packets, frames, etc.

In FIG. 16, an app state results structure 550 includes an app list 550-1. For example, the app list 550-1 may include an array of strings, each string storing an app name. The order of the array may generally be from most relevant to least relevant, though the order may be adjusted based on sponsorship. The number of apps provided in the app list 550-1 may be chosen according to a resolution of the device sending the query wrapper. For example, a device with a larger screen and/or higher resolution may receive a larger number of apps. In addition, the number of apps provided may be specified by the app developer using the developer portal 304 or the software development kit.

An app state list 550-2 includes an array of pairs, where a first value of each pair corresponds to an app state (which may be a title, such as for THE FRENCH LAUNDRY restaurant) and the second value of each pair corresponds to the associated app (such as for the YELP app).

An images field 550-3 may include encoded images, such as icons, for each of the apps in the app list 550-1. In other implementations, the images field 550-3 may include encoded images, such as screenshots, for each of the app states in the app state list 550-2.

An app access links field 550-4 specifies access mechanisms for a default state of each of the apps in the app list 550-1. For example, the access links may include commands to open the app if installed and/or links to a digital distribution platform to download an app that is not installed. Another access mechanism may be a URL (uniform resource locator) to access a web-based app through a browser. When the app state results structure 550 is returned, code within the app may determine whether open versus download is the appropriate action based on the specific installation status of each app.

An app state access links field 550-5 specifies access mechanisms for each of the app states in the app state list 550-2.

Additional metadata 550-6 may include a rating for each app (such as a number of stars), a text description for each app, review text and metrics (such as number of reviews), and a designation of sponsorship. The sponsorship designation may be a simple binary flag or may include an indication of sponsorship level. For example, a sponsor may be willing to pay a greater amount for a new install than for an existing app. This level of interest by the sponsor may allow the app to promote the sponsored app more prominently in hopes of recognizing that revenue.

The additional metadata 550-6 may include download velocity (the number of downloads over a recent time horizon) or other indicators of trending popularity of an app. A new and valuable app may not yet have a large installed base, but may show rapid growth in number of downloads. Therefore, trending popularity may be used as a signal to rank the display of apps, with trending apps moved higher up in a results list. Further, a visual indication of trending, such as text ("trending" or a word correlated with trending, such as "popular") or an icon, may be shown in close proximity to an app for which a trending metric of the app is above a threshold. The threshold may be an absolute threshold for all apps, or may be relative/normalized to the market segment in which the app exists or to the other apps in the results list.

An entity list field 550-7 includes a list of entities (such as a list of plaintext names) corresponding to the app state list in 550-2, and a mapping of which app states correspond to which entities.

In FIG. 17, app state results 554 may include an HTML (hypertext markup language) image map 554-1. The HTML image map 554-1 may be a single image, such as a JPEG (joint photographic experts group) or PNG (portable network graphics) image, divided into separate areas. Each area corresponds to an app or app state and shows text and/or icons corresponding to that app or app state. When the HTML image map is actuated, the corresponding section of the image map activates a corresponding access mechanism for the app or state displayed in that region of the HTML image map 554-1.

The HTML image map 554-1 may be sized according to the size of the requesting device by the search system 120. In other implementations, multiple HTML image maps may be provided and an appropriate one may be selected at the device according to the resolution of the device's screen and the amount of real estate to be dedicated to the results display. The search system 120 may create an HTML image map that will work with a certain range of display sizes and resolutions, and if the specified region for display is within that certain range, the HTML image map may be proportionally scaled by the device.

Action Query and Response

Figure 18:
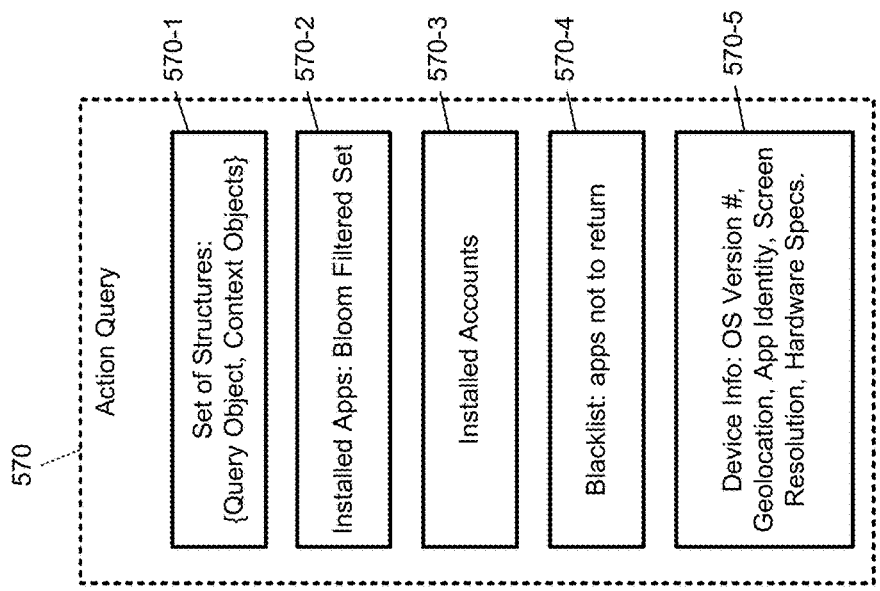
FIG. 18 depicts example contents of an action query sent to a search system.

In FIG. 18, an example action query 570 includes a set of structures 570-1, with each query object having one or more context objects. Installed apps 570-2 may be identified. For example only, apps known to be paid-subscription-based are generally not good results for a user device unless the app is already installed. This relies on the assumption that if the user were paying for the subscription, then the corresponding app would be installed.

Installed accounts 570-3 provide an even more accurate picture of what active services the user is already paying for. However, the accounts registered with the operating system may be a small subset of the total account credentials stored on any given user device across all of the apps.

A blacklist 570-4 may prevent actions from being identified as available if the only action corresponds to an application or company that is undesirable to the developer crafting the action query 570. Device info 570-5 may be included as discussed above with query wrappers.

Figure 19:
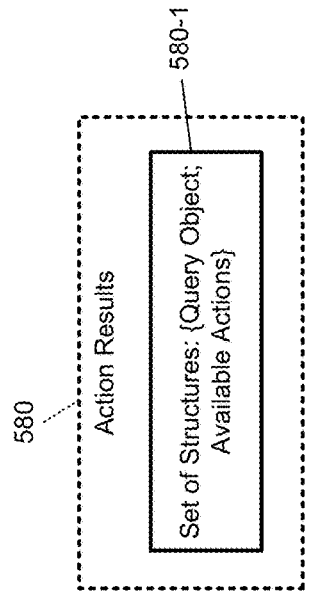
FIG. 19 depicts example contents of an action results message returned in response to the action query.

In response to the action query 570, FIG. 19 shows an example action results response 580. The action results response 580 includes a set of structures 580-1 that includes one or more available actions (or an indication of no availability) for each query object. In various implementations, only query objects that have available actions are returned. Therefore, if a requested query object does not appear, it can be assumed that no corresponding action was available. Further, the action results response 580 may be empty if no requested actions were available for this entity.

Developer Portal

Figure 20:
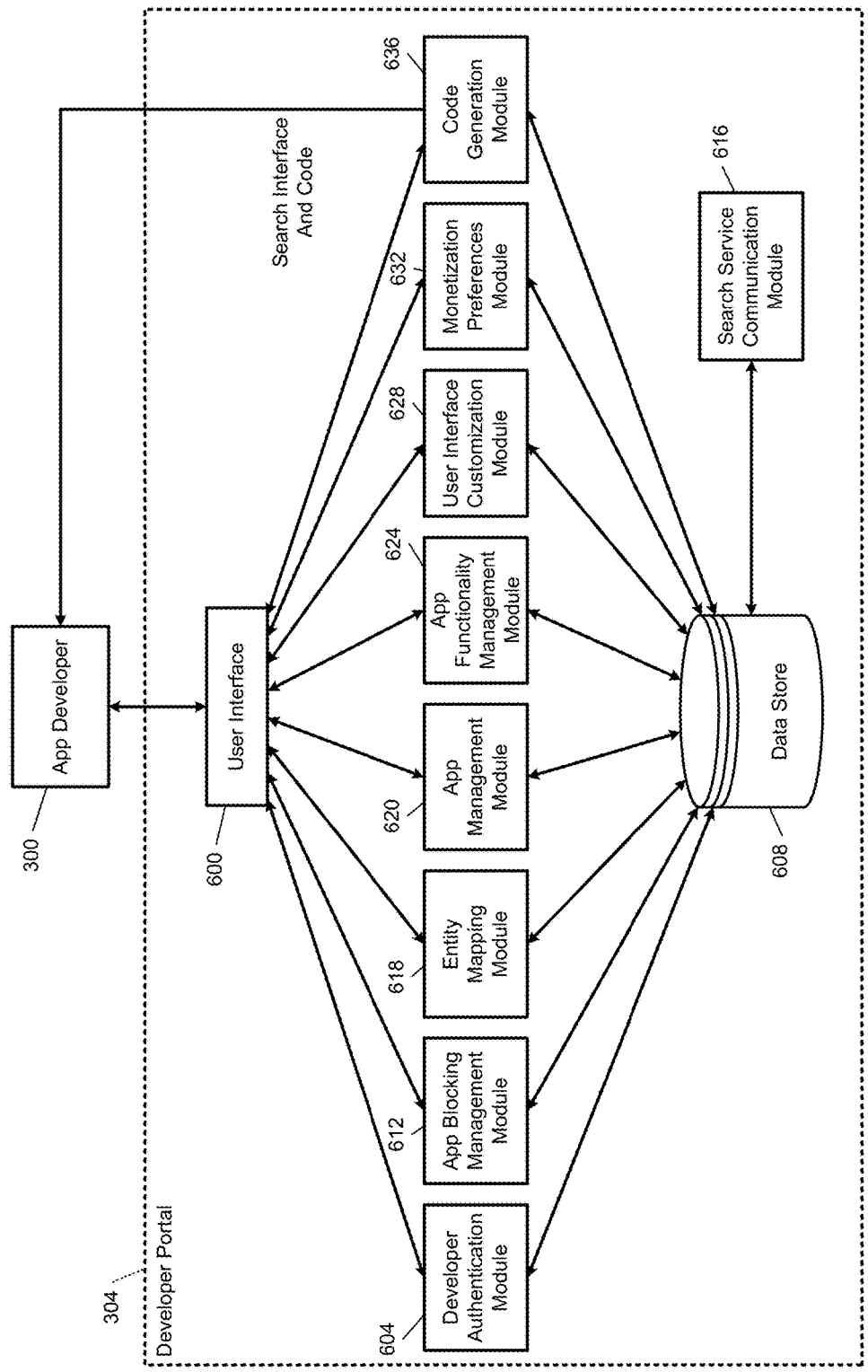
FIG. 20 is a high-level functional block diagram of an example developer portal.

In FIG. 20, a high-level functional block diagram of an example implementation of the developer portal 304 is shown. The developer portal 304 includes a user interface 600, which may be implemented as a website, for access by the app developer 300. A developer authentication module 604 stores credentials for various developers and securely authenticates each developer to the developer portal 304. The developer authentication module 604 may store credentials of app developers in a data store 608. Credentials are stored according to best practices, such as by adding a cryptographic salt value and using PBKDF2 (Password-Based Key Derivation Function 2).

An app blocking management module 612 allows for the formulation of patterns that match against apps desired to be blocked by the app developer 300. The patterns and explicitly-selected apps to block are stored in the data store 608, and may have associated metadata indicating whether those apps are blocked for all apps of the developer, for a specific app of the developer, or for a specific function of one or more apps. The entire list of apps available to be blocked may also be stored in the data store 608, and may be obtained from the search system 120.

A search service communication module 616 may periodically update the data store 608 based on the list of apps recognized by the search system 120. User-specific data may be encrypted while stored in the data store 608. In various implementations, general data, such as the list of apps, may be stored in unencrypted form.

An entity mapping module 618 provides entity data from the data store 608 to the app developer 300 and/or provides entity data from the app developer 300 to the data store 608. When the app developer 300 is providing their own internal entity IDs, the entity mapping module 618 may coordinate creation of a mapping between the entities of the app developer 300 and the entities of the search system 120. Matching of these sets of entities is nontrivial and may require manual effort as well as automated heuristic matching. In various implementations, an initial mapping may be generated by the entity mapping module 618 and provided to the app developer 300 for manual review and correction. The entity mapping may then be provided via the search service communication module 616 to the search system 120 so that developer specific entity IDs can be mapped to search system entity IDs.

An app management module 620 tracks various apps that each developer is working on, including names and other parameters of each app. An app functionality management module 624 tracks what external functionality is being used for each app. The app functionality management module 624 stores a list of the functions used in each app in the data store 608. The app management module 620 stores a list of apps developed by the app developer in the data store 608.

A user interface customization module 628 stores data controlling how each function or app will appear as specified by the developer. This may include graphical properties of a button, such as whether a shadow is present, whether a 3D effect is used, font, etc. In addition, preferences for labelling and presentation of sponsored apps may be set using the user interface customization module 628 and stored in the data store 608.

A monetization preferences module 632 stores monetization preferences for each app developer. In various implementations, monetization preferences may be different for each app of the app developer. An app developer, or an advertiser working on behalf of an app developer, may use the monetization preferences module 632 to book promotion of their app, even if their app does not take advantage of the external functionality features offered by the developer portal 304.

In other words, such developers can pay (according to, for example, cost per impression, cost per click, or cost per install) to have their app promoted by app developers who have implemented external functionality using the code offered by the developer portal 304. For this reason, the developer portal 304 may also be referred to as an advertiser portal. In various implementations, the developer portal 304 may charge a developer a fee (which may be assessed per app or per query sent to the search system 120) to use the code and services from the developer portal 304.

A code generation module 636 generates code to be provided to the app developer 300. This code may include a custom SDK library based on data from the app blocking management module 612, the app management module 620, the app functionality management module 624, the user interface customization module 628, and the monetization preferences module 632. The code generation module 636 may generate specific API calls to implement the preferences of the app developer. The code generation module 636 may also provide a software development kit to the app developer 300.

As preferences change in the data store 608, the search service communication module 616 may update the search system 120 with the updated preferences. In this way, the app developer may be able to alter which apps are blocked, which sponsored apps are shown, etc. for an app that has already been distributed.

Advertiser Portal

Figure 21:
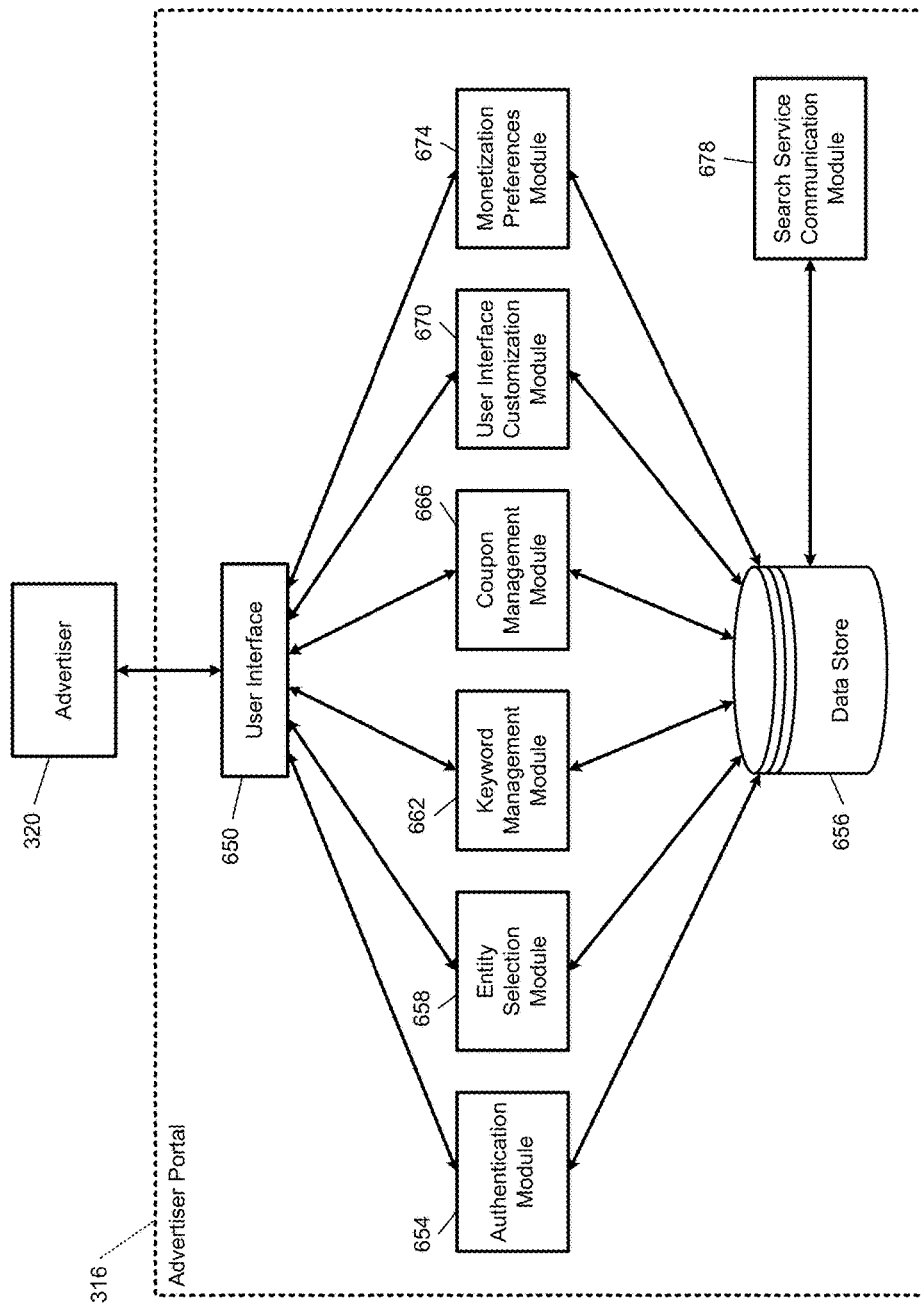
FIG. 21 is a high-level functional block diagram of an example advertiser portal.

In FIG. 21, a high-level functional block diagram of an example implementation of the advertiser portal 316 is shown. The advertiser portal 316 includes a user interface 650, which may be implemented as a website, for access by the advertiser 320. An authentication module 654 stores credential information for each advertiser into a data store 656 and securely authenticates each advertiser to the advertiser portal 316.

An entity selection module 658 allows the advertiser 320 to select states for sponsorship. For example, in a restaurant context, the advertiser 320 may set a bid price for the FRENCH LAUNDRY restaurant entity of the YELP app. The advertiser 320 may condition the bid price on the French Laundry Yelp state being shown on a user device within a first screen of state results, or may condition the bid price on the French Laundry Yelp state being selected by a user. Still further, the advertiser 320 may condition the bid price on some further action by the user, such as installation of the Yelp app or on redemption of a coupon for the French Laundry restaurant within the Yelp app. As another example, the advertiser 320 may condition a bid price for the French Laundry state of the OPENTABLE app on reservations being made through the OpenTable app.

The developer may define multiple campaigns, and associate different selected states and bid prices with each campaign. Additional parameters may be associated with each campaign. For example only, a campaign may be limited to a specific operating system, such as Google's ANDROID operating system. A campaign may be limited by time of day, day of week, and by geolocation of the user's device. Settings for each campaign are stored in the data store 656.

The advertiser 320 may specify that an app state should be shown when similar apps or states are included in the consideration set. The similarity may be explicitly specified by the advertiser—for example, by listing apps and/or app states similar to the advertiser's app state. In other implementations, the search system 120 may include a similarity assessment module (not shown) that assesses how similar two apps or app states are to each other.

In various implementations, the advertiser may choose to have their app or app state shown when the search query includes certain keywords. A keyword management module 662 allows the advertiser 320 to select keywords that will trigger a sponsored app or app state. The keywords may be triggered by language in a user device's search query, or based on text associated with apps or app states that are being considered for presentation to the user. The advertiser 320 identifies what sponsored app state should be included in search results when a keyword is detected. The keyword settings for each campaign are stored in the data store 656.

Keyword campaigns and state-based campaigns may be overlapping or may be defined independently. For example, a sponsored state in the entity selection module 658 may be associated with a bid price, and the bid price may be used in ranking the sponsored state when the search system 120 is generating search results for a user device. Meanwhile, a keyword specified in the keyword management module 662 may be used to trigger inclusion of an app or app state that was not already under consideration for inclusion in search results. The advertiser may specify that a sponsorship should only be triggered by keyword in a situation where the advertiser does not want to pay to visually emphasize an app or app state that is already included in search results, but would be willing to pay for the app or app state to be included.

A coupon management module 666 allows the advertiser 320 to specify coupons that are associated with a state. The existence of coupons may be displayed on a user device at no cost to the advertiser 320 to provide users of the search system 120 with as many promotional opportunities as possible. Alternatively, the advertiser portal 316 may charge the advertiser 320 for placing coupon information next to a state. For example only, the advertiser 320 may indicate to the coupon management module 666 that a coupon (such as "$10 Off Prix Fixe Menu on Thursdays") is offered by the FRENCH LAUNDRY restaurant state of the YELP app. The advertiser portal 316 may then cause a coupon label to be displayed when the French Laundry state of the Yelp app is included in search results.

A user interface customization module 670 receives, from the advertiser 320, data controlling (or suggesting, depending on how sponsorship is processed by a user device) how sponsorship and coupons will appear, as specified by the developer. This may include graphical properties of a text box or button, such as whether a shadow is present, whether a 3D effect is used, font, etc.

A monetization preferences module 674 records monetization preferences for the advertiser 320 in the data store 656. The monetization preferences module 674 receives payment information for the advertiser 320 and may also manage bid prices for sponsorships set using the entity selection module 658, the keyword management module 662, and the coupon management module 666.

A search service communication module 678 may periodically update the data store 656 based on the list of apps and the list of app states recognized by the search system 120. The general data, such as the list of apps and app states, may be stored in unencrypted form. Meanwhile, any data specific to the advertiser 320 may be encrypted while in the data store 656. As preferences change in the data store 656, the search service communication module 678 provides the updated preferences to the search system 120 for use in identifying and scoring apps and app states.

Search System

Figure 22:
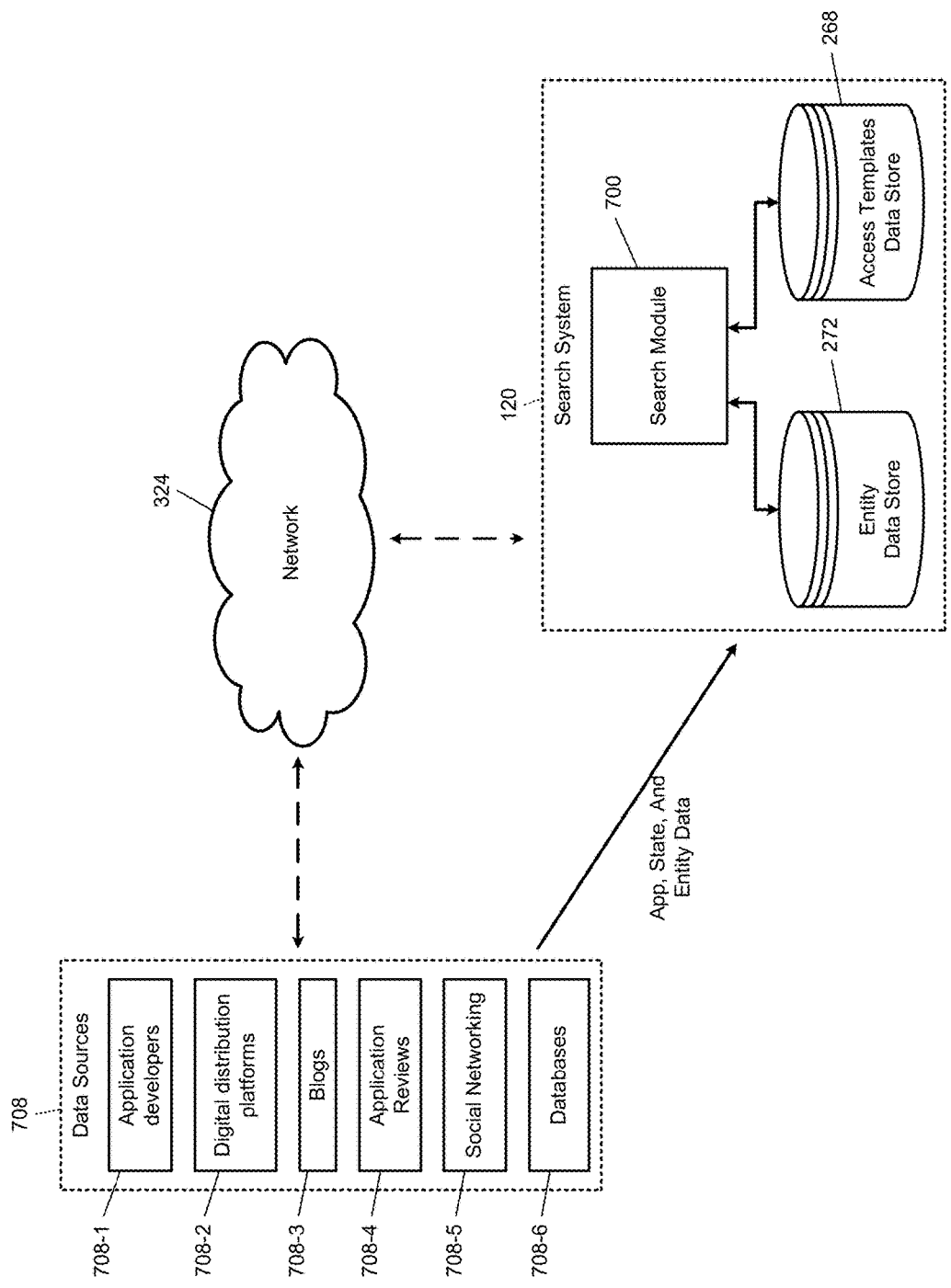
FIG. 22 is a high-level block diagram of an example search system and representative data sources relied on by the search system.

FIG. 22 illustrates an example environment of the search system 120. The search system 120 is a collection of computing devices that receives search queries from user devices via the network 324. Although shown in FIG. 1 as a smartphone 104, a user device can be any suitable user computing device, such as a tablet computing device, a laptop computing device, a gaming device, a vehicle infotainment device, a wearable device, or a smart appliance (such as a smart refrigerator or smart television). In response to receiving a search query from the user device, the search system 120 generates search results based on the search query, as described in more detail below.

In some implementations, user devices communicate with the search system 120 via a partner computing system (not illustrated). The partner computing system may be a computing system of a third party that leverages the search functionality of the search system 120. The partner computing system may be owned by a company or organization other than the operator of the search system 120. Examples of such third parties include Internet service providers, aggregated search portals, and mobile phone providers. The user devices may send search queries to the search system 120 and receive search results from the search system 120, all via the partner computing system. The partner computing system may provide a customized user interface to the user devices and/or may modify the search experience provided on the user devices.

The example implementation of the search system 120 shown in FIG. 22 includes a search module 700, which references entity data stored in the entity data store 272. The search module 700 references access templates stored in the access templates data store 268. The data in the access templates data store 268 and the entity data store 272 may be obtained from data sources 708. The access templates data store 268 and the entity data store 272 may be maintained and updated by the search module 700 and/or a maintenance component (not shown) of the search system 120.

The access templates data store 268 and the entity data store 272 may be updated with databases, indices, tables, files, and other data structures, which may be populated by the data sources 708. The entity data store 272 may store application records, which may be in the format shown in FIG. 23, and entity records, which may be in the format shown in FIG. 29. The access templates data store 268 may store access template records, which may be in the format shown in FIG. 27.

Parsers and other ETL (extract, transform, and load) processes may adapt data from the data sources 708 for storage in the entity data store 272. In some implementations, data may be manually entered and/or manually transformed into a format usable by the entity data store 272. The data sources 708 may include data from application developers 708-1, such as application developers' websites and data feeds provided by developers.

The data sources 708 may include operators of digital distribution platforms 708-2 configured to distribute native applications to user devices. Example digital distribution platforms 708-2 include the Google PLAY digital distribution platform by Google, Inc., the APP STORE digital distribution platform by Apple, Inc. and WINDOWS PHONE store by Microsoft Corp. The data sources 708 may also include other websites, such as blogs 708-3, application reviews websites 708-4, and social networking sites 708-5, such as the FACEBOOK site by Facebook, Inc. and the TWITTER site by Twitter, Inc.

The data sources 708 may also include online databases 708-6 of data related to movies, television programs, music, restaurants, etc. Each of the data sources 708 may have independent ontologies and may be updated at different rates. Therefore, the entity data store 272 may be updated from each of the data sources 708 at different rates. In addition, credibility and accuracy of data may differ across the data sources 708. Measures of reliability, timeliness, and accuracy may be stored in the entity data store 272 and may be used to weight search results obtained from those data sources 708.

Application Records

Figure 23:
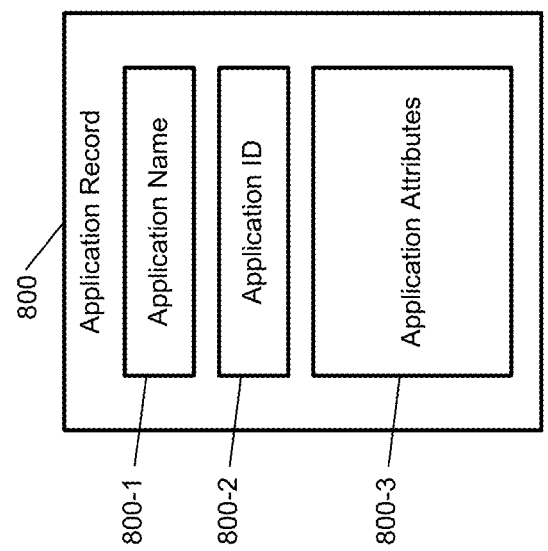
FIG. 23 is a graphical representation of an example application record format.

In FIG. 23, an example format of an application record 800 includes an application name 800-1, an application identifier (ID) 800-2, and application attributes 800-3. The application record 800 generally represents data that can be stored in the entity data store 272 for a specific application. The entity data store 272 may include thousands or millions of records having the structure specified by the application record 800. The application ID 800-2 uniquely identifies an application in the entity data store 272. The application ID 800-2 may be assigned by the search system 120 and may therefore be independent of any ID assigned by, for example, a digital distribution platform.

A single value for the application ID 800-2 may cover multiple application editions. The term "edition" applies to multiple versions of a single app and may also apply to versions of that app released for alternative operating systems. For example only, Angry Birds (as shown in FIG. 24) may be available on Android and iOS mobile device platforms and, for each platform, may have a series of versions bug fixes are released and as the application is updated to take advantage of, and to adapt to, newer versions of operating system.

Figure 24:
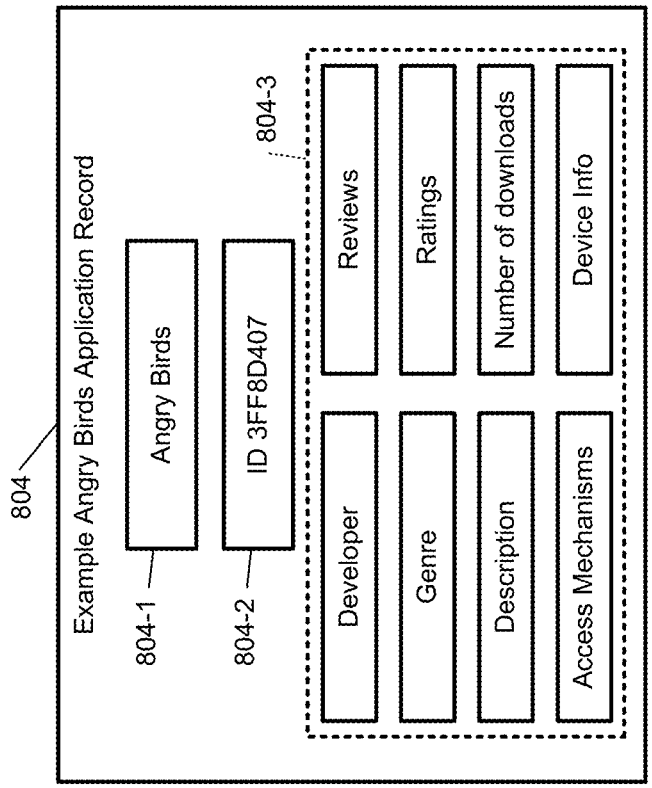
FIG. 24 is a graphical representation of an example application record according to the format of FIG. 23.

As shown in FIG. 24, an example application record 804 for an ANGRY BIRDS app includes a name 804-1 of "Angry Birds" and a unique ID 804-2 expressed in hexadecimal as 0x3FF8D407. Attributes 804-3 for Angry Birds may include a name of the developer of Angry Birds, text reviews of Angry Birds, a genre indicator for Angry Birds (such as "Games," or sub-genre "Physics-Based Games"), ratings (such as star ratings) for Angry Birds, a textual description (which may be provided by the developer), a number of downloads (which may be restricted to the most recent edition or could be for all editions), access mechanisms (how to open Angry Birds when already installed or how to install Angry Birds when not yet installed), and device info (for example, minimum requirements of operating system, hardware, and resolution for best operation).

The term "software application" can refer to a software product that causes a computing device to perform a function. In some examples, a software application may also be referred to as an "application," an "app," or a "program." Software applications can perform a variety of different functions for a user. For example, a restaurant reservation application can make reservations for restaurants, and an Internet media player application can stream media (such as a song or movie) from the Internet.

In some examples, a single software application can provide more than one function. For example, a restaurant reservation application may also allow a user to read user reviews for a restaurant in addition to making reservations. As another example, an Internet media player application may also allow a user to perform searches for digital media, purchase digital media, generate media playlists, and share media playlists.

The functions of an application can be accessed using native application editions of the software application and/or web application editions of the software application. A native application edition (or, "native application") is, at least in part, installed on a user device. In some scenarios, a native application is installed on a user device, but accesses an external resource (e.g., an application server) to obtain data from the external resource. For example, social media applications, weather applications, news applications, and search applications may respectively be accessed by one or more native applications that execute on various user devices. In such examples, a native application can provide data to and/or receive data from the external resource while accessing one or more functions of the software application.

In other scenarios, a native application is installed on the user device and does not access any external resources. For example, some gaming applications, calendar applications, media player applications, and document viewing applications may not require a connection to a network to perform a particular function. In these examples, the functionality of the software product is encoded in the native application itself.

Web application editions (also referred to as "web applications") of a software application may be partially implemented by a user device (such as by a web browser executing on the user device) and partially implemented by a remote computing device (such as a web server or application server). For example, a web application may be an application that is implemented, at least in part, by a web server and accessed by a web browser native to the user device. Example web applications include web-based email, online auctions websites, social-networking websites, travel booking websites, and online retail websites. A web application accesses functions of a software product via a network. Example implementations of web applications include web pages and HTML5 application editions.

When rendering a set of app search results, a user device displays a set of user-selectable links that can be selected by a user of the user device. A user-selectable link may include one or more underlying access mechanisms. A user-selectable link, when selected by a user, causes the user device to access a software application using an edition of the software application identified by the access mechanism.

Examples of access mechanisms include application access mechanisms, web access mechanisms, application download addresses, and scripts. An application access mechanism may be a string that includes a reference to a native application and indicates one or more operations for the user device to perform. If a user selects a user selectable link including an application access mechanism, the user device may launch the native application referenced in the application access mechanism.

In some implementations, any combination of the operating system of the user device, a search application executed by the user device, a native application executed by the user device, and/or a web browser executed by the user device can launch the native application referenced in the application access mechanism. An application resource identifier is an example application access mechanism.

A web access mechanism may be a string that includes a reference to a web application edition of a software product, and indicates one or more operations for a web browser to execute. A web access mechanism may be a resource identifier that includes a reference to a web resource (e.g., a page of a web application/website). For example, a web access mechanism may refer to a uniform resource locator (URL) used with hypertext transfer protocol (HTTP). If a user selects a user-selectable link including a web access mechanism, the user device may launch a web browser application and may pass the resource identifier to the web browser.

An application download access mechanism may indicate a location (such as a digital distribution platform) where a native application can be downloaded in the scenario where a native application edition of the application is not installed on the user device. If a user selects a user-selectable link including an application download access mechanism, the user device may access a digital distribution platform from which the referenced native application edition may be downloaded. The user may opt to download the native application edition. Upon installation, the user device may automatically launch the native application edition.

A script access mechanism is a set of instructions that, when executed by the user device, cause the user device to access a resource indicated by the script. For example, the script may instruct an operating system of the user device to launch a digital distribution platform interface application; browse to the specified native application within the digital distribution platform interface application; install the specified native application; and then open the specified native application.

Application State Records

In FIG. 25, an example format of an app state record 820 includes an app state identifier (ID) 820-1, app state information 820-2, an app identifier (ID) 820-3, and one or more access mechanisms 820-4. The app state ID 820-1 may be used to uniquely identify the app state record 820 in a search data store. The app state ID 820-1 may be a string of alphabetic, numeric, and/or special (e.g., punctuation marks) characters that uniquely identifies the associated app state record 820. In some examples, the app state ID 820-1 describes the application state in a human-readable form. For example, the app state ID 820-1 may include the name of the application referenced in the access mechanisms 820-4.

In a specific example, an app state ID 820-1 for an Internet music player application may include the name of the Internet music player application along with the song name that will be played when the Internet music player application is set into the specified state. In some examples, the app state ID 820-1 is a string formatted similarly to a uniform resource locator (URL), which may include an identifier for the application and an identifier of the state within the application. In other implementations, a URL used as the app state ID 820-1 may include an identifier for the application, an identifier of an action to be provided by the application, and an identifier of an entity that is the target of the action.

For example only, see FIG. 26, which shows an example app state record 824 associated with the OPENTABLE application from OpenTable, Inc. The OPENTABLE application is a restaurant-reservation application that allows users to search for restaurants, read reviews, and make restaurant reservations. The example app state record 824 of FIG. 26 describes an application state of the OPENTABLE application in which the OPENTABLE application accesses information for THE FRENCH LAUNDRY restaurant, a Yountville, Calif. restaurant. An app state ID 824-1 for the example app state record 824 is shown as "OpenTable—The French Laundry."

Another implementation of the displayed app state ID 824-1 is based on a triplet of information: {application, action, entity}. The triplet for the app state record 824 may be {"OpenTable", "Show Reviews", The French Laundry"}. As mentioned above, this triplet may be formatted as a URL, such as the following: "func://www.OpenTable.com/Show_Reviews/The_French_Laundry." Note that a different namespace is used ("func://") to differentiate from the standard web namespace (http://"), as the URL-formatted ID may not resolve to an actual web page. For example only, the OpenTable website may use a numeric identifier for each restaurant in their web URLs instead of the human-readable "The_French_Laundry."

Continuing with FIG. 25, the app state information 820-2 may include data that describes an app state into which an application is set according to the access mechanisms 820-4. The types of data included in the app state information 820-2 may depend on the type of information associated with the app state and the functionality specified by the access mechanisms 820-4. The app state information 820-2 may include a variety of different types of data, such as structured, semi-structured, and/or unstructured data. The app state information 820-2 may be automatically and/or manually generated and updated based on documents retrieved from various data sources, which may include crawling of the apps themselves.

In some examples, the app state information 820-2 includes data presented to a user by an application when in the app state corresponding to the app state record 820. For example, if the app state record 820 is associated with a shopping application, the app state information 820-2 may include data that describes products (such as names and prices) that are shown in the app state corresponding to the app state record 820. As another example, if the app state record 820 is associated with a music player application, the app state information 820-2 may include data that describes a song (such as by track name and artist) that is played or displayed when the music player application is set to the specified app state.

When the app state record 820 corresponds to a default state of an application, the app state information 820-2 may include information generally relevant to the application and not to any particular app state. For example, the app state information 820-2 may include the name of the developer of the application, the publisher of the application, a category (e.g., genre) of the application, a text description of the application (which may be specified by the application's developer), and the price of the application. The app state information 820-2 may also include security or privacy data about the application, battery usage of the application, and bandwidth usage of the application. The app state information 820-2 may also include application statistics, such as number of downloads, download rate (for example, average downloads per month), download velocity (for example, number of downloads within the past month as a percentage of total downloads), number of ratings, and number of reviews.

In FIG. 26, the example app state record 824 includes app state information 824-2, including a restaurant category field 824-2a of THE FRENCH LAUNDRY restaurant, a name and text description field 824-2b of THE FRENCH LAUNDRY restaurant, user reviews field 824-2c of THE FRENCH LAUNDRY restaurant, and additional data fields 824-2d.

The restaurant category field 824-2a may include multiple categories under which the restaurant is categorized, such as the text labels "French cuisine" and "contemporary." The name and description field 824-2b may include the name of the restaurant ("The French Laundry") and text that describes the restaurant. The user reviews field 824-2c may include text of user reviews for the restaurant. The additional data fields 824-2d may include additional data for the restaurant that does not specifically fit within the other defined fields, such as a menu, prices, and operating hours.

Continuing with FIG. 25, the app ID 820-3 uniquely identifies an application associated with the app state record 820. For example, a value for application ID 824-3 in the app state record 824 uniquely identifies the OpenTable application. The application ID 824-3 may refer to a canonical OpenTable software product that encompasses all of the editions of the OpenTable application, including all the native versions of the OpenTable application across platforms (for example, IOS and ANDROID operating systems) and any web editions of the OpenTable application.

The access mechanisms 820-4 specify one or more ways that the state specified by the app state record 820 can be accessed. For any given user device, only some of the access mechanisms 820-4 may be relevant. For illustration, the example app state record 824 depicts three access mechanisms 824-4, including access mechanism "a" 824-4a, access mechanism "b" 824-4b, and access mechanism "c" 824-4c.

For example, the access mechanism 820-4a may include a reference to a native IOS operating system edition of the OPENTABLE application along with one or more operations to be performed by the user device. For example, the access mechanism 820-4a may include an application resource identifier for the native iOS edition of the OPENTABLE application and one or more operations that navigate to the state in the OPENTABLE application for THE FRENCH LAUNDRY restaurant.

The access mechanism 820-4b may include a reference to a native ANDROID operating system edition of the OPENTABLE application along with one or more operations to be performed by the user device to navigate to the state in the ANDROID OPENTABLE application for THE FRENCH LAUNDRY. The access mechanism 820-4c may include a reference to a web edition of the OPENTABLE application, such as a URL that corresponds to a web page for THE FRENCH LAUNDRY restaurant on the OPENTABLE web site.

Access Template Records

Figure 27:
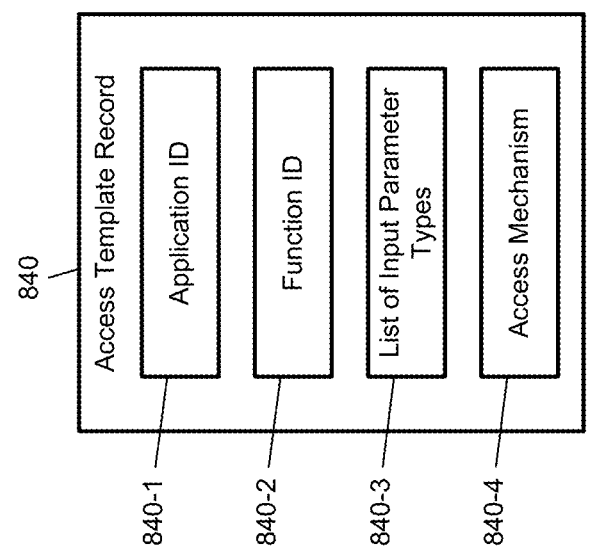
FIG. 27 is a graphical representation of an example access template record format.

In FIG. 27, an example format of an access template record 840 includes an application ID 840-1, a function ID 840-2 (from a function ontology, such as the function ontology 220), and a list of parameter types 840-3 input to the access template to generate an access mechanism 840-4.

Figure 28:
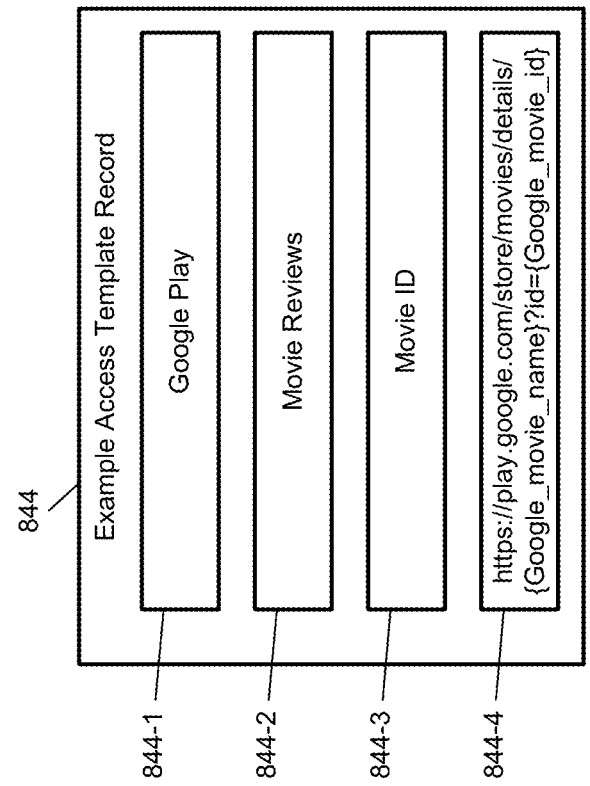
FIG. 28 is a graphical representation of an example access template record according to the format of FIG. 27.

In FIG. 28, an example access template record 844 is demonstrated in conformance with the format of FIG. 27. An application ID 844-1 indicates "Google Play." Note that the ID may in fact be something other than plaintext, such as a binary or alphanumeric sequence. A function ID 844-2 indicates that the function is providing movie reviews. Again, the function ID 844-2 may simply be a prearranged unique identifier (such as binary or alphanumeric) that is tied to a specific function in the function ontology.

Input parameter types 844-3 include a single input parameter, which is of type "movie ID." This indicates that the example access template record 844 can be used as long as a movie type of entity (which will have a movie ID) has been established and the entity includes Google-specific data or a link to a Google-specific entity. An access mechanism 844-4 provides a format to create an access URL with two parameters. These two parameters may be looked up from a Google-specific entity linked to a canonical entity identified by the movie ID.

FIG. 30 and FIG. 31 show example entity records according to a format shown in FIG. 29. The entity data store 272 includes data associated with a variety of different entities. The entity data store 272 may include one or more databases, indices (e.g., inverted indices), files, or other data structures storing this data. The entity data store 272 of the present disclosure includes a variety of entity records. Each entity record includes data associated with a different entity. For example, an entity record may include data that is descriptive of an entity.

The term "entity" may generally refer to a noun (e.g., a person, animal, place, thing, or idea). Examples of entities may include, but are not limited to, the movie named "The Lion King," the soundtrack named "The Lion King," the song named "Hey Jude," and the book named "The Hobbit." Although an entity often refers to a noun, an entity may include other parts of speech (e.g., verbs, adjectives, etc.).

An entity record may be a data structure that includes an entity name, an entity type, and entity information. An entity name may include one or more words, numbers, and/or symbols (e.g., punctuation marks). In some examples, the entity name may refer to a noun, which denotes a person, animal, place, thing, or idea.

In one example, the entity name of the entity record for The Lion King movie may be "The Lion King." In another example, the entity name of the song Hey Jude may be "Hey Jude." Although entity names may refer to a noun, entity names may also refer to other parts of speech, such as verbs, pronouns, adjectives, etc.

Each entity record may include an entity type that may indicate a category in which the entity name and the entity information belongs. Put another way, the entity type may indicate a category in which the data of the entity record belongs. An entity type may include one or more words, numbers, and/or symbols (e.g., punctuation marks). An entity type may be described by a noun in some examples. Example entity types include, but are not limited to, a movie entity type, a music entity type, a book entity type, and a game entity type.

In one example, an entity record having the entity name "The Lion King" may have an entity type "movie." In this example, the entity type "movie" indicates that the entity record named "The Lion King" relates to a movie. In another example, an entity record having the entity name "The Lion King Soundtrack" may have an entity type "music." In this example, the entity type "music" indicates that the entity record named "The Lion King Soundtrack" relates to music.

Each entity record may include entity information. Entity information may refer to data included in the entity record in addition to the entity name and the entity type. Entity information may include various types of data. For example, entity information may include structured, semi-structured, and/or unstructured data. Examples of different types of data that may be included in entity information is described below.

Structured data in the entity information of an entity record may include data that is associated with a defined data field. In some implementations, the defined data fields may be tailored to the entity type of the entity record. For example, entity information for an entity record having a movie entity type may include data fields for actor(s), director(s), and producer(s).

As another example, entity information for an entity record having a music type may include data fields for an artist's name, track names, and track lengths. As another example, entity information for an entity record having a book type may include data fields for an author's name, a publisher, and a publication date.

Unstructured data in the entity information of an entity record may include data that is not specifically associated with a defined data field. Instead, unstructured data may be in free form, such as text from websites, review articles, wiki articles, or other sources. For example, entity information for a movie entity type may include unstructured data, such as critic reviews and plot summaries. As another example, entity information for a book entity type may include unstructured data, such as book synopses, book reviews, and passages from the book.

Semi-structured data in the entity information of an entity record may refer to data that at a broad level is associated with a data field, but the data within the data field is provided in an unstructured manner. For example, data in the entity information may be broadly associated with a description data field, but text associated with the description data field may be considered unstructured at a more granular level. In the example of a book entity, semi-structured data may include a synopsis of a book chapter in a data field for that chapter of the book. In the example of a movie entity, semi-structured data may include movie review text in a data field for movie reviews.

In some implementations, an entity record may also include an entity identifier (ID) that identifies the entity record amongst the other entity records included in the entity data store 272. For example, the entity ID may uniquely identify the entity record. The entity ID may be a string of alphabetic, numeric, and/or symbolic characters (e.g., punctuation marks) that uniquely identify the entity record in which the entity ID is included.

In implementations of the entity data store 272 where different entity records have the same entity name, the entity ID and/or the entity type may be used to differentiate the entity records. For example, the entity name "Beethoven" could be associated with a variety of different entity records such as an entity record having a music entity type, an entity record having a biographic book entity type, and an entity record having a movie entity type. Though otherwise similar in name, the entity ID permits differentiation between these "Beethoven" entity records.

The search system 120 retrieves entity data from various data sources 708. The entity data retrieved from various data sources 708 can include any type of data related to entity records described herein. For example, the entity data may include any data related to an entity name, an entity type, entity information, an entity quality score, and a list of associated applications.

The search system 120 is configured to generate and update the entity data store 272 based on data retrieved from the data sources 708. For example, the search system 120 may use the retrieved data to update one or more databases, indices, files, or other data structures included in the entity data store 272. The search system 120 may generate new entity records and update existing entity records based on the data retrieved from the data sources 708. In some examples, some data included in the entity data store 272 may be manually generated.

Entity Records

FIG. 29 shows an example entity record 880 that may be included in the entity data store 272. The entity record 880 may generally represent data stored in the entity data store 272 that is related to an entity (e.g., a noun). It is contemplated that the data included in the illustrated entity record 880 could be stored and accessed in a variety of different ways.

The entity data store 272 includes data related to a variety of different entities. Accordingly, the entity data store 272 may include a variety of entity records having a similar structure as the entity record 880. Put another way, the entity data store 272 may include a variety of entity records having an entity name 880-1, an entity ID 880-2, an entity type 880-3, and entity information 880-4.

The entity name 880-1 may include one or more words, numbers, and/or symbols (e.g., punctuation marks). In some examples, the entity name 880-1 may denote a person, animal, place, thing, or idea. The entity record 880 includes an entity type 880-3 that indicates a category in which the data of the entity record 880 belongs. For example, the entity type 880-3 indicates the category in which the entity name 880-1 and the entity information 880-4 belong. The entity type 880-3 may include one or more words, numbers, and/or symbols (e.g., punctuation marks). For example, the entity type 880-3 may be a noun.

The entity record 880 includes an entity identifier 880-2 (i.e., "entity ID 880-2"). The entity ID 880-2 may identify the entity record 880 amongst the other entity records included in the entity data store 272. For example, the entity ID 880-2 may uniquely identify the entity record 880. The entity ID 880-2 may be a string of alphabetic, numeric, and/or symbolic characters (e.g., punctuation marks) that uniquely identify the entity record 880.

FIG. 30 and FIG. 31 show different example entity records 884, 888. Entity record 884 includes data related to the movie named "The Dark Knight Rises." Entity record 888 includes data related to the comic book named "The Dark Knight Rises." The entity names 884-1, 888-1 for the entity records 884, 888 include the names of the movie and the comic book, respectively. In the example entity names 884-1, 888-1, the stop word "the" has been removed. The entity type "movie" of entity record 884 indicates the category in which the entity name "Dark Knight Rises" and the entity information 884-4 belongs.

Put another way, the entity type "movie" of the entity record 884 indicates that the entity name 884-1 and entity information 884-4 included in the entity record 884 is related to a movie. The entity type "comic book" of entity record 888 indicates the category in which the entity name "Dark Knight Rises" and the entity information 888-4 belongs. Put another way, the entity type "comic book" of the entity record 888 indicates that the entity name 888-1 and the entity information 888-4 included in the entity record 888 is related to a comic book.

The entity records 884, 888 include different entity IDs 884-2, 888-2. Specifically, entity records 884, 888 include entity IDs "ID#1" and "ID#2." Entity IDs "ID#1" and "ID#2" represent different entity IDs that may uniquely identify entity records 884, 888, respectively. For example, "ID#1" and "ID#2" may represent different strings of alphabetic, numeric, and/or symbolic characters that uniquely identify entity records 884, 888 in the entity data store 272.

Referring back to FIG. 29, the entity record 880 includes entity information 880-4. The entity information 880-4 represents data in the entity record 880 in addition to the entity name 880-1 and the entity type 880-3. In general, the entity information 880-4 may include any data that is associated with either the entity name 880-1 or the entity type 880-3. In some implementations, the data included in the entity information 880-4 may be data that is associated with both the entity name 880-1 and the entity type 880-3. Put another way, the data included in the entity information 880-4 may be related to the entity name 880-1 and included in a category described by the entity type 880-3.

The entity information 880-4 may include various types of data (e.g., structured, semi-structured, and/or unstructured data). Structured data in the entity information 880-4 may refer to data included in a defined data field. Semi-structured data in the entity information 880-4 may refer to data that at a broad level is associated with a data field, but the data within the data field is provided in an unstructured manner. Unstructured data in the entity information 880-4 may include data that is not specifically associated with a defined data field.

The entity information 880-4 may include data that is associated with a defined data field. In some examples, the defined data fields may be tailored to the entity type 880-3 of the entity record 880. For example, entity records having a first entity type may include a first set of data fields associated with the first entity type. Entity records having a second entity type that is different than the first entity type may include a second set of data fields associated with the second entity type that are different than the first set of data fields. In other examples, the entity records included in the entity data store 272 may have similar data fields, even when the entity records include different entity types.

The entity information 880-4 may include any type of data related to an entity, including, but not limited to, numbers or other statistics related to the entity, names, dates, text from websites, review articles, wiki articles, or other type of data. For example, if the entity type 880-3 is "movie," then the entity information 880-4 may include data fields for actor(s), director(s), producer(s), review(s), and plot summaries.

As another example, if the entity type 880-3 is "music," then the entity information 880-4 may include data fields for an artist's name, track names, and track lengths. As another example, if the entity type 880-3 is "book," then the entity information 880-4 may include data fields for an author's name, a publisher, and a publication date.

FIG. 30 and FIG. 31 show examples of entity information 884-4, 888-4 included in entity records 884, 888. The entity information 884-4 included in entity record 884 is related to the movie named "The Dark Knight Rises." The entity information 888-4 included in entity record 888 is related to the comic book named "The Dark Knight Rises." The entity information 884-4 includes data fields related to a movie, such as a list of actors, a director, reviews, and a plot summary. The entity information 888-4 includes data fields related to a comic book, such as one or more authors, one or more artists, a publication date, and comic book reviews.

The data fields illustrated in the entity information 884-4, 888-4 of FIG. 30 and FIG. 31 are only example data fields that may be included in entity information. It is contemplated that entity information 884-4, 888-4 may include additional data fields not illustrated in FIG. 30 and FIG. 31. In some examples, the entity information 884-4, 888-4 may not include some or all of the data fields illustrated in FIG. 30 and FIG. 31.

The different data fields included in the entity information 884-4, 888-4 of entity records 884, 888 illustrate how different entity records may include different data fields. The different data fields included in the entity information 884-4, 888-4 of entity records 884, 888 also illustrate how the data fields included in entity records may be related to the entity type of the entity record. For example, entity record 884 having a "movie" entity type may include data fields related to a movie, such as a list of actors and a director. Similarly, the entity record 888 having a "comic book" entity type may include data fields related to a comic book, such as author(s) and artist(s). Some data fields that are specific to an entity type may not be as meaningful in an entity record having a different entity type. For example, a data field for a list of actors may not be meaningful in an entity record having a "comic book" entity type.

Entity-Based Search Module

Figure 32:
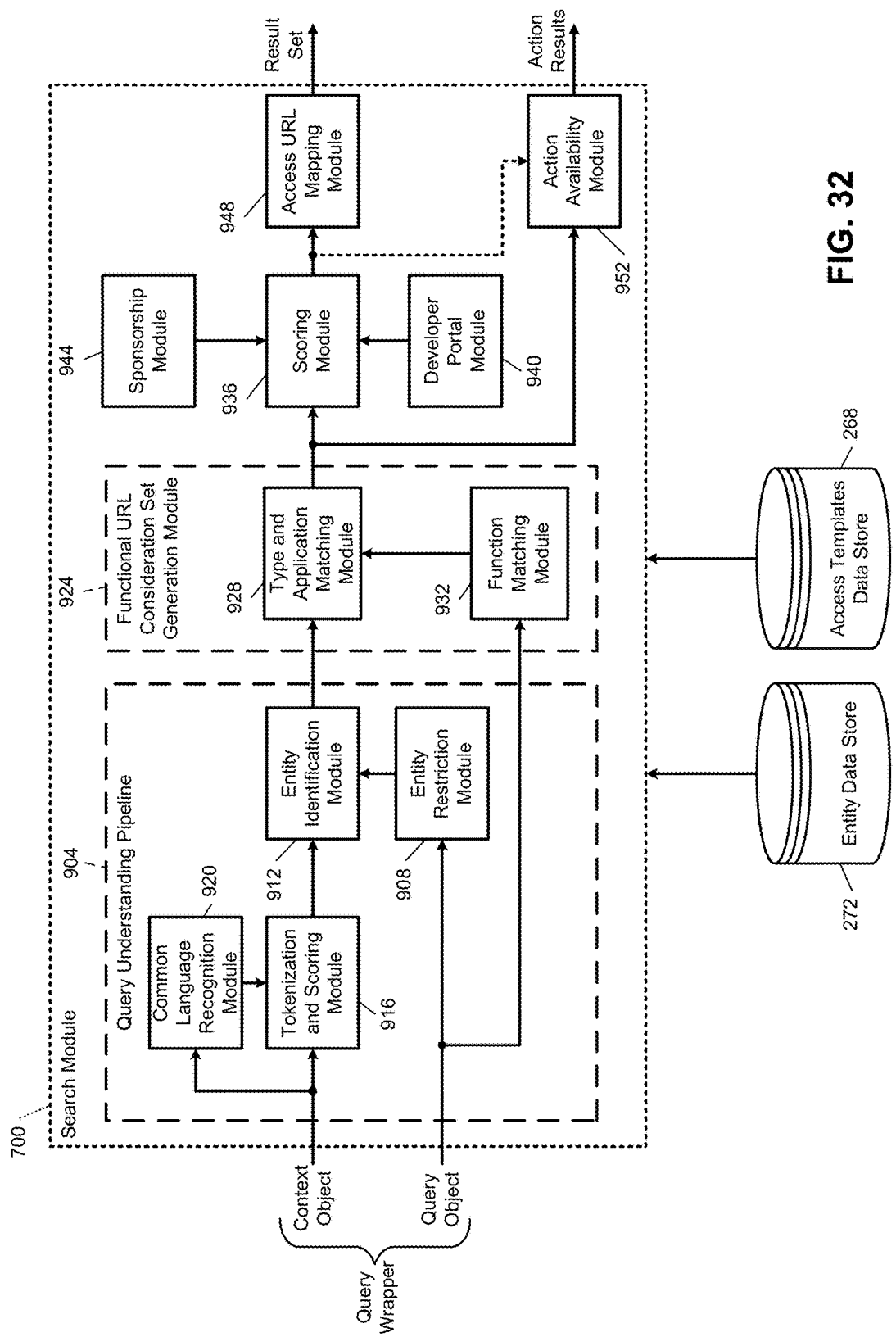
FIG. 32 is a functional block diagram of an example implementation of a search module.

In FIG. 32, an example implementation of the search module 700 includes a query understanding pipeline 904 that identifies relevant entities from the context object and query object of the query wrapper. An entity restriction module 908 receives the query object and, based on the specified function ID, identifies entities within the entity data store 704 that are capable of being used in a functional URL for the specified function. This subset of entities is provided to entity identification module 912, which identifies one or more entity records from the subset of entity records in response to scored terms from a tokenization and scoring module 916.

The tokenization and scoring module 916 receives the context object, which includes text from the state of the app that triggered the transmission of the query wrapper. The tokenization and scoring module 916 receives not just text but also text attributes, such as font, font size, emphasis (bold, underline, italics, color, etc.), proximity to top of page, etc. Further, tags such as HTML (hypertext markup language) or XML (extensible markup language) tags, may indicate the importance of a term. For example, a tag may identify a term or phrase as a heading or a sub-heading. Each of the above characteristics is a clue as to the relevance of a particular term. The tokenization and scoring module 916 may generate initial scores for a set of terms extracted from the text provided in the context object.

A common language recognition module 920 may track language that is used in each type of state received from each app that includes the SDK library. Language that is common to many states of a single type is unlikely to be helpful in defining the entity of interest. The common language recognition module 920 may therefore provide an indication of which received terms are relatively common, which would decrease their score in the token recognition and scoring module 916.

The entity identification module 912 may select entity records from the entity restriction module 908 by detecting matches or near matches between terms from the token recognition and scoring module 916 and terms in the entity record, such as entity name, entity type, and entity information. The entity identification module 912 may attempt to identify entities corresponding to terms that received the highest scores from the token recognition and scoring module 916, and search for entities corresponding to the lower-scoring terms only when entities corresponding to the higher-scoring terms are not found.

Entities identified by the entity identification module 912 are provided to a functional URL consideration set generation module 924, which includes a type and application matching module 928 and a function matching module 932. The type and application matching module 928 determines which access templates are relevant based on the type of entities provided by the entity identification module 912.

The function matching module 932 receives the query object and selects a subset of access templates from the access template data store 268 that correspond to the specified function in the function ontology. This subset of access templates is provided to the type and application matching module 928. For access templates that can be satisfied by the entities provided by the entity identification module 912, the type and application matching module 928 determines whether, for each of the type matched access template, any application-specific information is present for the corresponding entities.

When both the type and the application-specific data match between provided entities and one of the access templates from the function matching module 932, a functional URL is created. The functional URL may be associated with a score, which may be based at least in part on the score from the token recognition and scoring module 916. The type and application matching module 928 outputs ordered sets of application, function, and entity (which may be expressed in the form of a functional URL) to a scoring module 936.

The scoring module 936 reviews the provided scores and may adjust the scores based on data from a developer portal module 940 and a sponsorship module 944. An access URL mapping module 948 generates access URLs for the functional URLs with the highest scores from the scoring module 936. Based on the access templates from the access templates data store 268 and application-specific information from the entity data store 272, the access URL mapping module 948 produces access URLs. As one example only, see FIG. 9. The resulting access URLs are returned, as part of the result set, to the user device.

The developer portal module 940 receives data from the developer portal 304, such as blacklists, and may force a score to zero for any functional URL that is matched by the blacklist. The developer portal module 940 may also specify other parameters to the scoring module 936, such as to exclude any application records and application state records tied to the application that transmitted the query wrapper; this avoids returning self-referential results.

The sponsorship module 944 communicates with the advertiser portal 316 and may increase scores for functional URLs meeting sponsorship criteria. In other implementations, the sponsorship module 944 may instruct the scoring module 936 to include a functional URL as a sponsored result regardless of the score assigned to the functional URL. The sponsorship module 944 may also label functional URLs with a sponsorship designation, which may be visually displayed to a user.

The sponsorship module 944 may also identify functional URLs that correspond to coupons and can provide the coupon information to the user via the scoring module 936. The sponsorship module 944 may operate according to a variety of targeting parameters, which may be specified by an advertiser, such as by using the advertiser portal 316. For example, the advertiser may desire to have their app shown when similar apps are included in the result set.

The similarity may be explicitly specified by the advertiser—for example, by listing apps similar to the advertiser's app. In other implementations, the search system 120 may include a similarity assessment module (not shown) that assesses how similar two apps are to each other. The similarity assessment module may determine the similarity between each of the apps in the consideration set with each of the potential sponsored apps. In various implementations, the advertiser may choose to have their app shown when the search query includes certain keywords.

The sponsorship module 944 may take into account whether a sponsored app is already installed on the user device from which the query wrapper was received. An advertiser may only be willing to pay a reduced price (or even nothing) to promote their app if their app is already installed on the user device.

The sponsorship module 944 may select sponsored apps based on bid prices set by advertisers. An advertiser may set different bid prices to promote their app based on, for example, whether their app is already installed, how similar their app is to other apps in the result set, etc. The sponsorship module 944 may choose, for inclusion in the ordered search results, apps having the highest bid prices for the present search.

An action availability module 952 identifies functional URLs provided to the scoring module 936 and determines which actions are available. The available actions can be returned as action results. However, in various implementations, the action availability module 952 may receive further input from the scoring module 936. For example, a functional URL with too low a score may prevent the action from being reported as an available action. The low score may be as a result of the functional URL being a weak match, or another factor, such as the result being deprecated by the developer portal module 940.

Text-Based Search Module

Figure 33:
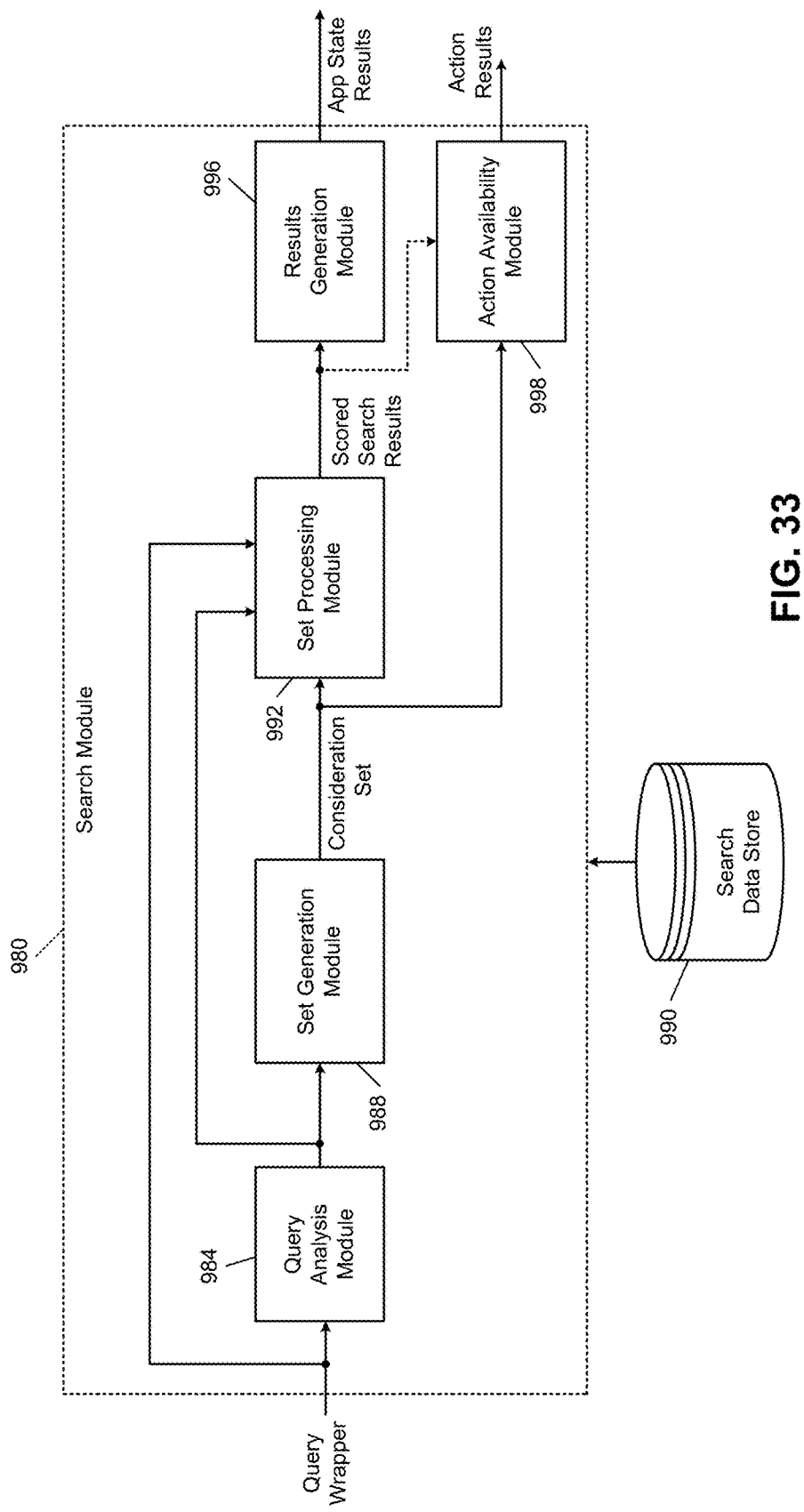
FIG. 33 is a functional block diagram of another example implementation of the search module.

In FIG. 33, an example implementation of the search system 120 includes a search module 980. The search module 980 includes a query analysis module 984 that receives a query wrapper, such as the query wrapper 116 of FIG. 1. The query analysis module 984 analyzes the text query from the query wrapper. For example, the query analysis module 984 may tokenize the query text, filter the query text, and perform word stemming, synonymization, and stop word removal. The query analysis module 984 may also analyze additional data stored within the query wrapper. The query analysis module 984 provides the tokenized query to a set generation module 988.

The set generation module 988 identifies a consideration set of application state records from a search data store 990 based on the query tokens. Application (equivalently, app) state records are described in more detail in FIG. 25 and FIG. 26. In various implementations, the search data store 990 may also include app records. In various implementations, an app record may be stored as an app state record that simply has a predetermined value, such as null, for the specific state of the app.

App state records in the search data store 990 may be generated by crawling and scraping apps according to the principles of the present disclosure. Some or all of the contents of the records of the search data store 990 may be indexed in inverted indices. In some implementations, the set generation module 988 uses the APACHE LUCENE software library by the Apache Software Foundation to identify records from the inverted indices. The set generation module 988 may search the inverted indices to identify records containing one or more query tokens. As the set generation module 988 identifies matching records, the set generation module 988 can include the unique ID of each identified record in the consideration set. For example, the set generation module 988 may compare query terms to an app state name and app attributes (such as a text description and user reviews) of an app state record.

Further, in some implementations, the set generation module 988 may determine an initial score of the record with respect to the search query. The initial score may indicate how well the contents of the record matched the query. For example, the initial score may be a function of term frequency—inverse document frequency (TF-IDF) values of the respective query terms.

A set processing module 992 receives unique IDs of app state records identified by the set generation module 988 and determines a result score for some or all of the IDs. A result score indicates the relevance of an app state with respect to the tokenized query and context parameters. In various implementations, a higher score indicates a greater perceived relevance.

For example, other items in the query wrapper may act as context parameters. Geolocation data may limit the score of (or simply remove altogether) apps that are not pertinent to the location of the user device. A blacklist in the query wrapper may cause the set processing module 992 to remove app records and/or app state records from the consideration set that match the criteria in the blacklist, or to set their score to a null value, such as zero.

The set processing module 992 may generate a result score based on one or more scoring features, such as record scoring features, query scoring features, and record-query scoring features. Example record scoring features may be based on measurements associated with the record, such as how often the record is retrieved during searches and how often links generated based on the record are selected by a user. Query scoring features may include, but are not limited to, the number of words in the search query, the popularity of the search query, and the expected frequency of the words in the search query. Record-query scoring features may include parameters that indicate how well the terms of the search query match the terms of the record indicated by the corresponding ID.

The set processing module 992 may include one or more machine-learned models (such as a supervised learning model) configured to receive one or more scoring features. The one or more machine-learned models may generate result scores based on at least one of the record scoring features, the query scoring features, and the record-query scoring features.

For example, the set processing module 992 may pair the search query with each app state ID and calculate a vector of features for each {query, ID} pair. The vector of features may include one or more record scoring features, one or more query scoring features, and one or more record-query scoring features. In some implementations, the set processing module 992 normalizes the scoring features in the feature vector. The set processing module 992 can set non-pertinent features to a null value or zero.

The set processing module 992 may then input the feature vector for one of the app state IDs into a machine-learned regression model to calculate a result score for the ID. In some examples, the machine-learned regression model may include a set of decision trees (such as gradient-boosted decision trees). Additionally or alternatively, the machine-learned regression model may include a logistic probability formula. In some implementations, the machine-learned task can be framed as a semi-supervised learning task, where a minority of the training data is labeled with human-curated scores and the rest are used without human labels.

The machine-learned model outputs a result score of the ID. The set processing module 992 can calculate result scores for each of the IDs that the set processing module 992 receives. The set processing module 992 associates the result scores with the respective IDs and outputs the most relevant scored IDs.

A results generation module 996 may choose specific access mechanisms from the application records and app state records chosen by the set processing module 992. The results generation module 996 then prepares a results set to return to the user device. Although called "app state results" here, some of the access mechanisms may correspond to a default state (such as a home page) of an app—these may be a special case of an app state record or may be an app record.

The results generation module 996 may select an access mechanism for an app state record based on whether the app is installed on the device. If the app is installed, an access mechanism that opens the app directly to the specified state is selected. Meanwhile, if the app is not installed, a selected access mechanism first downloads and installs the app, such as via a script, before opening the app to the specified state. Opening the app to the specified state may include a single command or data structure (such as an intent in the ANDROID operating system) that directly actuates the specified state. For other apps, a script or other sequence may be used to open the app to a certain state (such as a home, or default, state) and then navigate to the specified state.

The results generation module 996 may generate or modify access mechanisms based on the operating system identity and version for the user device to which the results are being transmitted. For example, a script to download, install, open, and navigate to a designated state may be fully formed for a specific operating system by the results generation module 996.

If the results generation module 996 determines that none of the native access mechanisms are likely to be compatible with the user device, the search module 980 may send a web access mechanism to the user device. If no web access mechanism is available, or would be incompatible with the user device for some reason (for example, if the web access mechanism relies on the JAVA programming language, which is not installed on the user device), the results generation module 996 may omit the result.

An action availability module 998 identifies functional URLs from the consideration set and determines which actions are available. The available actions can be returned as action results. However, in various implementations, the action availability module 998 may receive further input from the set processing module 992. For example, a functional URL with too low a score may prevent the action from being reported as an available action. The low score may be as a result of the functional URL being a weak match. In various other implementations, input from the developer portal may also impact the score of a functional URL.

Software Development Kit

Figure 34:
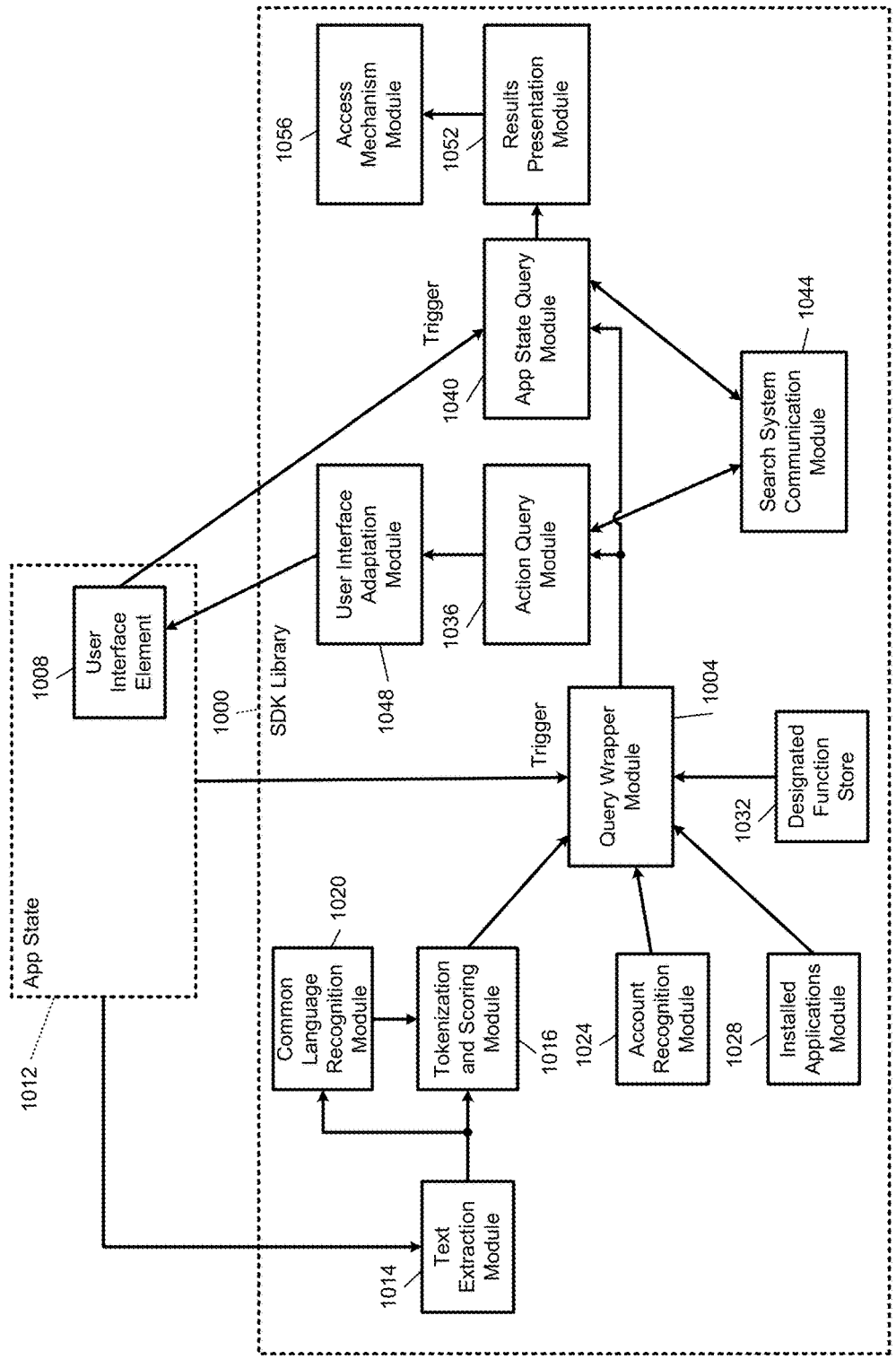
FIG. 34 is a functional block diagram of an example implementation of a software development SDK library provided by the developer portal.

In FIG. 34, an example implementation of a software object (referred to as SDK library 1000) provided by the developer portal 304 is shown. A query wrapper module 1004 is triggered by an app state 1012 of the developer's app being instantiated from an app state template. The developer extended the functionality of the app state 1012 (or, more accurately, the app state template from which the app state 1012 is instantiated) with a user interface element 1008. As described above, the user interface element 1008 may be a button, such as a "Movie Reviews" button or a "Get Directions" button.

When the query wrapper module 1004 is triggered, a text extraction module 1014 scrapes text and formatting from the app state 1012. A tokenization and scoring module 1016 may be implemented in addition to, or in place of, the tokenization and scoring module 916 of the search module 700 (see FIG. 32). Similarly, a common language recognition module 1020 may also be provided in some implementations in place of, or in addition to, the common language recognition module 920 of FIG. 32. The text and formatting of the text extraction module 1014, or the scored tokens from the tokenization and scoring module 1016, are incorporated into the query wrapper module 1004.

In other implementations, the developer may simply provide information about the entity from the app state 1012 to the query wrapper module 1004.

An account recognition module 1024 identifies active user accounts on the user device. For example, an account with a streaming video operator may indicate that some or all movies from that provider can be streamed as part of the existing subscription service. The account recognition module 1024 provides this account data to the query wrapper module 1004. This account data may be used by the search system 120 to score results, with results able to be serviced by existing subscriptions ranked higher than results that would require an additional subscription.

An installed applications module 1028 provides information on installed applications to the query wrapper module 1004. Similar to accounts, the installed applications allow the search system 120 to adjust scores, such as by raising scores of applications already installed and identifying promotion opportunities for applications not yet installed.

A designated function store 1032 stores an identifier of the function or functions designated by the developer during interaction with the developer portal 304. The designated functions are from the function ontology (such as the function ontology 220) and have specific identifiers known to the search system 120. The identifiers may be different for each app state template in the app. The query wrapper module 1004 combines the data provided and provides the data to an action query module 1036 and an app state query module 1040.

The action query module 1036 sends an action query to the search system 120 using a search system communication module 1044. The action results returned by the search system 120 are returned to the action query module 1036 and are then passed to a user interface adaptation module 1048. The user interface adaptation module 1048 may alter the appearance of the user interface element 1008 or hide the user interface element 1008 altogether if the action response indicates that no action corresponding to the user interface element 1008 is available.

Once instantiation of the app state 1012 completes, user actuation of the user interface element 1008 triggers the app state query module 1040 to request app state results from the search system 120 via the search system communication module 1044. When multiple actions are associated with the user interface element 1008, the trigger may indicate which action the user chose. When results are received, the search system communication module 1044 provides the results to a results presentation module 1052. If any of the results are selected by a user, an access mechanism module 1056 enacts the specified access mechanism from the results. For example, this may include launching a web browser, opening an application, or opening a digital distribution platform application to allow a desired application to be installed.

Flowcharts

Figure 35A:
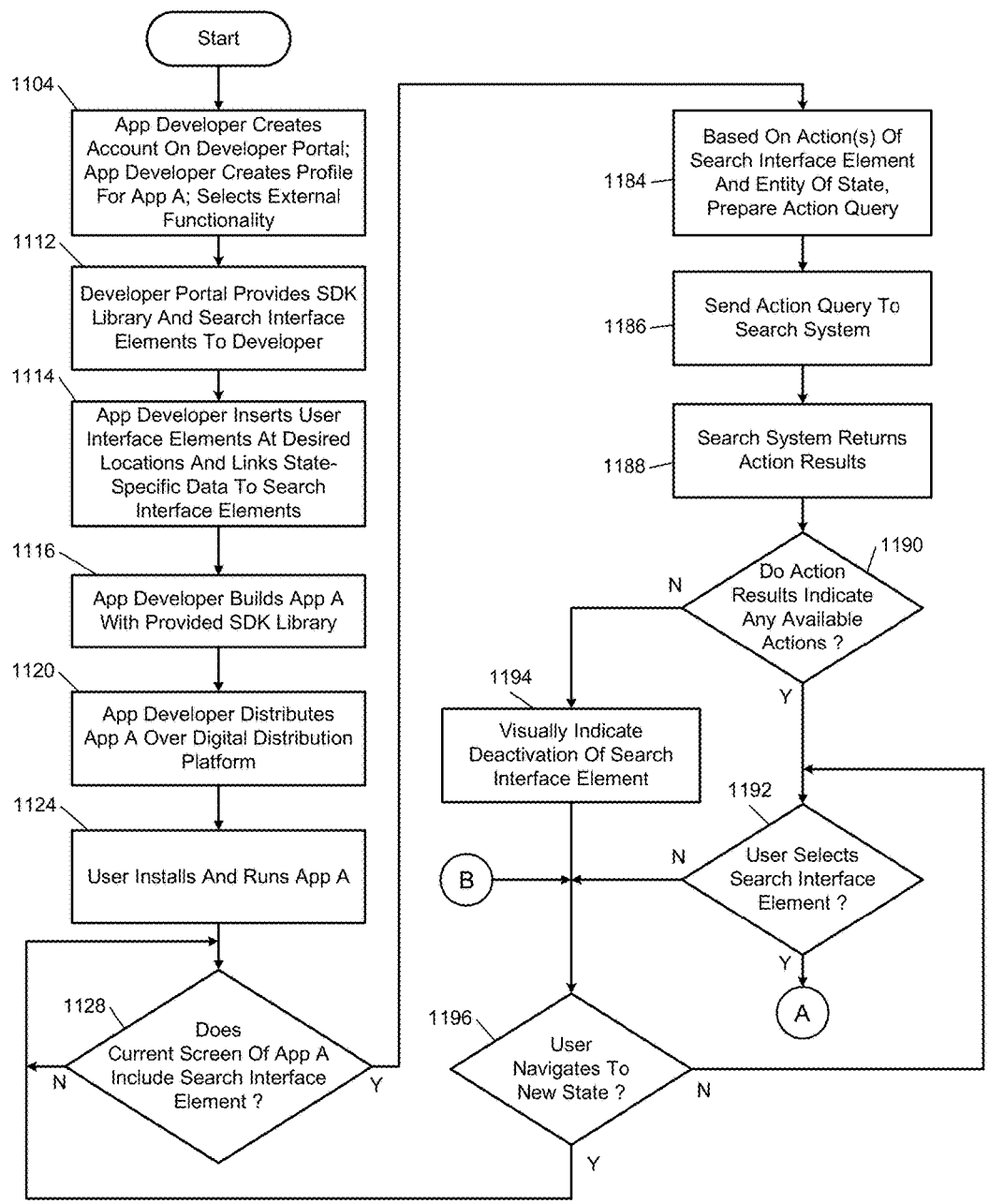
FIG. 35A and FIG. 35B together are a flowchart of example overall operation of the development system.
Figure 35B:
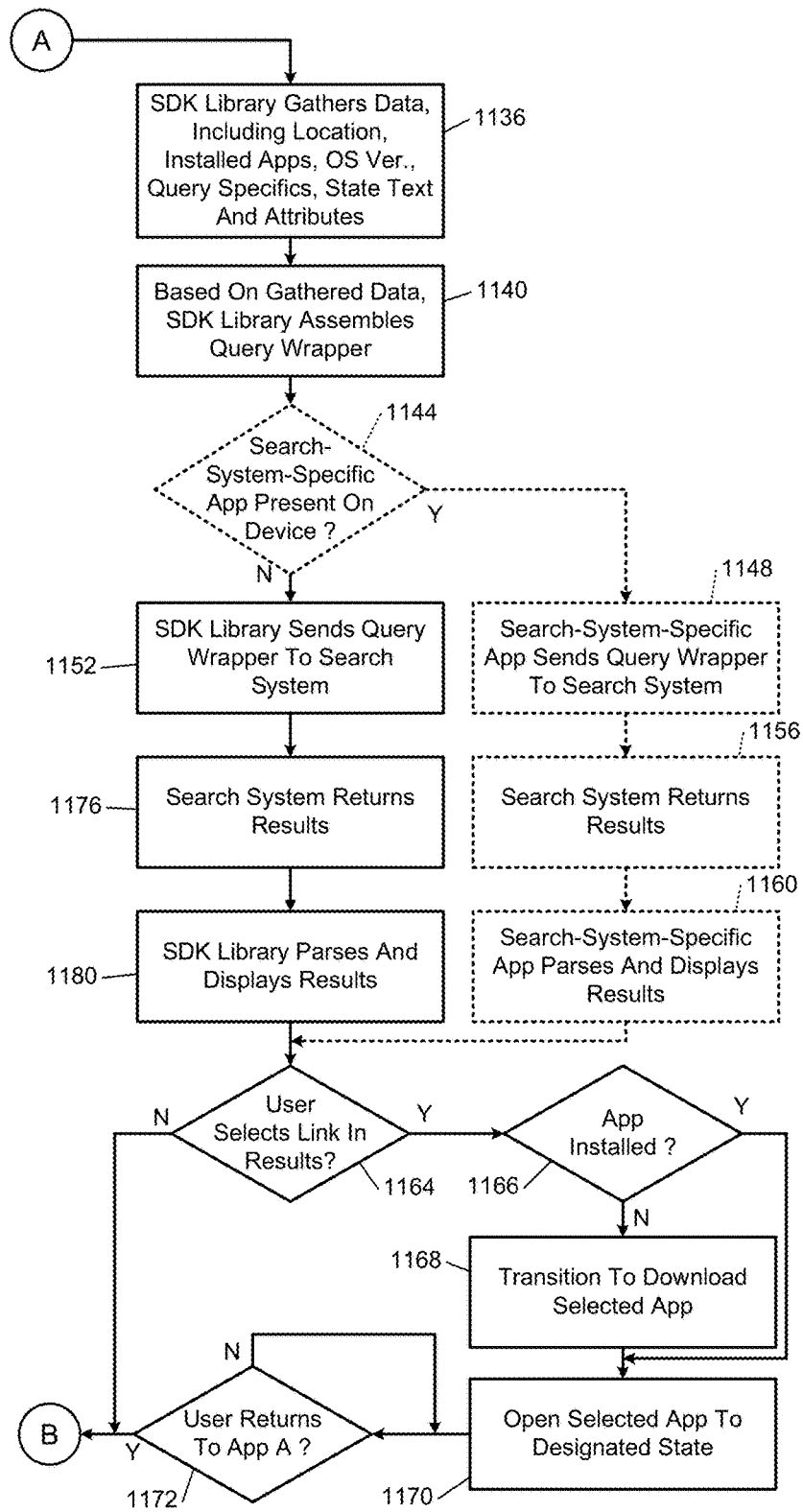

In FIG. 35A and FIG. 35B, an overall operational flowchart begins at 1104 where an app developer creates an account on the developer portal, creates a profile for a first app (App A), and selects external functionality for the developer portal to introduce into App A. At 1112, the developer portal provides the SDK library and search interface elements to the developer for incorporation into App A.

At 1114, the developer inserts user interface elements at desired locations within states of App A and selectively links state-specific data to search interface elements. For example, the developer may supply a text title of a state to a search interface element in that state. As another example, for a search interface element adjacent to a movie theatre, the developer may supply a name and/or address of the movie theatre to the search interface element for formation of a query.

At 1116, the app developer builds App A with the provided code. At 1120, the app developer distributes App A over a digital distribution platform. Once App A is available on the digital distribution platform, a user can install and run App A at 1124. At 1128, control determines whether the current screen of App 1 includes a search interface element, such as an external functionality button. If so, control transfers to 1184; otherwise, control remains at 1128.

At 1184, control prepares an action query based on the action or actions corresponding to the search interface element and the entity relating to the current state. In various implementations, there may be multiple search interface elements, each with one or more specified actions. In addition, each search interface element may relate to a different entity.

The action query is prepared with each of the actions and each of the corresponding entities for all of the search interface elements of the current state. In other implementations, search interface elements that are within the present state but not presently visible (for example, requiring the user to scroll down) may initially be omitted from the action query. These search interface elements can be queried later if the user performs a scrolling operation.

Control continues at 1186, where control sends the action query to the search system. At 1188, control receives the action results from the search system. The action results indicate which of the specified actions are available with respect to the specified entities. At 1190, control determines whether the action results indicate that there are any available actions for the search interface element. If so, control transfers to 1192. Otherwise, control transfers to 1194. When there are multiple search interface elements, the determination of 1190 may be performed separately for each of the search interface elements.

At 1194, control visually indicates deactivation of the search interface element because there are no actions available for that search interface element. Deactivation may include graying out, ghosting, flattening, etc. or may involve hiding the search interface element altogether. Control then continues at 1196.

At 1192, control waits for the user to select the search interface element. Once the search interface element is selected, control transfers to 1136 in FIG. 35B. Otherwise, control continues at 1196. At 1196, control determines when the user has navigated to a new state in App A. Once the user has navigated to a new state, control returns to 1128; otherwise, control returns to 1192.

At 1136 in FIG. 35B, the SDK library in App A gathers data including geolocation, apps installed on the device, a version of the operating system installed on the device, etc. The SDK library may also gather state-specific data, such as a title of a present state or information identifying a relevant entity (such as the name of a movie or the name of a movie theatre). Further, when the search system 120 will be inferring the entity from the context of the state, the SDK library will include some or all of the text and accompanying attributes in the query wrapper. At 1140, the SDK library, based on the gathered data, assembles a query wrapper.

At 1144, an optional decision is made. In certain circumstances, a developer may prefer to hand off presentation of search results to an app operated by the developer portal or by the search system. If this is desired by the developer, the decision at 1144 will transfer to 1148 when the search-system-specific app is present on the device. If the search-system-specific app is not present on the device, or if the developer of App A does not wish to hand off the results presentation to the search-system-specific app, control continues at 1152.

At 1148, the search-system-specific app sends the query wrapper to the search system and at 1156 the search system returns app results. At 1160, the search-system-specific app parses the results and displays the results to the user. Control then continues at 1164.

At 1164, if the user selects one of the links in the result listing, control transfers to 1166; otherwise, if the user exits from the result listing, control transfers to 1196 of FIG. 35A. At 1166, control determines whether the app referenced by the link is already installed. If so, control transfers to 1170; otherwise, control transfers to 1168.

At 1168, control downloads the app and continues at 1170. The download of the app may be performed as specified by an access mechanism corresponding to the specified link. At 1170, control opens the selected app and navigates to the specified state, as directed by the access mechanism. Control continues at 1172, where if the user returns to App A from this newly opened app, control transfers to 1196 of FIG. 35A; otherwise, control remains at 1172.

Returning to 1152, the SDK library embedded in App A sends the query wrapper to a predefined search system, which may be specified by a fully qualified domain name or one or more IP (Internet Protocol) addresses. At 1176, the search system returns app results. At 1180, the SDK library parses and displays the results from the search system to the user. As discussed above, the search results may be adjusted based on which apps are already installed—for example, filtering out states of apps not yet installed. In addition, states may be filtered out when account information indicates that the state will not provide the desired functionality to the user. For example, if a state corresponding to streaming a movie was returned, but the movie is not included within the user's subscription, the corresponding state may be moved down in the rankings or removed altogether. Control then continues at 1164.

Figure 36:
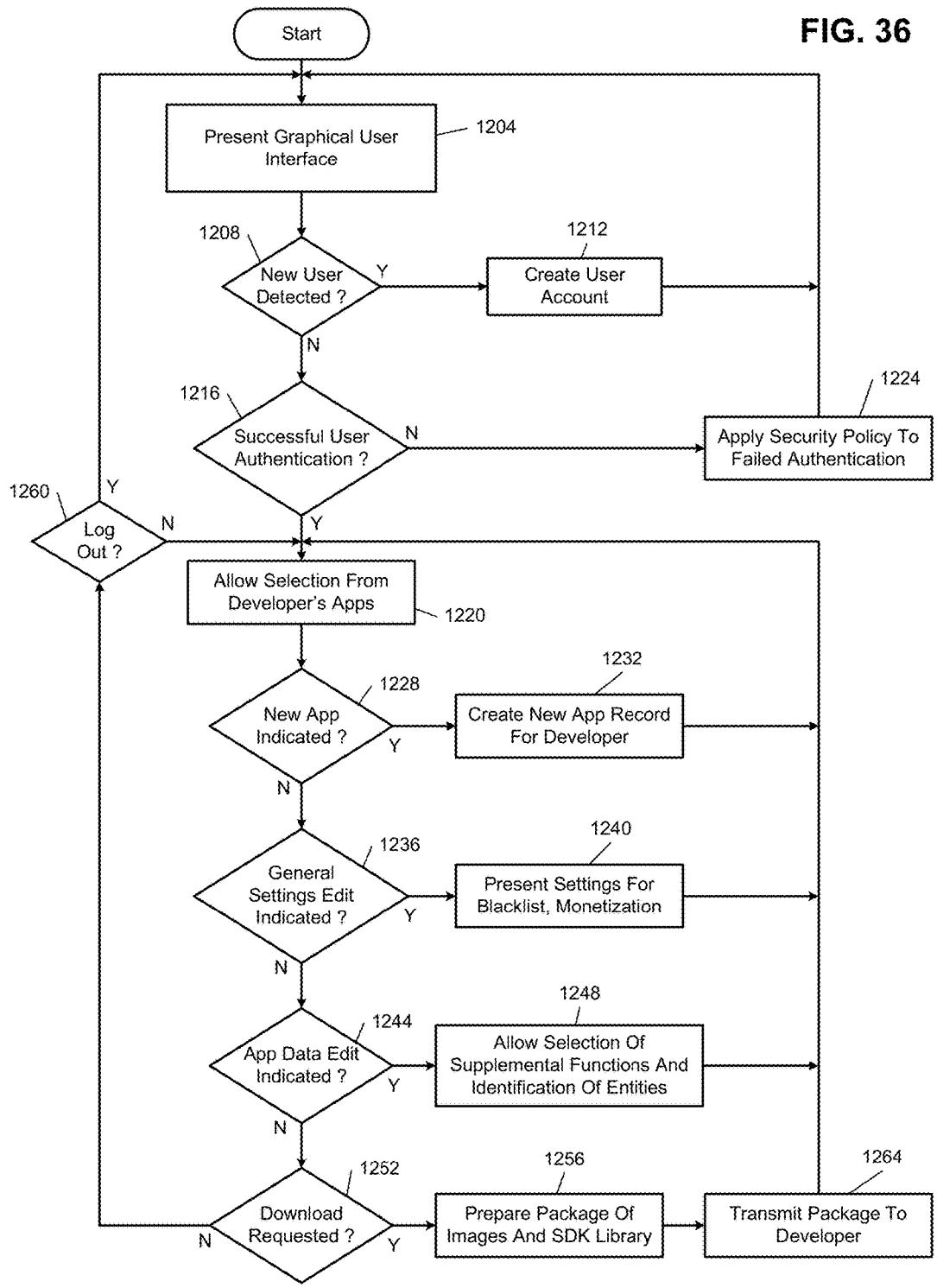
FIG. 36 is a flowchart of example operation of the development portal.

In FIG. 36, example operation of a developer portal begins at 1204, where a graphical user interface is presented, such as by hosting a website. Control continues at 1208, where if a new user is detected, control creates a user account at 1212 and returns to 1204. If an existing user is detected, control transfers to 1216, where upon successful user authentication, control transfers to 1220. If the user does not successfully authenticate, control transfers to 1224. At 1224, a security policy is applied to the failed authentication.

For example only, the security policy may include exponentially increasing a time that the user has to wait before attempting to authenticate again. In addition, the security policy may include a set number of unsuccessful attempts before the user is prevented from logging in without manual intervention at the developer portal. Further, unsuccessful authentication may be logged and may be communicated to a predetermined email address of the user.

At 1220, control allows selection from among the developers' apps. At 1228, if a new app is indicated by the developer, control transfers to 1232; otherwise, control transfers to 1236. At 1232, control creates a new app record for that developer and control returns to 1220. At 1236, control determines whether the developer has indicated that general settings should be edited. If so, control transfers to 1240, where settings are presented for editing. These settings may include a global blacklist, monetization policies, etc.

Control then returns to 1220. If, at 1236, the developer has not indicated that general settings should be edited, control transfers to 1244. At 1244, control determines whether the developer has indicated that data corresponding to an app should be edited. If so, control transfers to 1248; otherwise, control transfers to 1252. At 1248, control allows for selection of supplemental functions, which indicate external functionality that the developer wants to introduce to their app. In addition, settings for already selected functions may be changed, such as function-specific blocked apps and user interface options. Control then returns to 1220.

At 1252, if a download has been requested, control transfers to 1256; otherwise, control transfers to 1260. At 1260, if the user logs out, control returns to 1204; otherwise, control returns to 1220. At 1256, control prepares a package of images and code to implement the desired external functionality for the selected app. At 1264, control transmits the package to the developer for the developer's integration into an app under development. Control then returns to 1220.

Figure 37A:
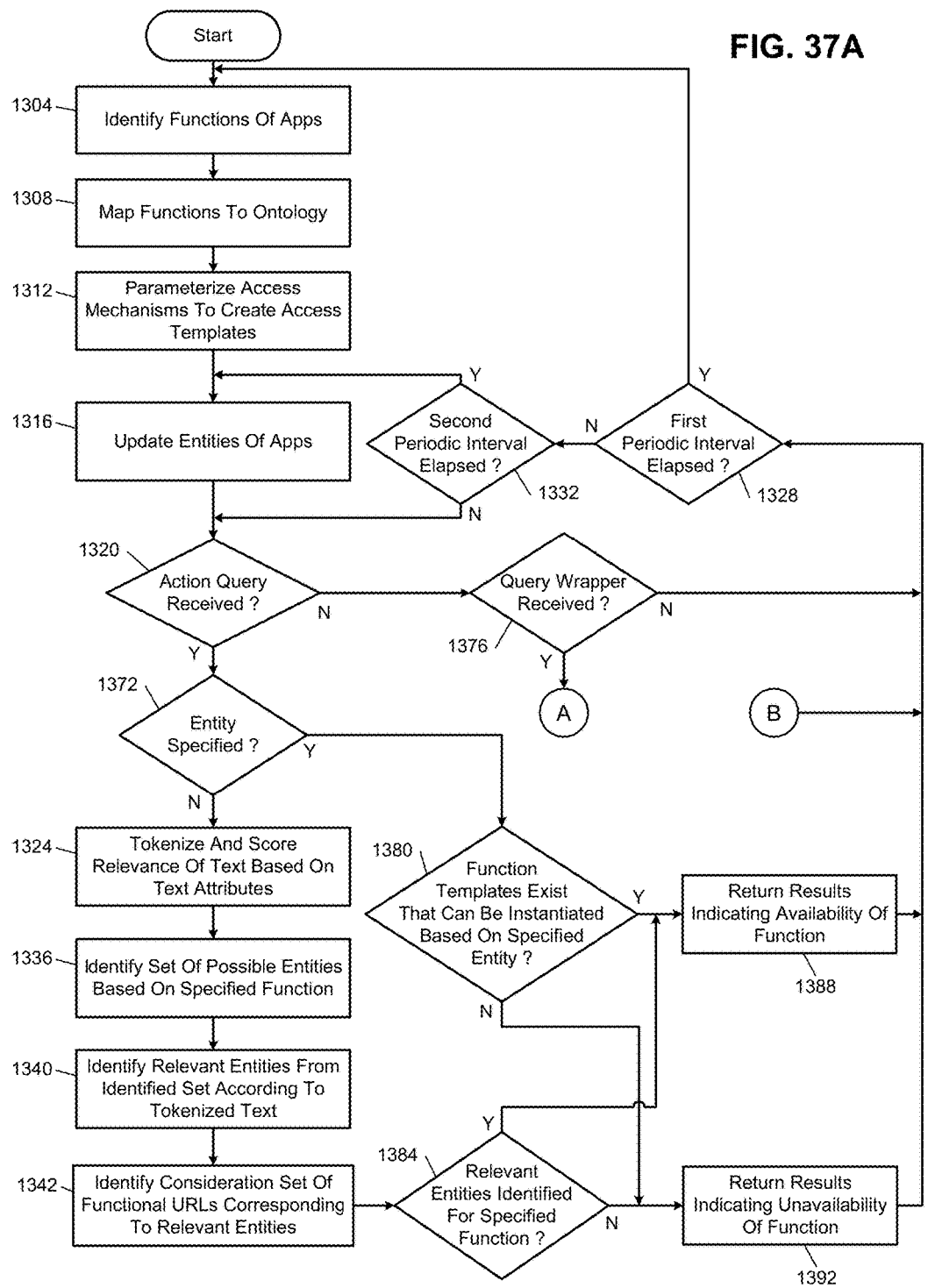
FIG. 37A and FIG. 37B together are a flowchart of example operation of the search system of FIG. 22.
Figure 37B:
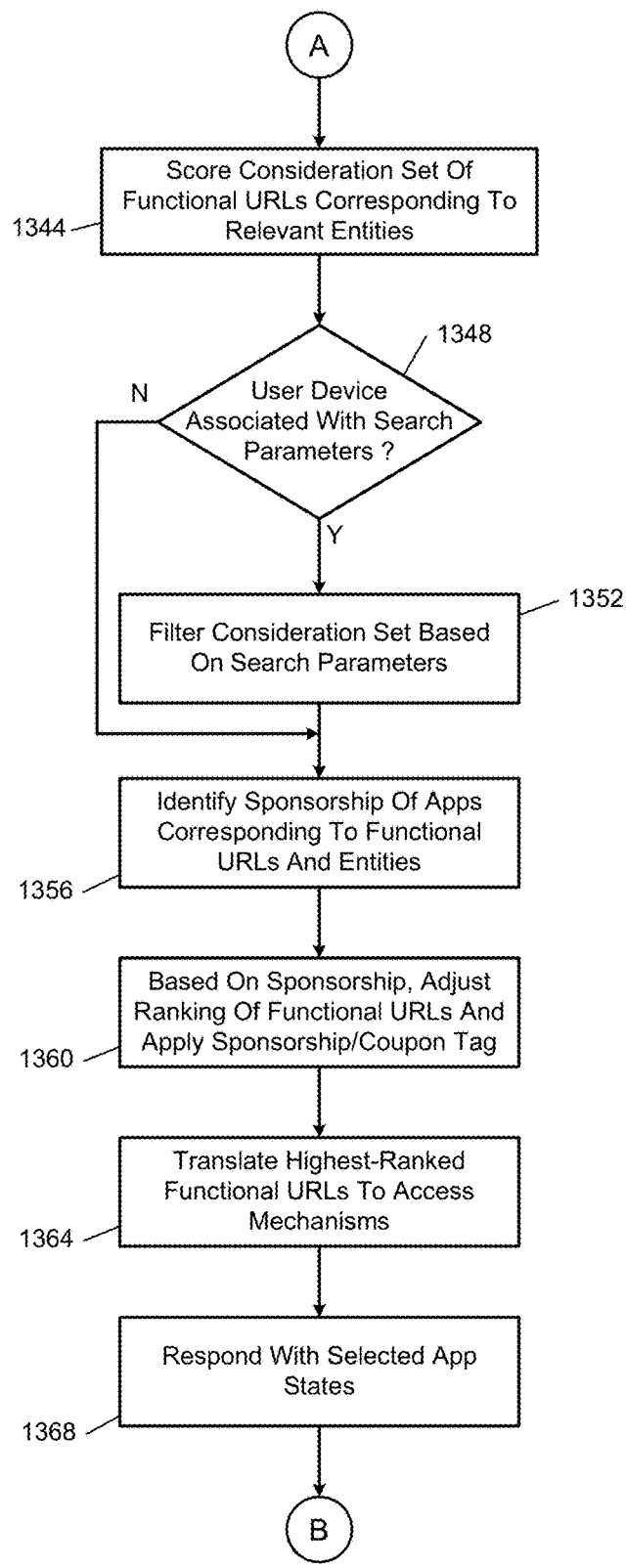

In FIG. 37A and FIG. 37B, a flowchart of example operation of a search system according to the principles of the present disclosure is shown. Control starts at 1304 where the functions provided by apps of interest are identified. Over time, the scope of apps of interest may reach the size of the various mainstream digital distribution platforms and may then even further increase.

At 1308, control maps those functions to a function ontology and updates the function ontology if necessary. In other words, control determines whether a streaming movie watching function of an app belongs is the same function (or, equivalently, can be assigned to the same node) as other streaming movie watching functions, or if there is something unique that requires a different leaf node in the function ontology.

At 1312, control parameterizes access mechanisms to create access templates by observing the URLs and other mechanisms used to access specifics states of the apps of interest. The variable portions of those access mechanisms can be identified so that the access mechanisms can be created by plugging in values into a template.

At 1316, control updates entities corresponding to the apps of interest. For example, as new movies are released or announced, entity data stores for movie-related apps will expand to include these additional entities. At 1320, if an action query is received, control transfers to 1372; otherwise, control continues at 1376. At 1376, control determines whether a query wrapper has been received. If so, control transfers to 1344 of FIG. 37B; otherwise, control continues at 1328.

At 1328, control determines whether a first periodic interval has lapsed. If so, controls returns back to 1304; otherwise, control continues at 1332. At 1332, control determines whether a second periodic interval has lapsed. If so, control transfers to 1316; otherwise, control continues to 1320. In various implementations, the first periodic interval may be longer than the second periodic interval. In various implementations, updating entities (the first periodic interval) may be a nightly process while updating functionality of apps (the second periodic interval) may be a monthly process.

At 1372, control determines whether an entity is explicitly specified in the action query. If so, control transfers to 1380; otherwise, control transfers to 1324 to infer the entity. At 1336, control identifies a set of possible entities based on the specified function in the action query. The possible entities is the set of entities that can be used to instantiate the specified function. For example, if the specified function corresponds to function templates including a movie name, control identifies the set of possible movie names as candidate entities; meanwhile, entities that are specific to books or to addresses or to restaurants will be irrelevant to the specified function.

At 1340, control identifies one or more relevant entities from the identified set according to the tokenized text. In some situations, multiple entities will be relevant, such as when there are multiple movies with a title similar to the tokenized text. In addition, app-specific entities may overlap substantially, such as when a "Dark Knight" film entity is present for the NETFLIX video application as well as for the HULU video application.

At 1342, control identifies a consideration set of possible functional URLs based on the identified entities. As described above, access templates first must have their parameters satisfied by the correct entity type. If an access template requires a certain type of entity and that entity has not been identified, the access template cannot be applied and therefore is removed from the consideration set.

Further, some if not all of the access templates require app-specific data. If any of the app-specific data required by the access mechanism is not present within the relevant entities, that access mechanism is also removed. Each valid triplet of application, function, and entity is recorded, such as in a functional URL.

Control continues at 1384, where if relevant entities have been identified for the specific function, control transfers to 1388; otherwise, control transfers to 1392. At 1388, control returns results to the source of the action query indicating which of the specific function is available. Control then returns to 1328. At 1392, control returns results indicating that the function is unavailable. Control then continues at 1328.

At 1380, the entity was specified, so control determines whether there are function templates that can be instantiated based on the specified entity. The specified entity may be a canonical entity or an app-specific entity. For example, when the entity is a canonical entity, control determines whether any function templates can be instantiated based on the canonical entity or any app-specific entity corresponding to the canonical entity. If at least one function template can be instantiated, control transfers to 1388; otherwise, control transfers to 1392.

At 1344 of FIG. 37B, control scores the consideration set of functional URLs corresponding to the identified relevant entities, which was already identified as part of the action query. The consideration set of functional URLs may then be filtered based on developer choices expressed with the developer portal 304. Therefore, control continues at 1348, where if the user device or app that transmitted the query wrapper is associated with specific search parameters, control transfers to 1352; otherwise, control continues at 1356.

At 1352, control filters the consideration set based on the specified search parameters, which may include a blacklist. Control then continues at 1356. In various implementations, the filtering may be performed as part of the action query. In other words, if the developer has blacklisted an app, and that app is the only choice for satisfying a function, the search system may indicate that the function is not available.

At 1356, control identifies the sponsorship of apps corresponding to functional URLs and/or to entities. At 1360, based on sponsorship, control adjusts the ranking of functional URLs, such as by improving the ranking of functional URLs that are receiving sponsorship. Additionally or alternatively, control may selectively apply a sponsorship tag or a coupon tag to the functional URL, which causes the tagged functional URL to be translated into an access mechanism regardless of its organic score. At 1364, control translates the highest-ranked functional URLs into access mechanisms. At 1368, control responds to the user device with the access mechanisms corresponding to selected app states. Control then continues at 1328 of FIG. 37A.

Overall

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. §112(f) unless an element is expressly recited using the phrase "means for" or, in the case of a method claim, using the phrases "operation for" or "step for."

The invention claimed is:

1. A system of one or more computing devices comprising a non-transitory computer-readable medium including program instructions that, when the program instructions are executed by processor hardware, cause the system to:
  present a user interface to a first application developer;
  store, in a data store, information identifying a plurality of functions and corresponding unique identifiers, wherein each of the plurality of functions corresponds to external functionality available from third party applications;
  receive, by an application functionality management module, a selection from the first application developer of a first function of the plurality of functions to supplement functionality of a first application under development by the first application developer; and
  provide, by a code generation module, a first software object to the first application developer for incorporation into at least a first state of the first application, wherein the first state includes a first user interface element associated with a first entity, and wherein the first software object includes instructions for:
    upon the first state being instantiated, transmitting an action query to a search system, wherein the action query includes a corresponding unique identifier of the first function and an indication of the first entity;

receiving an action response from the search system;
selectively visually adapting the first user interface element in response to the action response;
in response to user selection of the first user interface element, displaying a plurality of items from a result set from the search system, wherein a first item of the plurality of items includes (i) an identifier of a target application and (ii) an access mechanism for a specified state of the target application; and
in response to user selection of the first item, actuating the access mechanism to open the target application to the specified state.

2. The system of claim 1 wherein the visually adapting the first user interface element is performed in response to the action response indicating that the first function is not available for the first entity.

3. The system of claim 1 wherein the visually adapting the first user interface element includes rendering the first user interface element invisible.

4. The system of claim 1 wherein the visually adapting the first user interface element includes rendering the first user interface element in gray to indicate non-interactivity.

5. The system of claim 1 wherein the first software object includes instructions for extracting text from the first state and including the extracted text in the action query as the indication of the first entity.

6. The system of claim 1 wherein the first software object includes instructions for transmitting a query wrapper to the search system in response to user selection of the first user interface element, wherein a response to the query wrapper is received from the search system and includes the result set.

7. The system of claim 1 wherein the action response from the search system includes the result set.

8. The system of claim 1 wherein the first software object includes instructions for, in response to the user selection of the first user interface element, extracting visual attributes of text from the first state and including the extracted visual attributes of the text in the action query.

9. The system of claim 8 wherein the extracted visual attributes include at least one of vertical location of portions of the text within the first state, font size, font type, and font emphasis.

10. The system of claim 1 wherein the access mechanism specifies downloading and installing the target application from a digital distribution platform prior to opening the target application.

11. The system of claim 1 wherein the first item includes a second access mechanism, wherein the second access mechanism specifies opening a web edition of the target application to the specified state.

12. The system of claim 1 wherein the access mechanism includes a script to navigate from a default state of the target application to the specified state of the target application.

13. The system of claim 1 wherein the program instructions cause the system to store, by an application blocking management module, a blacklist, wherein the blacklist indicates applications and application states to exclude from the result set.

14. The system of claim 13 wherein the program instructions cause the system to incorporate, by the code generation module, the blacklist into the first software object, such that the first software object further includes instructions for at least one of:
removing application states matching the blacklist from the result set received from the search system;
providing the blacklist to the search system as part of the action query; and
preventing display of application states from the result set that match the blacklist.

15. A method comprising:
presenting, by processor hardware, a user interface to a first application developer;
storing, in a data store, information identifying a plurality of functions and corresponding unique identifiers, wherein each of the plurality of functions corresponds to external functionality available from third party applications;
receiving, by the processor hardware, a selection from the first application developer of a first function of the plurality of functions to supplement functionality of a first application under development by the first application developer; and
generating, by the processor hardware, a first software object for the first application developer for incorporation into at least a first state of the first application, wherein the first state includes a first user interface element associated with a first entity, and wherein the first software object includes instructions for, when executed on processor hardware of a user device:
upon the first state being instantiated, transmitting an action query to a search system, wherein the action query includes the corresponding unique identifier of the first function and an indication of the first entity;
receiving an action response from the search system;
selectively visually adapting the first user interface element in response to the action response;
in response to user selection of the first user interface element, displaying a plurality of items from a result set from the search system, wherein a first item of the plurality of items includes (i) an identifier of a target application and (ii) an access mechanism for a specified state of the target application; and
in response to user selection of the first item, actuating the access mechanism to open the target application to the specified state.

16. The method of claim 15 wherein the visually adapting the first user interface element is performed in response to the action response indicating that the first function is not available for the first entity.

17. The method of claim 15 wherein the visually adapting the first user interface element includes rendering the first user interface element invisible.

18. The method of claim 15 wherein the visually adapting the first user interface element includes rendering the first user interface element in gray to indicate non-interactivity.

19. The method of claim 15 wherein the first software object includes instructions for extracting text from the first state and including the extracted text in the action query as the indication of the first entity.

20. The method of claim 15 wherein the first software object includes instructions for transmitting a query wrapper to the search system in response to user selection of the first user interface element, wherein a response to the query wrapper is received from the search system and includes the result set.

21. The method of claim 15 wherein the action response from the search system includes the result set.

22. The method of claim 15 wherein the first software object includes instructions for, in response to the user selection of the first user interface element, extracting visual attributes of text from the first state and including the extracted visual attributes of the text in the action query.

23. The method of claim 22 wherein the extracted visual attributes include at least one of vertical location of portions of the text within the first state, font size, font type, and font emphasis.

24. The method of claim 15 wherein the access mechanism specifies downloading and installing the target application from a digital distribution platform prior to opening the target application.

25. The method of claim 15 wherein the first item includes a second access mechanism, wherein the second access mechanism specifies opening a web edition of the target application to the specified state.

26. The method of claim 15 wherein the access mechanism includes a script to navigate from a default state of the target application to the specified state of the target application.

27. The method of claim 15 further comprising storing a blacklist, wherein the blacklist indicates applications and application states to exclude from the result set.

28. The method of claim 27 wherein generating the first software object includes incorporating the blacklist such that the first software object further includes instructions for at least one of:
   removing application states matching the blacklist from the result set received from the search system;
   providing the blacklist to the search system as part of the action query; and
   preventing display of application states from the result set that match the blacklist.

* * * * *